(12) United States Patent
Collins et al.

(10) Patent No.: US 7,706,740 B2
(45) Date of Patent: Apr. 27, 2010

(54) APPARATUS AND METHODS OF SELECTIVE COLLECTION AND SELECTIVE PRESENTATION OF CONTENT

(75) Inventors: Bruce Collins, San Diego, CA (US); Gordon Kent Walker, San Diego, CA (US); Jeffery N. Brown, San Diego, CA (US); Jun Wang, La Jolla, CA (US); Chris John Bennett, San Diego, CA (US); Charles N. Lo, San Diego, CA (US); Haipeng Jin, San Diego, CA (US); Lakshminath Reddy Dondeti, San Diego, CA (US); Randall Coleman Gellens, San Diego, CA (US); Mark Maggenti, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 502 days.

(21) Appl. No.: 11/614,863

(22) Filed: Dec. 21, 2006

(65) Prior Publication Data
US 2008/0090513 A1 Apr. 17, 2008

Related U.S. Application Data

(60) Provisional application No. 60/756,746, filed on Jan. 6, 2006, provisional application No. 60/758,097, filed on Jan. 10, 2006, provisional application No. 60/789,446, filed on Apr. 4, 2006, provisional application No. 60/809,138, filed on May 25, 2006, provisional application No. 60/834,978, filed on Aug. 1, 2006.

(51) Int. Cl.
*H04H 1/00* (2006.01)
(52) U.S. Cl. ............ 455/3.01; 455/3.03; 455/3.06; 455/412.1; 705/14

(58) Field of Classification Search ........... 455/466, 455/3.01, 3.03, 418, 456.1, 454, 457, 414.1, 455/414.3, 412.1, 556.2, 3.06, 414.2; 705/14; 715/753; 707/104.1
See application file for complete search history.

(56) References Cited

U.S. PATENT DOCUMENTS 5,796,952 A 8/1998 Davis et al.
(Continued)

FOREIGN PATENT DOCUMENTS
WO 9930493 6/1999

OTHER PUBLICATIONS

International Search Report, PCT/US07/060248, International Search Authority, European Patent Office, Jan. 12, 2008.
(Continued)

*Primary Examiner*—Tan Trinh
(74) *Attorney, Agent, or Firm*—Abdollah Katbab; Gerald P. Joyce, III

(57) ABSTRACT

Disclosed are apparatus and methods operable to distribute targeted content. Additionally, disclosed are corresponding apparatus and methods operable to selectively choose and cache selected ones from among the distributed targeted content, and to further choose ones from among the cached content to present on a device. In some aspects, selective caching of content may be based upon a match between predetermined content attribute information and predetermined profile information. Further, in some aspects, an indicator is operable to trigger the selective inclusion of one or more of the cached content in a presentation of other content, which may be based on a match between a desired content attribute associated with the indicator and the respective predetermined content attribute information of the cached content.

68 Claims, 29 Drawing Sheets

U.S. PATENT DOCUMENTS

| | | | |
|---|---|---|---|
| 6,268,856 B1 * | 7/2001 | Bruck et al. | 715/733 |
| 6,615,251 B1 | 9/2003 | Klug et al. | |
| 6,728,730 B1 * | 4/2004 | Muro et al. | 707/104.1 |
| 7,136,871 B2 | 11/2006 | Ozer et al. | |
| 2002/0016736 A1 * | 2/2002 | Cannon et al. | 705/14 |
| 2003/0033197 A1 | 2/2003 | Saga et al. | |
| 2007/0112627 A1 * | 5/2007 | Jacobs et al. | 705/14 |

OTHER PUBLICATIONS

Written Opinion, PCT/US07/060248, International Search Authority, European Patent Office, Jan. 12, 2008.

International Preliminary Report on Patentability, PCT/US07/060248, The International Bureau of WIPO, Geneva, Switzerland, Dec. 16, 2008.

\* cited by examiner

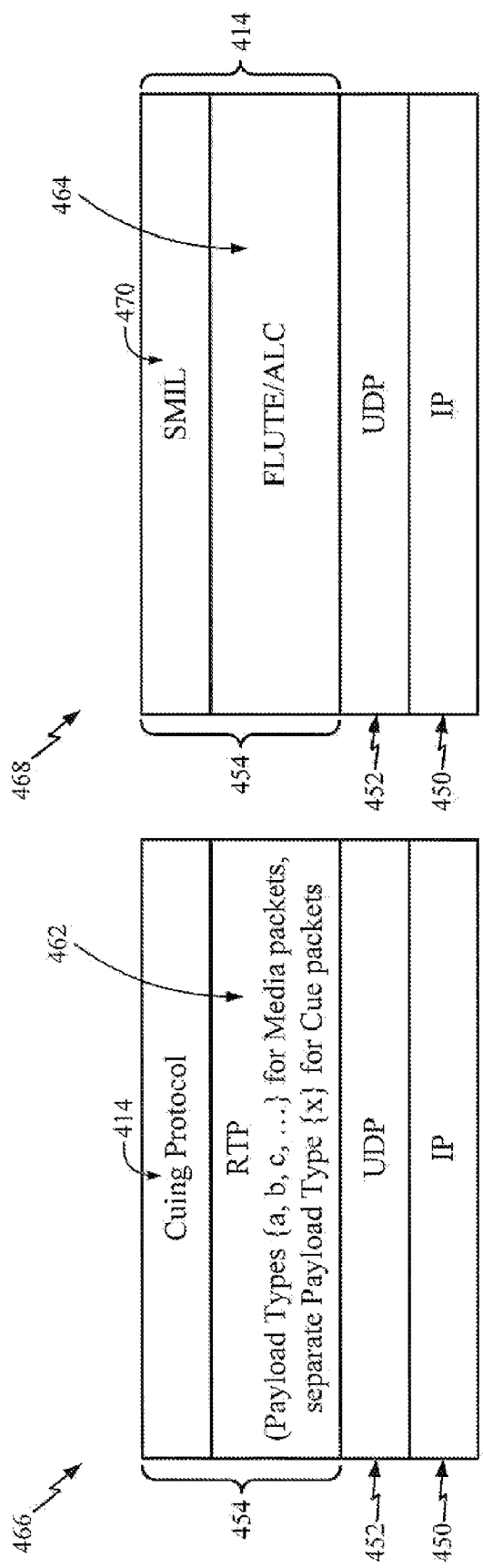

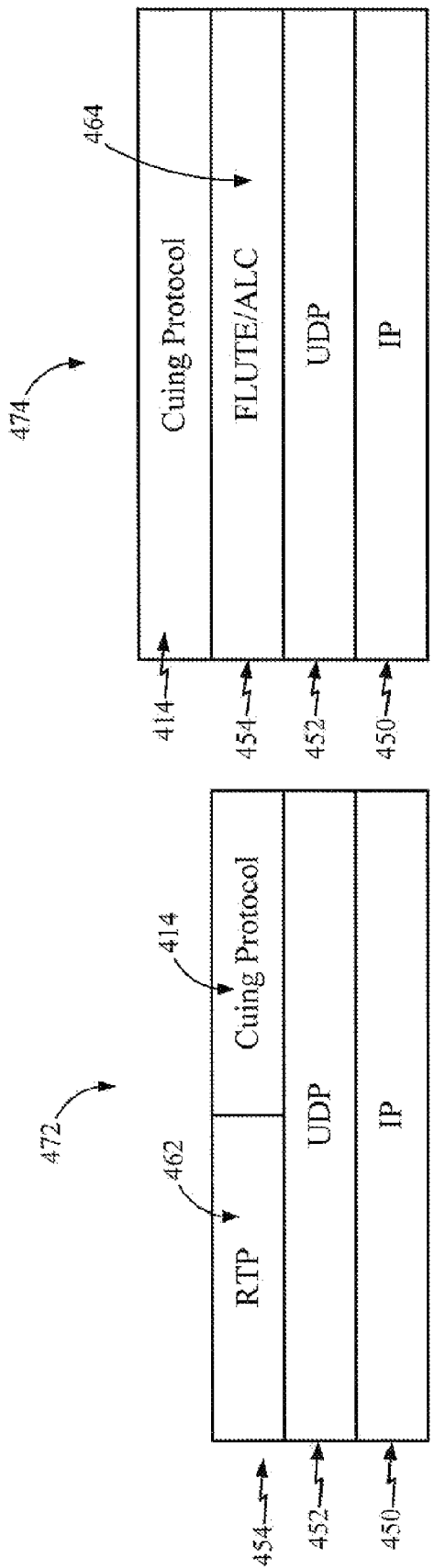

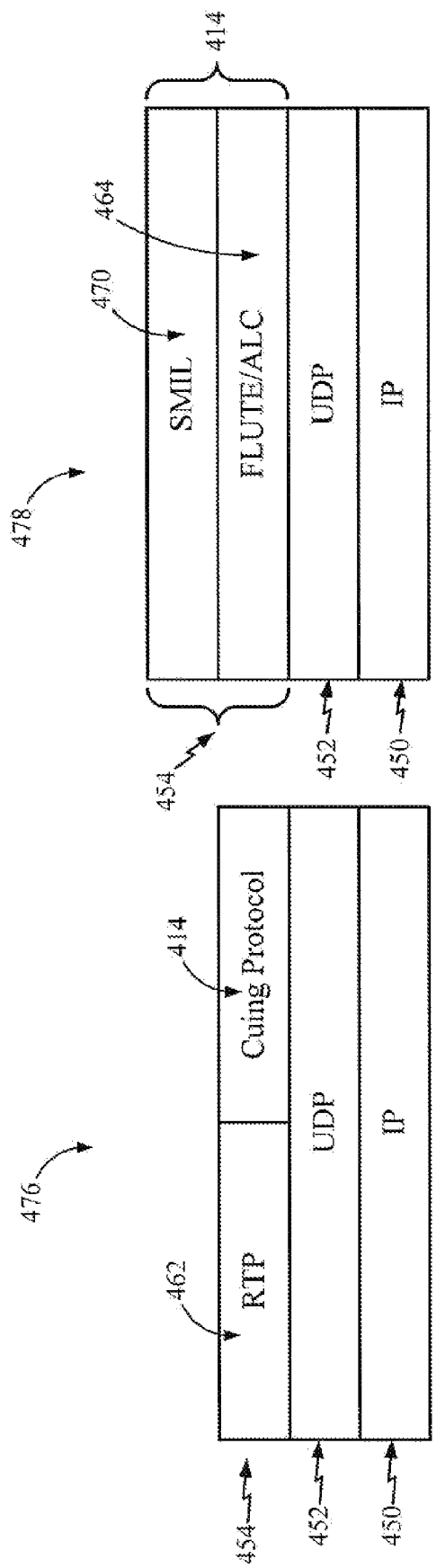

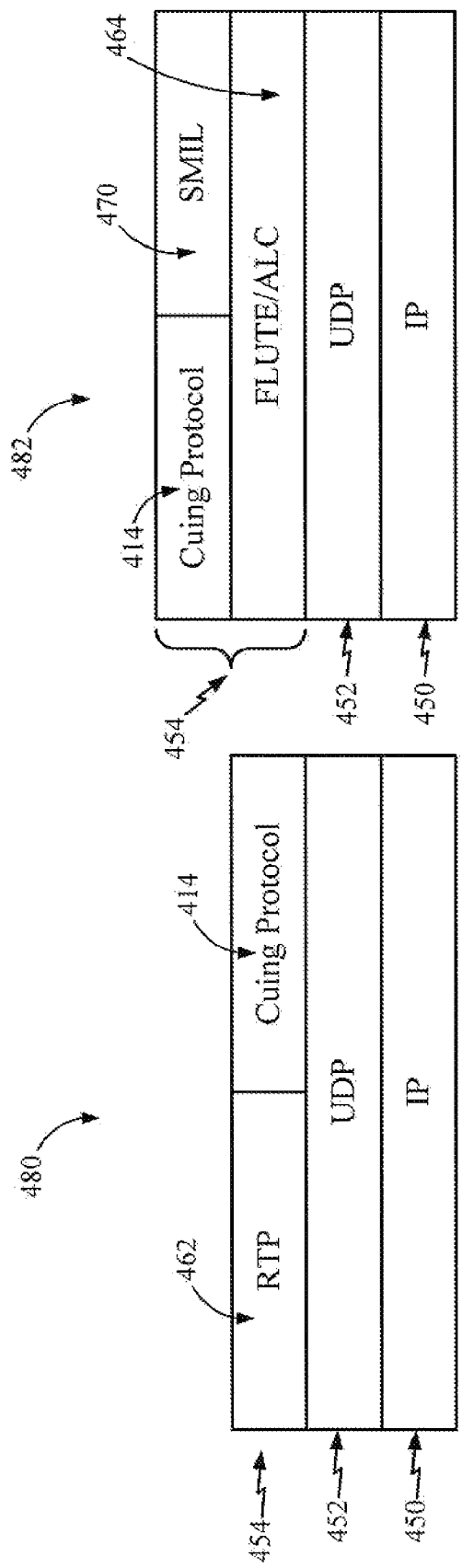

APPARATUS AND METHODS OF SELECTIVE COLLECTION AND SELECTIVE PRESENTATION OF CONTENT

CLAIM OF PRIORITY UNDER 35 U.S.C. §§ 119 and 120

The present Application for Patent claims priority to: Provisional Application No. 60/756,746 entitled "Methods and Apparatus for Delivery of Targeted Advertising on Mobile Devices" filed Jan. 6, 2006; Provisional Application No. 60/758,097 entitled "Methods and Apparatus for Delivery of Targeted Advertising on Mobile Devices" filed Jan. 10, 2006; Provisional Application No. 60/789,446 entitled "Apparatus and Methods of Receiving Content Based on User Preferences" filed Apr. 4, 2006; Provisional Application No. 60/809,138 entitled "Targeted Advertisement Caching and Insertion in Mobile Broadcast Services" filed May 25, 2006; Utility application Ser. No. 11/566,145 entitled "Target Advertisement in a Broadcast System" filed Dec. 1, 2006; and Provisional Application No. 60/834,978 entitled "Advertising Insertion" filed Aug. 1, 2006, each assigned to the assignee hereof and each hereby expressly incorporated by reference herein.

BACKGROUND

1. Field

The described aspects relate to content distribution systems, and more particularly, to apparatus and methods of selective collection and selective presentation of content.

2. Background

One of the biggest problems in traditional media distribution systems, such as broadcasting and pay television, is the inability to profile consumers in order to provide media content tuned to individual preferences. For example, such tuned content may include targeted advertising and direct marketing. The problem is two-fold. In a traditional television environment, which is normally tracked at the household level, it is difficult if not impossible to identify the viewing habits of the actual individual watching the programming or transacting, for example via interactive television, with the platform in any way. This is because there are usually multiple viewers in each household and no way to tell who watches what programming. The second problem is that profiling, in general, is not well received by the public in most countries. Often, it is outlawed to collect subscriber information without the consent of the subscriber.

Non-traditional media distribution systems, such as those that provide media content to computers and wireless devices, also may experience some of these problems. For example, in the realm of supplying media content to a wireless device, the identification of the actual individual consuming the media content is less of an issue, as a wireless device is typically used by only one person. The problem with respect to profiling, however, is pervasive, and is very much an issue even with a computer and/or a wireless device.

Thus, improved systems and method of distributing and receiving targeted content are desired.

SUMMARY

The described aspects include apparatus, methods, processors, and computer-readable media for effecting the distribution of targeted content, and/or for effecting the selective caching and the selective presentation of targeted content.

In one aspect, a method of presenting content on a wireless device comprises obtaining a second content indicator associated with a primary content, a secondary content attribute for each of a plurality of secondary content, and a selection parameter associated with a user of the wireless device. The secondary content indicator comprises a secondary content timing relative to the primary content and further comprises a secondary content parameter. The method further includes storing selected secondary content from a one-to-many transmission of the plurality of secondary content based on a match between the selection parameter and a respective secondary content attribute. Further, the method includes identifying, with respect to the secondary content indicator, one of the selected secondary content based on a match between the secondary content parameter and a respective secondary content attribute. Additionally, the method includes presenting via an output device, at the secondary content timing, the identified one of the selected secondary content.

In another aspect, at least one processor is configured to perform the above-described actions.

In yet another aspect, a computer program product comprises a computer-readable medium comprising a first set of codes for causing a computer to obtain a secondary content indicator associated with a primary content. The secondary content indicator comprises a secondary content timing relative to the primary content and further comprises a secondary content parameter. The computer-readable medium further comprises a second set of codes for causing the computer to obtain a secondary content attribute for each of a plurality of secondary content. Also, the computer-readable medium comprises a third set of codes for causing the computer to obtain a selection parameter associated with a user of a wireless device. Further, the computer-readable medium comprises a fourth set of codes for causing the computer to store selected secondary content from a one-to-many transmission of the plurality of secondary content based on a match between the selection parameter and a respective secondary content attribute. The computer-readable medium further comprises a fifth set of codes for causing the computer to identify, with respect to the secondary content indicator, one of the selected secondary content based on a match between the secondary content parameter and a respective secondary content attribute. Additionally, the computer-readable medium comprises a sixth set of codes for causing the computer to present via an output device, at the secondary content timing, the identified one of the selected secondary content.

In yet another aspect, an apparatus for presenting content comprises means for obtaining a secondary content indicator associated with a primary content. The secondary content indicator comprises a secondary content timing relative to the primary content and further comprises a secondary content parameter. Further, the apparatus comprises means for obtaining a secondary content attribute for each of a plurality of secondary content, and means for obtaining a selection parameter associated with a user of the apparatus. Also, the apparatus comprises means for storing selected secondary content from a one-to-many transmission of the plurality of secondary content based on a match between the selection parameter and a respective secondary content attribute. The apparatus further comprises means for identifying, with respect to the secondary content indicator, one of the selected secondary content based on a match between the secondary content parameter and a respective secondary content attribute. Additionally, the apparatus comprises means for presenting, at the secondary content timing, the identified one of the selected secondary content.

In still another aspect, a device for presenting content comprises a computer platform having a memory and a processor, wherein the memory comprises a selection parameter. The device also includes a user interface in communication with the computer platform and a communications module in communication with the computer platform. The communications module is operable to obtain a secondary content indicator associated with a primary content, a secondary content attribute for each of a plurality of secondary content, and a one-to-many transmission of the plurality of secondary content. The secondary content indicator comprises a secondary content timing relative to the primary content and further comprises a secondary content parameter. Further, the device comprises a content selector having selection logic operable to initiate storage in the memory of selected secondary content from the one-to-many transmission of the plurality of secondary content based on a first match between the selection parameter and a respective secondary content attribute. The selection logic is further operable to identify, with respect to the secondary content indicator, one of the selected secondary content based on a second match between the secondary content parameter and a respective secondary content attribute. Additionally, the device comprises a media module having media management logic operable to initiate a presentation, at the secondary content timing, of the identified one of the selected secondary content on the user interface.

In another aspect, a method of distributing targeted content comprises obtaining a secondary content indicator associated with a primary content, wherein the secondary content indicator comprises a secondary content parameter. The method also comprises obtaining a plurality of secondary content and obtaining a plurality of secondary content attributes each associated with a respective one of the plurality of secondary content. Further, the method comprises generating a one-to-many transmission including the secondary content indicator, the plurality of secondary content attributes and the plurality of secondary content. Also, the method comprises obtaining an identification of a selected one of the plurality of secondary content cached on a wireless device based on user preference data, and further obtaining an identification of user interactivity with the wireless device associated with a presentation on the wireless device of the selected one. Additionally, the method comprises adjusting, based on the identification of the selected one and the identification of the user interactivity, at least one of the secondary content parameter and a population of the plurality of secondary content included in the one-to-many transmission.

In another aspect, at least one processor is configured to perform the above-described actions.

In yet another aspect, a computer program product comprises a computer-readable medium comprising a first set of codes for causing a computer to obtain a secondary content indicator associated with a primary content, the secondary content indicator comprising a secondary content parameter. The computer-readable medium further comprises a second set of codes for causing the computer to obtain a plurality of secondary content. Also, the computer-readable medium comprises a third set of codes for causing the computer to obtain a plurality of secondary content attributes each associated with a respective one of the plurality of secondary content. Further, the computer-readable medium comprises a fourth set of codes for causing the computer to generate a one-to-many transmission including the secondary content indicator, the plurality of secondary content attributes and the plurality of secondary content. The computer-readable medium also comprises a fifth set of codes for causing the computer to obtain an identification of a selected one of the plurality of secondary content cached on a wireless device based on user preference data, and further for causing the computer to obtain an identification of user interactivity with the wireless device associated with a presentation on the wireless device of the selected one. Additionally, computer-readable medium comprises a sixth set of codes for causing the computer to adjust, based on the identification of the selected one and the identification of the user interactivity, at least one of the secondary content parameter and a population of the plurality of secondary content included in the one-to-many transmission.

In a further aspect, an apparatus for distributing content comprises means for obtaining a secondary content indicator associated with a primary content, wherein the secondary content indicator comprises a secondary content parameter. The apparatus also comprises means for obtaining a plurality of secondary content and means for obtaining a plurality of secondary content attributes each associated with a respective one of the plurality of secondary content. The apparatus further comprises means for generating a one-to-many transmission including the secondary content indicator, the plurality of secondary content attributes and the plurality of secondary content. Further, the apparatus comprises means for obtaining an identification of a selected one of the plurality of secondary content cached on a wireless device based on user preference data, and further for obtaining an identification of user interactivity with the wireless device associated with a presentation on the wireless device of the selected one. Additionally, the apparatus comprises means for adjusting, based on the identification of the selected one and the identification of the user interactivity, at least one of the secondary content parameter and a population of the plurality of secondary content included in the one-to-many transmission.

In other aspects, an apparatus for distributing content comprises a computer platform having a memory and a processor. The memory comprises a secondary content indicator associated with a primary content, a plurality of secondary content, a plurality of secondary content attributes each associated with a respective one of the plurality of secondary content, a distribution manager module having distribution management logic, and a content manager module having content management logic. The secondary content indicator comprises a secondary content parameter. Further, the apparatus comprises a transmitter operable to generate a one-to-many transmission by execution of the distribution management logic by the processor, wherein the one-to-many transmission includes the secondary content indicator, the plurality of secondary content attributes and the plurality of secondary content. Also, the apparatus comprises a communications module in communication with the computer platform and operable to obtain from a wireless device an identification of a selected one of the plurality of secondary content cached on the wireless device based on user preference data. The communications module is further operable to obtain an identification of user interactivity with the wireless device associated with a presentation on the wireless device of the selected one. Additionally, in the apparatus, the processor is operable to execute the content management logic to adjust, based on the identification of the selected one and the identification of the user interactivity, at least one of the secondary content parameter and a population of the plurality of secondary content included in the one-to-many transmission.

BRIEF DESCRIPTION OF THE DRAWINGS

FIGS. 28 and 29 are schematic diagram of respective aspects of a real-time cuing protocol stack and a non-real-time cuing protocol stack operable for use in the system of FIG. 1;

FIGS. 30 and 31 are schematic diagram of respective aspects of a real-time cuing protocol stack and a non-real-time cuing protocol stack operable for use in the system of FIG. 1;

FIGS. 32 and 33 are schematic diagram of respective aspects of a real-time cuing protocol stack and a non-real-time cuing protocol stack operable for use in the system of FIG. 1;

FIGS. 34 and 35 are schematic diagram of respective aspects of a real-time cuing protocol stack and a non-real-time cuing protocol stack operable for use in the system of FIG. 1;

DETAILED DESCRIPTION

Figure 1:
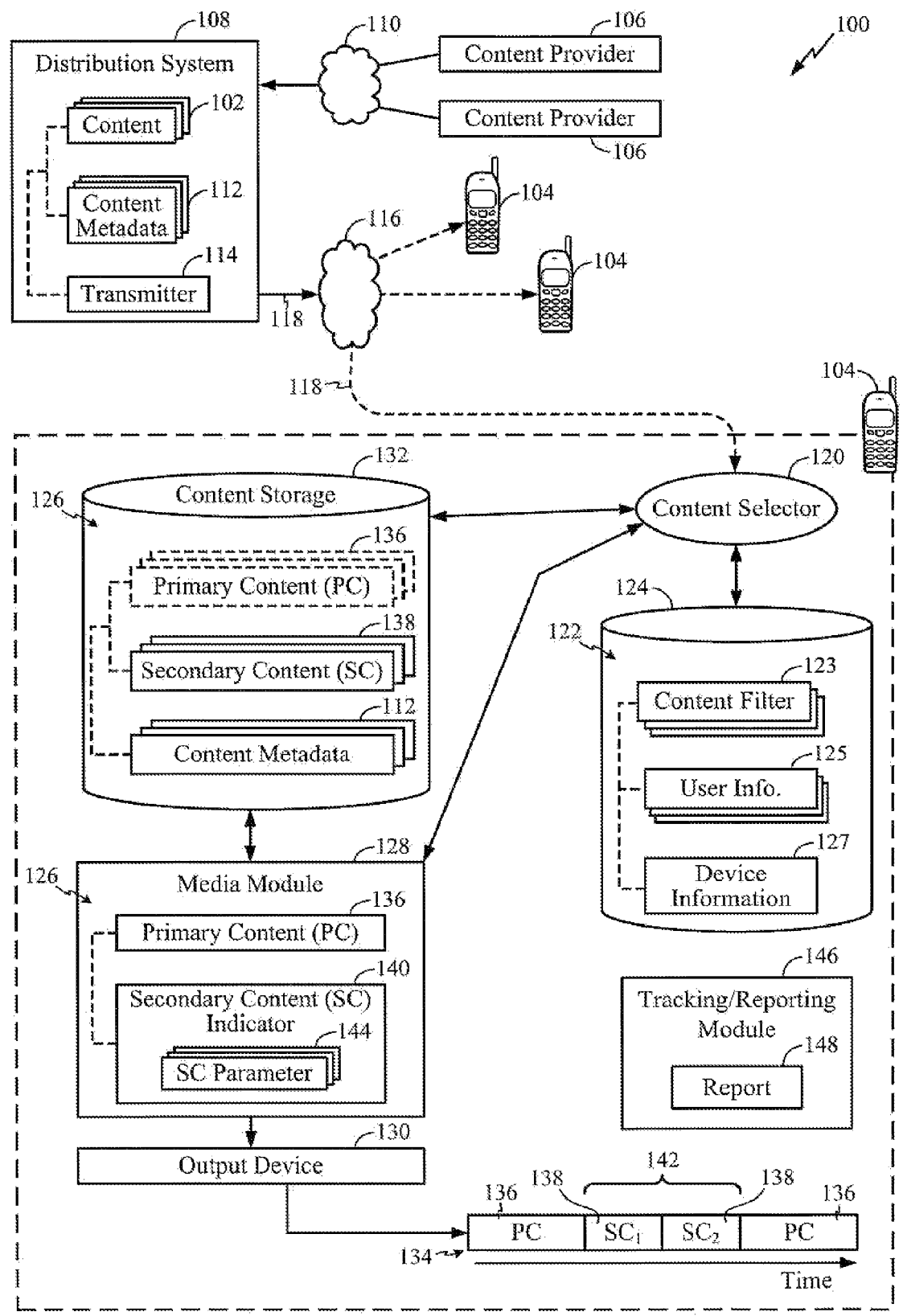
FIG. 1 is a schematic diagram of one aspect of a system for distributing content including a wireless device operable to selectively download and selectively present content.

The present apparatus and methods now will be described more fully with reference to the accompanying drawings. The apparatus and methods may be embodied in many different forms, however, and should not be construed as limited to the aspects set forth herein. Additionally, throughout this description, like numbers refer to like elements.

The described aspects relate to distributing targeted content, to selectively choosing and caching selected ones from among the distributed targeted content, and to further choosing ones from among the cached content to present on a device. While applying to any type of content, in one example, the described aspects may improve advertising effectiveness by delivering advertisements targeted to individual consumers of a broadcast/multicast service. In some aspects, the advertisements are in the form of files or clips. These clips may be cached on the consumer's wireless device. When the consumer is viewing a broadcast/multicast channel and the network announces an opportunity to play advertising, the wireless device selects from the cache an ad clip that best meets network-specified targeting objectives and plays the selected advertising clip. Advertising clips may contain combinations of a wide variety of media types such as audio, video, still images, text, etc., any of which additionally may be animated.

Thus, the following describes a plurality of aspects that encompass targeted advertisement caching and insertion in mobile broadcast services. These aspects apply to both real-time, e.g. broadcast streaming, and non-real-time, e.g. clip-cast, program content. The aspects may include, for example: (a) The advertisements themselves, which are selectively downloadable to and/or cached in wireless devices prior to an advertising insertion event, which may be denoted by a secondary content indicator or cuing signal; (b) Filters, which are rule sets defined by a distribution system, a service provider, an advertiser, etc., and which act upon various criteria to control customized advertisement storage, as well as targeted insertion of advertisements. The filters may operate upon one or more of the following types of attributes: Service Guide attributes, such as a general description, a genre and a rating for the main program; attributes stored in the device in the form of user profiles; attributes embedded within a secondary content indicator and/or cuing protocol, such as indicating dynamic and varying value of advertising slots, which may be carried by a broadcast and/or multicast transmission to a plurality of wireless devices, thereby allowing dynamic updating of content caching and content selecting parameters; attributes contained in the advertisements themselves; and other attributes, such as targeted user demographics, user location, time of day, day of week, etc. Attributes used in the filter rules may be static and/or dynamic in nature, and the filter rules themselves may be dynamic or static; (c) Secondary content indicator and/or Cuing signal, which provides a means to signal an advertisement insertion event to the wireless device, and which represents the overall timing structure of the primary content relative to the advertisement(s). The secondary content indicator and/or cuing signal may include one or more cue types, such as: an Event Pending cue, which notifies the recipient of an upcoming advertisement insertion event; an Event Notification cue, which notifies the recipient of the start of an advertisement insertion event; an Event Termination cue, which notifies the recipient of the end of an advertisement insertion event; and an Event Continuing cue, which notifies the recipient of an advertisement insertion event in progress. A cue signal may be linked to an advertisement selection filter by a filter identifier, which represents an alias for the filter and its associated rules. Thus, in some aspects, the secondary content indicator and/or cue signal enables the synchronized switching between primary content and advertising content within a presentation.

Further, the described aspects allow for a highly dynamic and flexible system, where all rules, filters, attributes and any other cache/selection criteria can be based on transmitted data received by a wireless device. Such a dynamic and flexible system allows for frequent refinement of the system in order to maximize the presentation on wireless devices of targeted content, and associated user interaction, along with revenues associated therewith.

Referring to FIG. 1, in one aspect, a system 100 provides apparatus and methods for selective downloading and selective presentation of content 102 on one or more wireless devices 104. System 100 may include one or more content providers 106 operable to provide one more pieces of content 102 to distribution system 108, such as via a first network 110. Distribution system 108 is operable to deliver one or more pieces of content 102, along with one or more content metadata 112 associated with each piece of content 102, to the one or more wireless devices 104. For example, distribution system 108 may include a transmitter 114 and/or the second network 116, wherein transmitter 114 is operable to generate a one-to-many transmission 118 of content 102 and/or content metadata 112 for delivery to one or more wireless devices 104 via second network 116.

Upon accessing transmission 118, each wireless device 104 is operable to execute a content selector 120, which is operable to determine selected ones of the one or more content 102 in transmission 118 to download to wireless device 104 based on one or more selection parameters 122 within a selection database 124. Selection parameters 122 may include, but are not limited to, data such as one or more content filters 123, one or more data representing user information 125, in one or more data representing device information 127. Further, in some aspects, selection parameters 122 may be unique to, and/or customized for, each respective wireless device 104 and/or each respective user of each wireless device 104. As such, in some aspects, each wireless device 104 may download a different set of one or more pieces of content 102 within the same transmission 118. Thus, in some aspects, one or more selection parameters 122 allow content selector 120 to download selected content 126 targeted to, and/or likely to be of interest to, a respective user of the respective wireless device 104 based on a match between one or more of the respective content metadata 112 and one or more of the selection parameters 122.

Further, for example, in aspects where selected content 126 comprises a real time or live content, content selector 120 may forward selected content 126 to a media module 128 for presentation via an output device 130. In other aspects, for example, where selected content 126 comprises a non-real-time content, content selector 120 may forward selected content 126 to be cached or saved in a content storage 132. In the non-real-time case, media module 128 is operable to access content storage 132 at any time to retrieve and cause a presentation via output device 130 of the saved, selected content 126.

Output device 130, in combination with media module 128, is operable to generate selected content 126 as a program or presentation 134 for consumption by a user of wireless device 104. Each program or presentation 134 may comprise a combination of one or more pieces of selected content 126. For example, in some aspects, selected content 126 may comprise one or more pieces of primary content 136 and one or more pieces of secondary content 138, along with one or more of the content metadata 112 corresponding to primary content 136 and secondary content 138. Further, for example, in some aspects, one or more pieces of primary content 136 of a respective program or presentation 134 may include one or more secondary content indicators 140, each of which define a secondary content space or timing 142 relative to primary content 136 for inclusion of one or more pieces of secondary content 138. Further, in some aspects, content indicator 140 may include one or more secondary content parameters 144, which may define required and/or optional attributes of desired secondary content for use at each secondary content space or timing 142.

For example, each secondary content indicator 140 may provide for at least one of (a) a combination of one or more pieces of secondary content 138 with primary content 136, such that both the primary and secondary content are presented simultaneously; (b) an insertion of one or more pieces of secondary content 138 within primary content 136, and/or an addition to primary content 136 of one or more pieces of secondary content 138, such that the entire piece of primary content 136 and the entire piece of each secondary content 138 are presented within program or presentation 134; and (c) a replacement of a portion of primary content 136 with one or more pieces of secondary content 138, where the replaced portion of primary content 136 corresponds to secondary content space or timing 142.

Upon receiving each secondary content indicator 140, media module 128 communicates with content selector 120, which is operable to determine which of the selected content 126 should be included in the respective secondary content space or timing 142. For example, content selector 120 is operable to identify one or more of the selected content 126 cached within content storage 132 having one or more corresponding content metadata 112 that match one or more secondary content parameters 144 of the respective secondary content indicator 140. In some aspects, content selector 120 may base the match determination on rules or attributes of a predetermined content filter 123. Further, in some aspects, content selector 120 may further utilize one or any combination of a predetermined portion of user information 125 and a predetermined portion of device information 127 in determining the match. In any case, for each secondary content indicator 140, content selector 120 identifies one or more of selected content 126 on each wireless device 104 for retrieval by media module 128 and generation by output mechanism 130 that the respective space or timing 142 of program or presentation 134. As such, for each wireless device 104, since each set of one or more selected content 126 and each set of one or more selection parameters 122 may differ, the same secondary content indicator 140 operated on by two different wireless devices 104 may result in the inclusion of different secondary content 138 with respect to the same primary content 136 presented on each wireless device 104.

Additionally, in some aspects, wireless device 104 may further include a tracking/reporting module 146 to monitor, record and report on consumption of selected content 126, as well as the state of corresponding device information and/or user information. For example, tracking/reporting module 146 may be operable to record user interactions with wireless device 104 during program or presentation 134, and in some aspects, particularly during the presentation of secondary content 138. Tracking/reporting module 146 may be further operable to generate a report 148 to provide such recorded data in detail, in summary and/or in any predetermined fashion for use by any entity associated with, or interested in the activities of, system 100.

Thus, system 100 provides each wireless device 104 with apparatus and methods for independently choosing selected content 126 from the one-to-many transmission 118 of a plurality of content 102 based on independently configured content caching functionality associated with each wireless device 104. Further, system 100 provides each wireless device 104 with apparatus and methods for independently choosing secondary content from among its respective set of one or more selected content 126 for inclusion with a program or presentation of primary content, based on independently configured content insertion functionality associated with each wireless device 104. Additionally, in some aspects, system 100 provides each wireless device 104 with the ability to monitor and report on the consumption of selected content and the user interactions and/or device information corresponding to the consumption. Further, system 100 provides a dynamic and flexible solution operable to maximize the download and presentation of targeted content by a wireless device.

Figure 2:
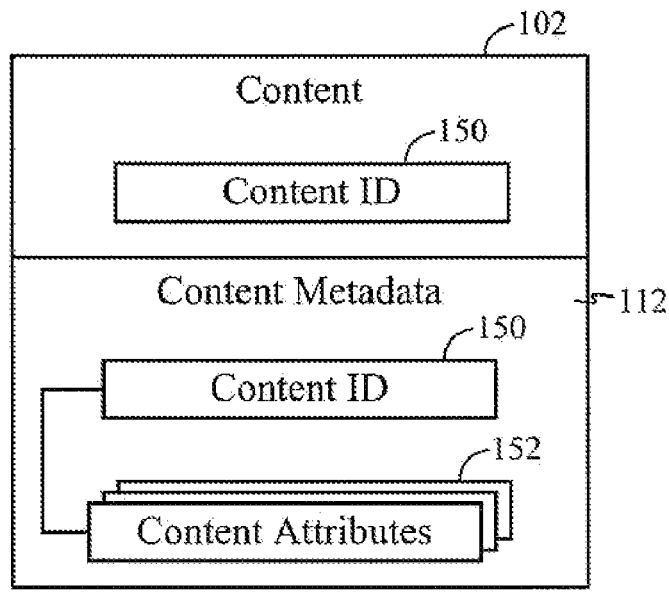
FIG. 2 is a schematic diagram of one aspect of the content of FIG. 1.

Referring to FIG. 2, content 102 as used herein may comprise, but is not limited to, at least one of video, audio, multimedia content, real-time content, non-real-time content also referred to as "clips," scripts, programs, or any other type of data or object operable to be distributed to and executed or presented by wireless device 104. For example, content 102 may include one or any combination of subscribed to programming, ad hoc and/or on-demand received programming, and/or advertising or any other form of content added to, inserted within and/or presented simultaneously with or in place of other content. Additionally, for example, content 102 may comprise, but is not limited to, a television show, a video, a movie, a song, interactive data such as World Wide Web pages and links, etc. Further, content 102 may comprise a unique content identifier (ID) 150, such as one or any combination of a letter, a number, a name, a file name, a file path, etc. associated with the respective piece of content.

Additionally, at least one of the plurality of content 102 is associated with one or more content metadata 112. For instance, one or more of the "content suppliers" associated with a respective one of the plurality of content 102 may define the respective content metadata 112, and associate the content metadata 112 with the respective content. As used herein, the term "content supplier" may include one or any combination of a content provider such as content provider 106, a content retailer, a billing and customer service provider, and a media distributor such as distribution system 108. Content metadata 112 comprises any data that describes and/or is associated with each respective piece of content 102. For example, content metadata 112 may comprise, but is not limited to, one or any combination of content ID 150 and one or more content attributes 152, such as a category, a name, a content length, a content type, secondary content indicator 140, secondary content parameter 144, a code, an identifier, a theme, a genre, an intended audience and/or market, a script, a content filter identifier, a cuing protocol parameter, a related audience and/or market, a primarily-associated type of product and/or service, a secondarily-associated type of product and/or service, a program-level content description or theme describing a portion of the associated content, a number of units or pieces of desired secondary content, an order of presentation of one or more desired secondary content, and/or any metadata relating to the corresponding content. One or more content metadata 112 may be separate from, attached to or embedded within the respective content 102. In some aspects, for example, when content 102 and content metadata 112 are separate, they each may comprise or point to the same content ID 150, for example, to enable the respective content metadata to be related to the respective piece of content.

Figure 3:
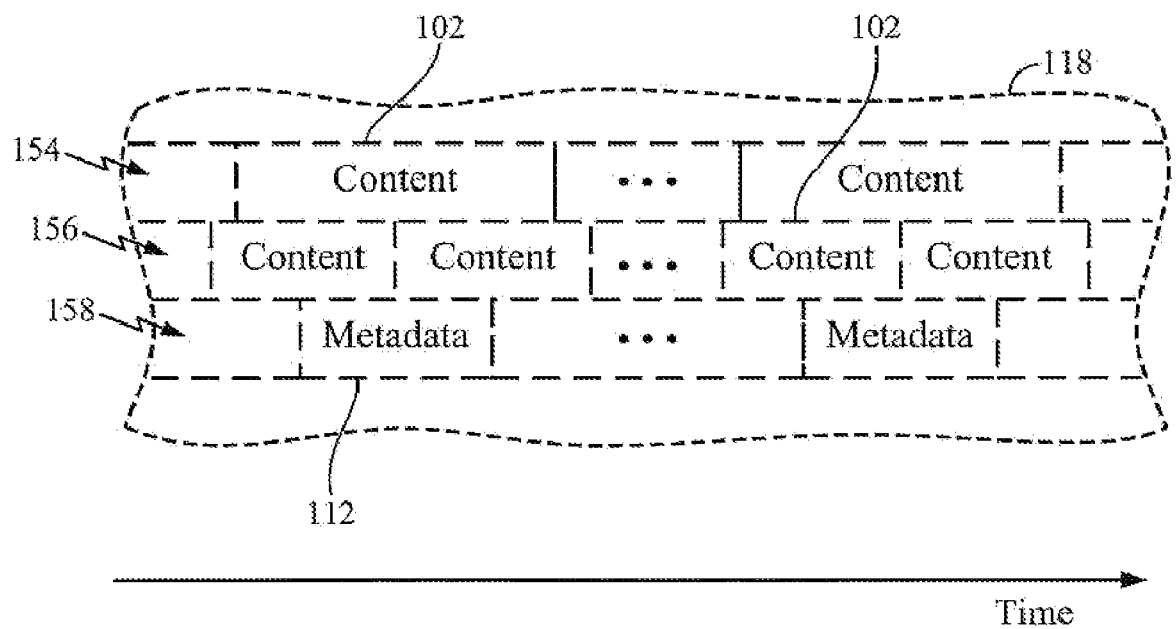
FIG. 3 is a schematic diagram of one aspect of the transmission of a plurality of channels of the plurality of content of FIG. 1.

Referring to FIG. 3, in some aspects, transmission 118 may provide one or more channels or services 154, 156, 158 of content 102 and content metadata 112 to each wireless device 104 (FIG. 1) for consumption by a respective end user. In some aspects, for example, each transmission 118 may comprise a one-to-many transmission in a Forward Link Only (FLO™) system, such as the MediaFLO™ system available from Qualcomm, Incorporated of San Diego, Calif. In such a system, transmission 118 comprises a flow or a logical stream within a "multiplex," which is a set of flows available in a given geographical area. Further, each service or channel 154, 156, 158 carried by transmission 118 may comprise one or some combination of the plurality of content 102. In some aspects, a service customized for a specific content retailer may be referred to as a "channel." Thus, transmission 118 is able to deliver the same service or channel 154, 156, 158 to a plurality of endpoints at the same time for a given content retailer, while allowing different content retailers to customize services to provide channels of similar content but with a retailer-specific look and feel.

Figure 4:
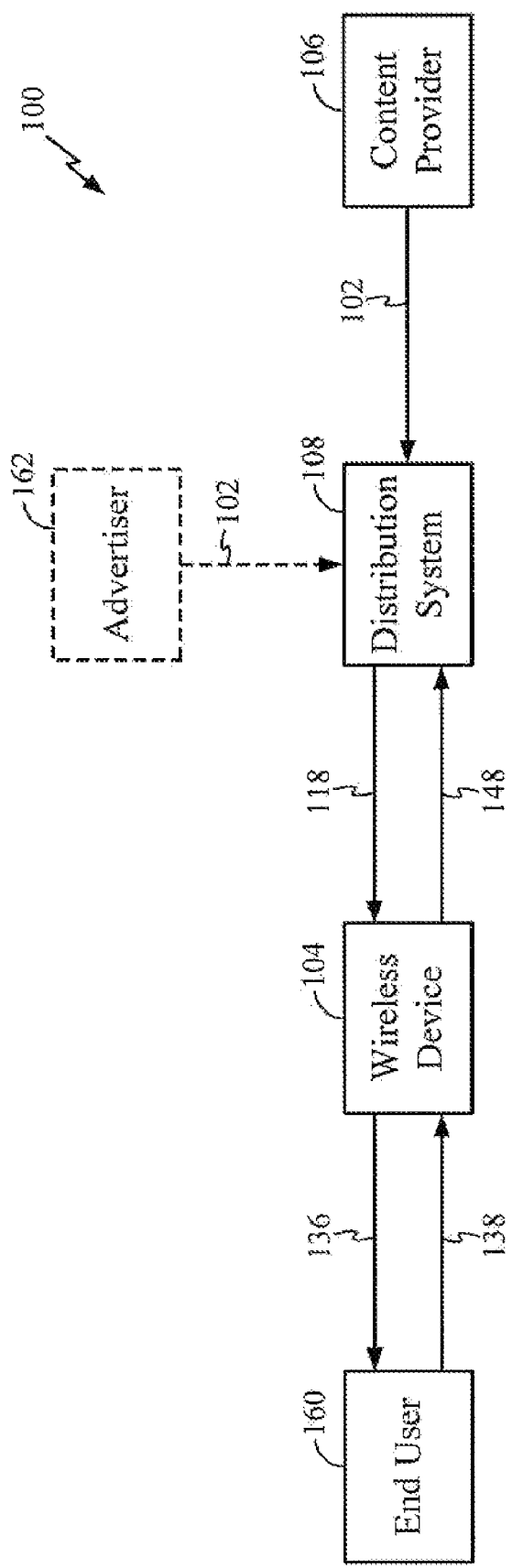
FIG. 4 is a schematic diagram of one aspect of components, including an advertiser, of the system of FIG. 1.

Referring to FIG. 4, in some aspects, because the presentation of each service or channel 154, 156, 158 carried by transmission 118 may attract a large number of end users or consumers 160, system 100 may further include one or more advertisers 162 in communication with distribution system 108. Advertiser 162 comprises an entity desiring to present one more pieces of content 102 (FIG. 1), typically secondary content 138 (FIG. 1), in the form of one or more advertisements to selected end users 160. For example, in this aspect, primary content 136 (FIG. 1) may comprise, but is not limited to, a television show, a video, a movie, a song, etc. Further, for example, secondary content 138 (FIG. 1) may comprise, but is not limited to, an advertisement.

In some aspects, referring to FIGS. 1 and 4, advertiser 162 may interact with distribution system 108 via an advertiser interface 164 to attempt to obtain one or more secondary content spaces or timings 142 within which to present one or more respective advertisements. For example, advertiser 162 may provide secondary content 138 to distribution system 108, or may have content provider 106 deliver secondary content 138. Further, advertiser 162 may individually, or in cooperation with distribution system 108, operate to define a relationship between primary content 136 and secondary content indicator 140, as well as to define one or more secondary content parameters 144. As such, advertiser 162 may at least partially configure program or presentation 134 so as to cause content selector 120 to pick one or more pieces of secondary content 138 for inclusion therein, where the selected one or more pieces of secondary content 138 have one more predetermined content metadata 112 corresponding to attributes desired by advertiser 162. Further, either individually or in combination with distribution system 108, advertiser 152 may define one or more selection parameters 122, such as content filter 123, to use with respect to each secondary content indicator 140 so as to cause content selector 120 to pick one or more pieces of secondary content 138 having one more predetermined content metadata 112 corresponding to attributes desired by advertiser 162. As such, in some aspects, advertiser 162 may purchase a right to have predetermined content presented in a given secondary content space or timing 142. In other aspects, however, advertiser 162 may provide content 102 in the form of advertising to distribution system 108, and may pay a fee based on the actual consumption of each respective advertisement as determined by each report 148 from each tracking/reporting module 146.

Referring back to FIG. 1, first network 110 and second network 116 provide respective communication links between the various components and/or entities of system 100. In some aspects, first network 110 and second network 116 may comprise independent networks, while in other aspects they may comprise inter-related networks. Generally, first network 110 and second network 116 each may comprise any one or any combination of one or more data networks and/or one or more communications networks. For example, in some aspects, first network 110 may comprise a public communications network, such as the Internet, and second network 116 may comprise a subscription based one-to-many network, such as a multicast network such as a Forward Link Only (FLO) network, including the MediaFLO™ System available from Qualcomm, Inc. of San Diego, Calif. In other aspects, first network 110 and second network 116 may include one or a combination of other networks, such as: a digital video broadcasting (DVB) network, such as DVB-S for satellite, DVB-C for cable, DVB-T for terrestrial television, DVB-H for terrestrial television for handhelds; a terrestrial telephone network; a satellite telephone network; an infrared network such as an Infrared Data Association (IrDA)-based network; a short-range wireless network; a Bluetooth® technology network; a ZigBee® protocol network; an ultra wide band (UWB) protocol network; a home radio frequency (HomeRF) network; a shared wireless access protocol (SWAP) network; a wideband network, such as a wireless Ethernet compatibility alliance (WECA) network, a wireless fidelity alliance (Wi-Fi Alliance) network, and a 802.11 network; a public switched telephone network; a public heterogeneous communications network, such as the Internet; a private communications network; and land mobile radio network.

Further, examples of telephone networks that may be included in some aspects of first network 110 and/or second network 116 include one, or any combination, of analog and digital networks/technologies, such as: code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1X) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Figure 5:
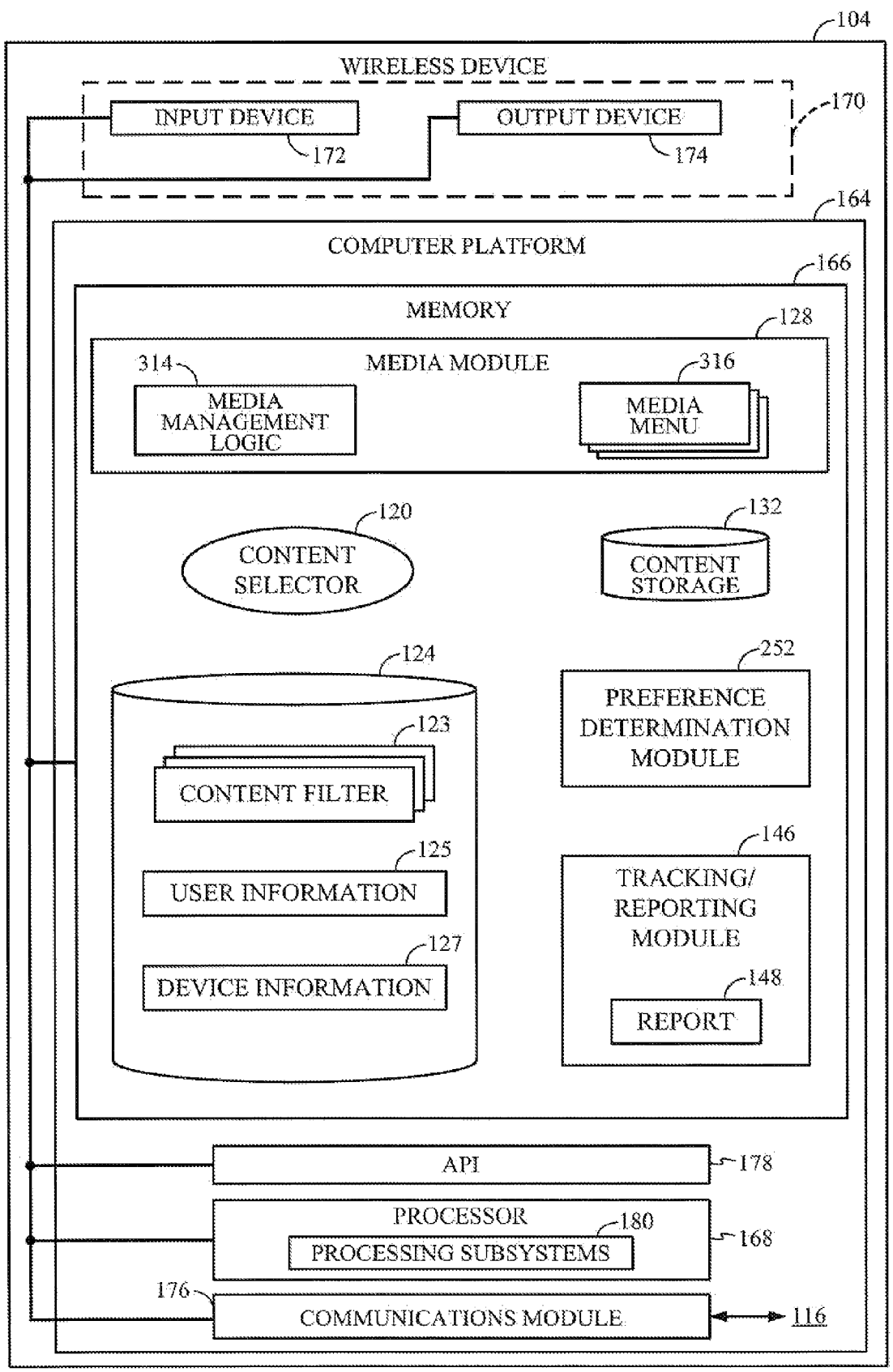
FIG. 5 is a schematic diagram of one aspect of the wireless device of FIG. 1.

Referring to FIGS. 1 and 5, each wireless device 104 of system 100 is operable to access second network 116 in order to receive transmission 118 and/or to communicate with distribution system 108.

Specifically referring to FIG. 5, each wireless device 104 may comprise a computer platform 164 having a memory 166 operable to store data, logic and applications executable by a processor 168. A user may interact with wireless device 104 and its resident applications via one or more user interfaces 170, which may include one or more input devices 172 and one or more output devices 174. Additionally, wireless device 104 may exchange communications with external devices and/or networks via a communications module 176.

It should be noted that although wireless devices 104 may be illustrated as cellular telephones, any number and combination of types of wireless devices 104 may be included in system 100. For example, wireless device 104 may include, but is not limited to, a cellular telephone, a Personal Digital Assistant (PDA) a laptop computer, a two-way pager, a portable gaming device, a portable music device, or any type of computerized, wireless device. The present apparatus and methods can accordingly be performed on any form of wireless device or computer module, including a wired or wireless communication portal, including without limitation, wireless modems, PCMCIA cards, access terminals, personal computers, telephones, or any combination or sub-combination thereof.

Computer platform 164 is operable to transmit data across a network, such as first network 110 (FIG. 1) and/or second network 116 (FIG. 1), and is operable to receive and execute routines and applications and optionally display data generated within wireless device or received from any network device or other computer device connected to the network or connected to wireless device 104. Computer platform 164 may be embodied in, for example, one or any combination of hardware, firmware, software, data and executable instructions.

Memory 166 may comprise one or any combination of volatile and nonvolatile memory, such as read-only and/or random-access memory (RAM and ROM), EPROM, EEPROM, flash cards, flash memory cells, an electronic file system, and any memory common to computer platforms. Further, memory 166 may include one or more of any secondary or tertiary storage device, such as magnetic media, optical media, tape, or soft or hard disk, including removable memory mechanisms.

Further, processor 168 may be one or more of an application-specific integrated circuit ("ASIC"), a chipset, a processor, a logic circuit, and any other data processing device. In some aspects, processor 168, or other processor such as an ASIC, may execute an application programming interface (API) layer 178 that interfaces with any resident programs stored in memory 166 of wireless device 104. API 178 is typically a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Additionally, processor 168 may include various processing subsystems 180 embodied in hardware, firmware, software, data, executable instructions and combinations thereof, which enable the functionality of wireless device 104 and the operability of wireless device on network 116. For example, processing subsystems 180 allow for initiating and maintaining communications, and exchanging data, with distribution system 108 and/or other networked devices. In aspects in which the wireless device 104 is defined as a cellular telephone, for example, processor 168 may additionally include one or a combination of processing subsystems 180, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, vocoder, messaging, graphics, USB, multimedia, etc. For the disclosed aspects, processing subsystems 180 of processor 168 may include any subsystem components that interact with applications executing on computer platform 164 that enable the functionality described herein. For example, processing subsystems 180 may include any subsystem components that receive data reads and data writes from API 178 on behalf of content selector 120.

Further, communications module 176 may be embodied in hardware, firmware, software, data, executable instructions and combinations thereof, and is operable to enable communications among the various components of wireless device 104, as well as between wireless device 104 and first network 110 and/or second network 116. For example, in cellular telephone aspects, communication module 176 may include the requisite hardware, firmware, software, data, executable instructions and combinations thereof, including transmit and receive chain components for establishing a wireless communication connection.

Further, for example, communication module 176 is operable to receive the plurality of content 102 and the associated respective one or more content metadata 112, if any, from distribution system 108 and forward them to content selector 120 or provide content selector 120 with access to them. Similarly, for example, communication module 176 is operable to receive the one or more selection parameters 122 and either forward them to content selector 120 or provide content selector 120 with access to them. Subsequently, for example, communications module 176 is operable to forward selected content 126, respectively, to other device components for further processing.

Additionally, one or more input devices 172 for generating inputs into wireless device, and one or more output devices 174 for generating information for consumption by the user of the wireless device. For example, input device 172 may include a mechanism such as a key or keyboard, a navigation mechanism, a mouse, a touch-screen display, a microphone in association with a voice recognition module, etc. In certain aspects, input device 172 provides an interface for receiving user input, such as to activate or interact with an application or module on the wireless device. Further, for example, output device 174 may include a display, an audio speaker, a haptic feedback mechanism, etc. Further, user interface 170 may comprise one or any combination of input devices 172 and/or output devices 174.

Figure 6:
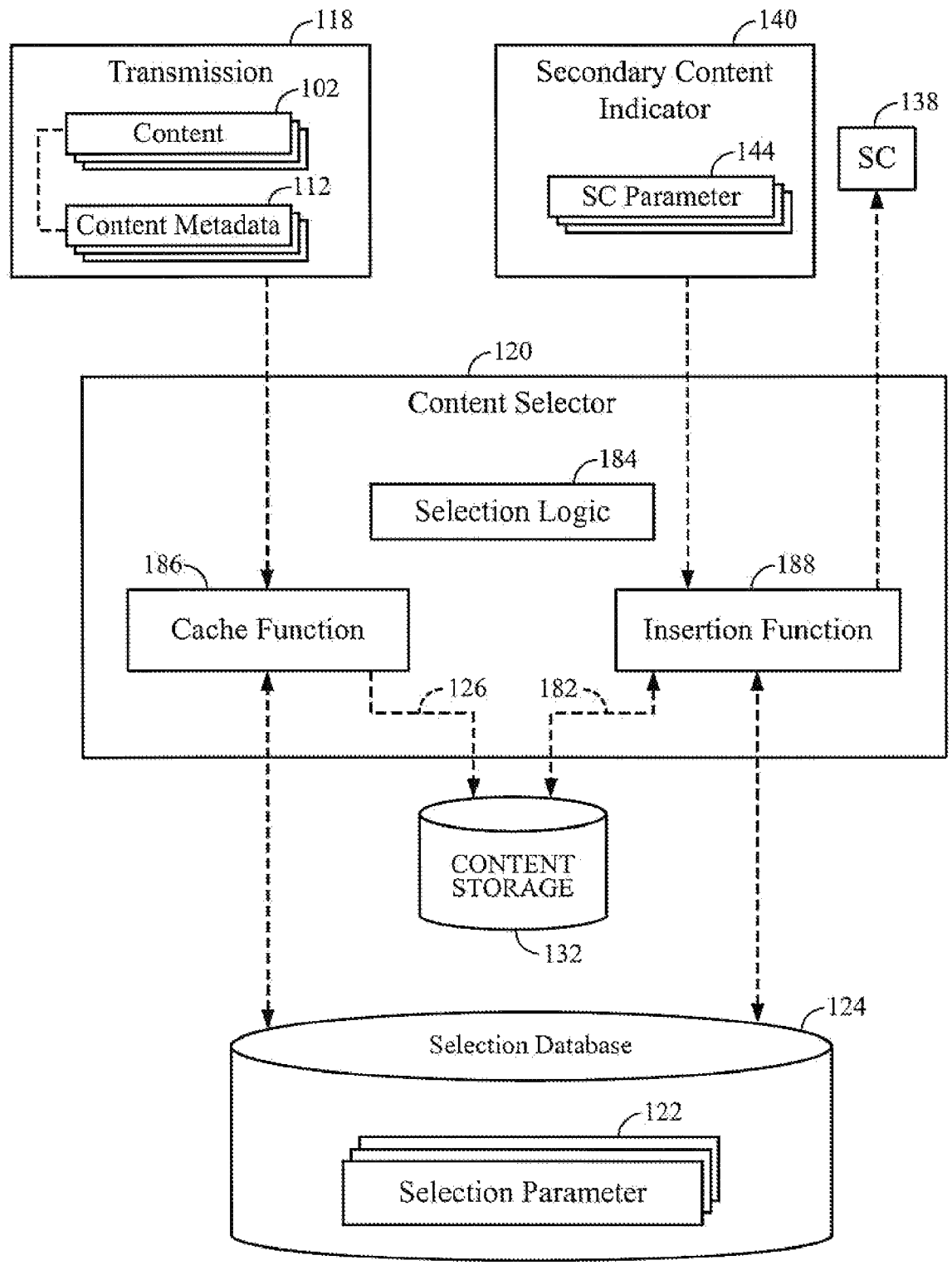
FIG. 6 is a schematic diagram of one aspect of the content selector of FIG. 1.

Additionally, referring to FIGS. 5 and 6, computer platform 164 further includes content selector 120 operable to extract and cache selected content 126 likely to be of interest to the respective device user from transmission 118 of the plurality of content 102, and operable to retrieve and include chosen ones 182 of selected content 126 for generation in program or presentation 134. Content selector 120 may be embodied, for example, in one or more of hardware, firmware, software, data, executable instructions and combinations thereof. Further, content selector 120 may comprise selection logic 184 operable to manage, perform and/or initiate all or at least some portion of the selection-related activities discussed herein. Additionally, in some aspects, content selector 120 may comprise a client application and/or a client agent associated with distribution system 108.

In particular, selection logic 184, such as algorithms, rules, fuzzy logic, neural networks, heuristic relationships, decision-making routines, etc., may be operable to determine correspondence between a respective content metadata 112 (FIG. 1) associated with one of the plurality of content 102 and/or associated with selected content 126 and the respective corresponding one or more selection parameters 122 and/or secondary content parameters 144 (FIG. 1). In some aspects, for example, the correspondence between one or more content metadata 112 and one or more selection parameters 122 may comprise a likelihood and/or percentage of a match, where correspondence may be determined by achieving a predetermined threshold condition. Further, in some aspects, based on an identified correspondence, selection logic 184 may initiate the storage and/or presentation of selected content 126, such as based on a user input, a secondary content indicator 140 and/or on the content type, e.g. real-time, non-real-time, and content for presentation within other content, etc., which may be identified by the one or more content metadata 112 and/or secondary content parameters 144.

In some aspects, content selector 120 may include a cache function 186 and an insertion function 188 to respectively perform the selection-related activities associated with choosing content for storage or for presentation. For example, cache function 186 is operable to access selection database 124 to retrieve predetermined selection parameters 122, and then is further operable to access transmission 118 to identify and choose for caching selected ones of the plurality of content 102, e.g. selected content 126, according to guidelines defined by selection parameters 122. In particular, cache function 186 may include logic or any other type of decision-making mechanism operable to filter selected content 126 from plurality of content 102 based on evaluating content 102 via one or more corresponding content metadata 112 in light of one or more content selection parameters 122. Thus, cache function 186 operates to extract selected content 126 from transmission 118 and cache selected content 126 in content storage 132.

Further, responsive to secondary content indicator 140, insertion function 188 is operable to access selection database 124 to retrieve predetermined selection parameters 122, and then is further operable to access content storage 132 to identify and choose for inclusion with program or presentation 134 (FIG. 1) chosen ones of selected content 126 according to guidelines defined by selection parameters 122. In particular, insertion function 188 may include logic or any other type of decision-making mechanism operable to filter chosen content 182 from selected content 126 based on evaluating selected content 126 via one or more corresponding content metadata 112 in light of one or more content selection parameters 122. Thus, insertion function 188 operates to extract chosen content 182 from selected content 126 and forward chosen content 182, such as in the form of secondary content 138, to media module 128 (FIG. 1) and/or output device 130 (FIG. 1) for inclusion in program or presentation 134 (FIG. 1).

Figure 7:
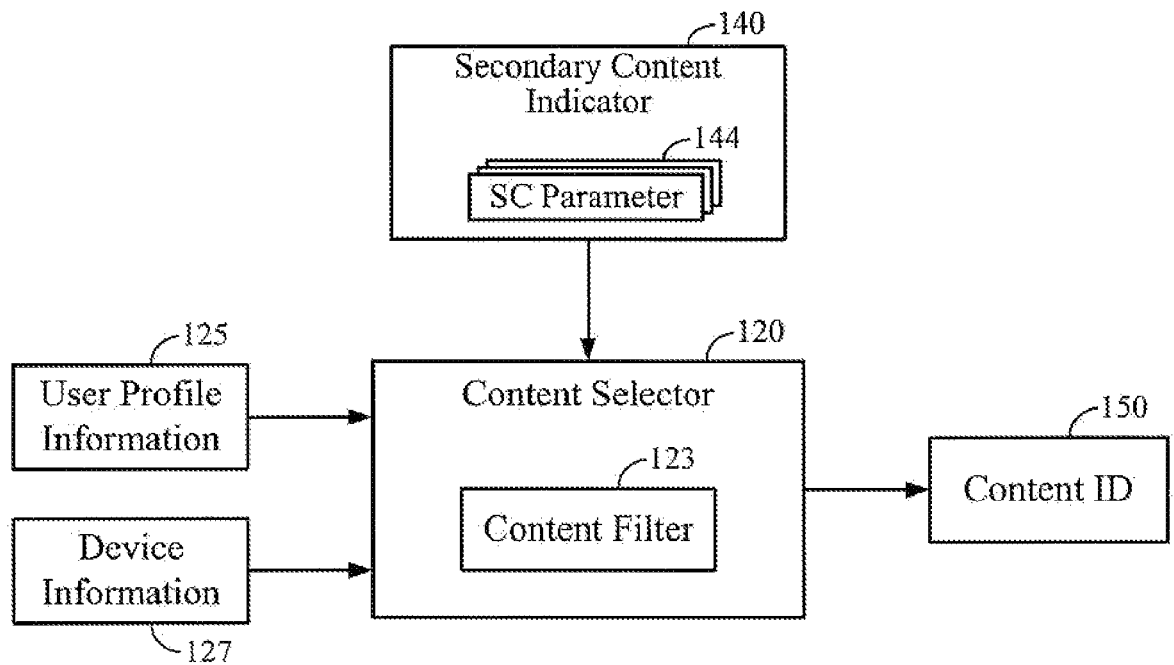
FIG. 7 is a schematic diagram of another aspect of the content selector of FIG. 1.

Referring to FIG. 7, for example, in some aspects content selector 120 receives a request, which may include request parameters, from an application for content. For example, the request for content may comprise secondary content indicator 140 having secondary content parameters 144. Content selector 120 references one or more selection parameters 122, which may include (i) user information 125, which may provide data on user preferences, (ii) device information 127, which may provide relevant device state data such as time of day, and (iii) content filter 123, which may be defined by one of secondary content parameters 144 and which may provide rules for determining a match. For example, secondary content parameters 144 may include one or any combination of a content ID 150, a category, a name, a content length, a content type, a code, an identifier, a theme, a genre, an intended audience and/or market, a related audience and/or market, a primarily-associated type of product and/or service, a secondarily-associated type of product and/or service, a program-level content description or theme describing a portion of the associated content, a script defining a content filter rule or attribute, a number of units or pieces of desired secondary content, an order of presentation of one or more desired secondary content, and/or any metadata relating to the corresponding content. Based on this information, content selector 120 is operable to evaluate content metadata 112 and return one or more content IDs 150 for matching content.

Referring back to FIG. 5, as mentioned, content selector 120 interacts with one or more components of selection database 124 having one or more selection parameters 122 in order to identify and choose content. For example, in some aspects content selector 120 may utilize one or more selection parameters 122 comprising one or more of a plurality of content filters 123, which define rules and/or attributes to control the customized storage and/or display of selected content 126. Further, for example, in some aspects content selector 120 may utilize one or more selection parameters 122 comprising one or more portions of user information 125, which includes data or profiles specifically related to one or more users of wireless device 104. Still further, for example, in some aspects content selector 120 may utilize one or more selection parameters 122 comprising one or more portions of device information 127, which includes data or state information specifically related to wireless device 104. In other aspects, content selector 120 may utilize one or more selection parameters 122 comprising any combination of content filter 123, user information 125 and device information 127.

Figure 8:
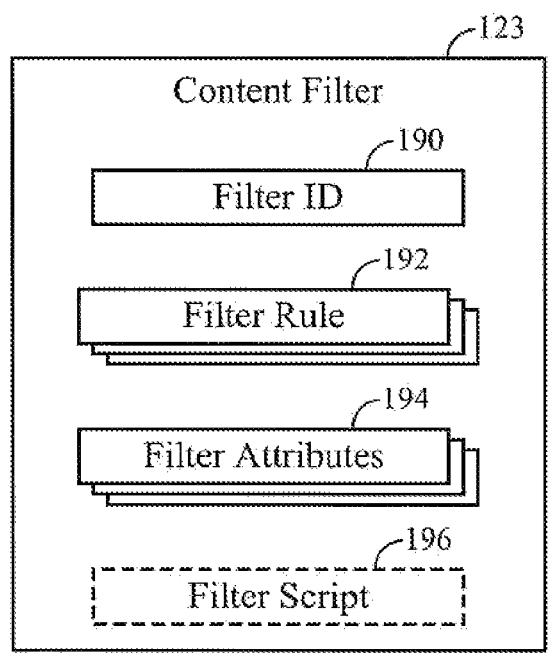
FIG. 8 is a schematic diagram of one aspect of the content filter of FIG. 1.

Referring to FIGS. 5 and 8, each content filter 123 may comprise a filter identifier (ID) 190 that allows for the unique identification of the content filter. For example, filter ID 190 may include, but is not limited to, one or any combination of a name, a number, a letter, a symbol, a file name, a path name, etc. In some aspects, associated with filter ID 190 may be one or more filter rules 192 and/or one or more filter attributes 194, both of which define the structure and behaviors of content and the inter-relation between presented content, such as for synchronizing their presentation. In other aspects, the behaviors and/or parameters associated with the respective content filter 123 may be defined in one or more filter scripts 196, which is a set of executable instructions that define the structure and behaviors of content and the inter-relation between presented content, such as for synchronizing their presentation. In yet other aspects, content filter 123 may comprise a combination of filter rules 192, filter attributes 194 and filter scripts 196. Each of the respective filter rules 192, filter attributes 194 and filter scripts 196 may utilize parameters available in portions of user information 125 and device information 127, as well as from distribution system 108, such as content metadata 112, secondary content parameters 144, and information available in a service guide that lists the channels/services and the schedules of presentation of various content. For example, content filter 123 may utilize: content-related metadata such as: <medium-value-spot>, <car-racing-in-primary-content>, <action-movie>, <sci-fi-movie>; user information-related metadata and preferences, such as: <Female>, <age: 30-40>, <sci-fi>; and secondary content parameters such as: <SC1>:<new model car>, <target audience: young adult>; <SC2>:<car racing program>, <value: low to medium>; <SC3>:<target audience: adult>, target audience: sci-fi-fan>, <new movie ad>, <value: medium to high>. Thus, each content filter 123 may compile a plurality of rules, attributes, and/or scripts, such as from any combination of the sources described above, and is executable by content selector 120 to match the respective content metadata 112 associated with content 102 and/or selected content 126.

Further, the components of each content filter 123 may by dynamic and/or static, or some combination of both. Further, one or more components of each content filter 123 may offer guidance on the precedence of each filter rule 192 and/or filter attribute 194, which may allow the various factors to be weighted to tune each content filter 123 to achieve a desired matching result. Additionally, the execution of each content filter 123 by content selector 120 may result in more than one piece of content that qualifies as a match. As such, filter rules 192 and/or filter attributes 194 may define mechanisms to choose between such matching content, such as a first matching result or a best fit matching result based on relatively quantifying each match, such as comparing matching factors.

In some aspects, for example, filter rules 192 may be expressed in rule blocks or rules sets. For example, content filter 123 may have filter rules 192 based on parameters found in user information 125, as follows:

---
Filter-1:

If <gender = M> AND <user-profile = "outdoors-person">
   Then insert Content1; and
If <age = teenager> AND <user-profile = "sports-fan">
   Then insert Content2.

--- where "gender", "age" and "user-profile" comprise fields within user information 125, and where "M", "outdoors-person", "teenager" and "sports-fan" comprise user data characterizing the respective fields, and where "Content1" and "Content2" comprise respective content IDs 150. Further, for example, content filter 123 may have filter rules 192 based on parameters found in user information 125 and content metadata 112, as follows:

---
Filter-2:

If <user-interest = "skiing"> AND <ad-spot-val = "high">
   Then insert Content1
If <user-interest = "racing"> AND <ad-content-type = "car-chase">
   Then insert Content2

--- where "user-interest" comprises a field within user information 125, where "skiing" and "racing" comprise user data characterizing the respective user information field, where "ad-spot-val" and "ad-content-type" comprise fields for content metadata 112, where "high" and "car-chase" comprise content metadata characterizing the respective fields of content metadata, and where "Content1" and "Content2" comprise respective content IDs 150.

Figure 9:
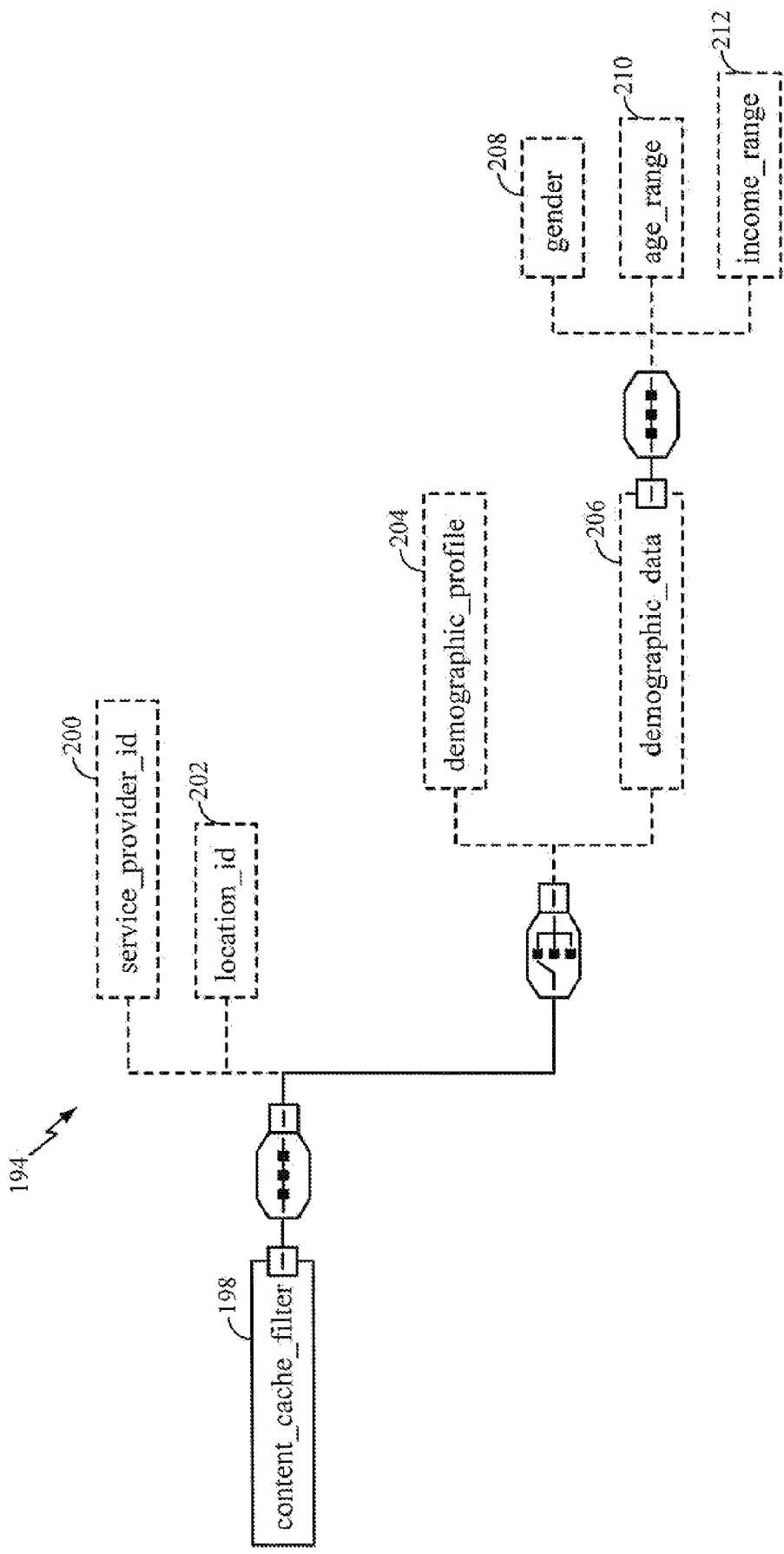
FIG. 9 is a schematic diagram of one aspect of a content cache filter portion of the content filter of FIG. 1.

Additionally, in some aspects, each content filter 123 may be associated with one of caching content for storage on wireless device 104 or selecting content for inclusion with program or presentation 134 (FIG. 1). Referring to FIG. 9, for example, a content cache filter 198 may include filter attributes 194 to associate the filter with a targeted service provider and/or with a targeted location, such as a service provider identifier (ID) 200 and location identifier (ID) 202. Both service provider ID 200 and location ID 202 allow for the unique identification of the content filter. For example, each of IDs 200 and 202 may include, but are not limited to, one or any combination of a name, a number, a letter, a symbol, a file name, a path name, etc. Further, content cache filter 198 may include filter attributes 194 relating to a targeted demographic, such as based on a demographic profile 204 and/or demographic data 206, such as gender 208, age range 210 and income range 212.

Figure 10:
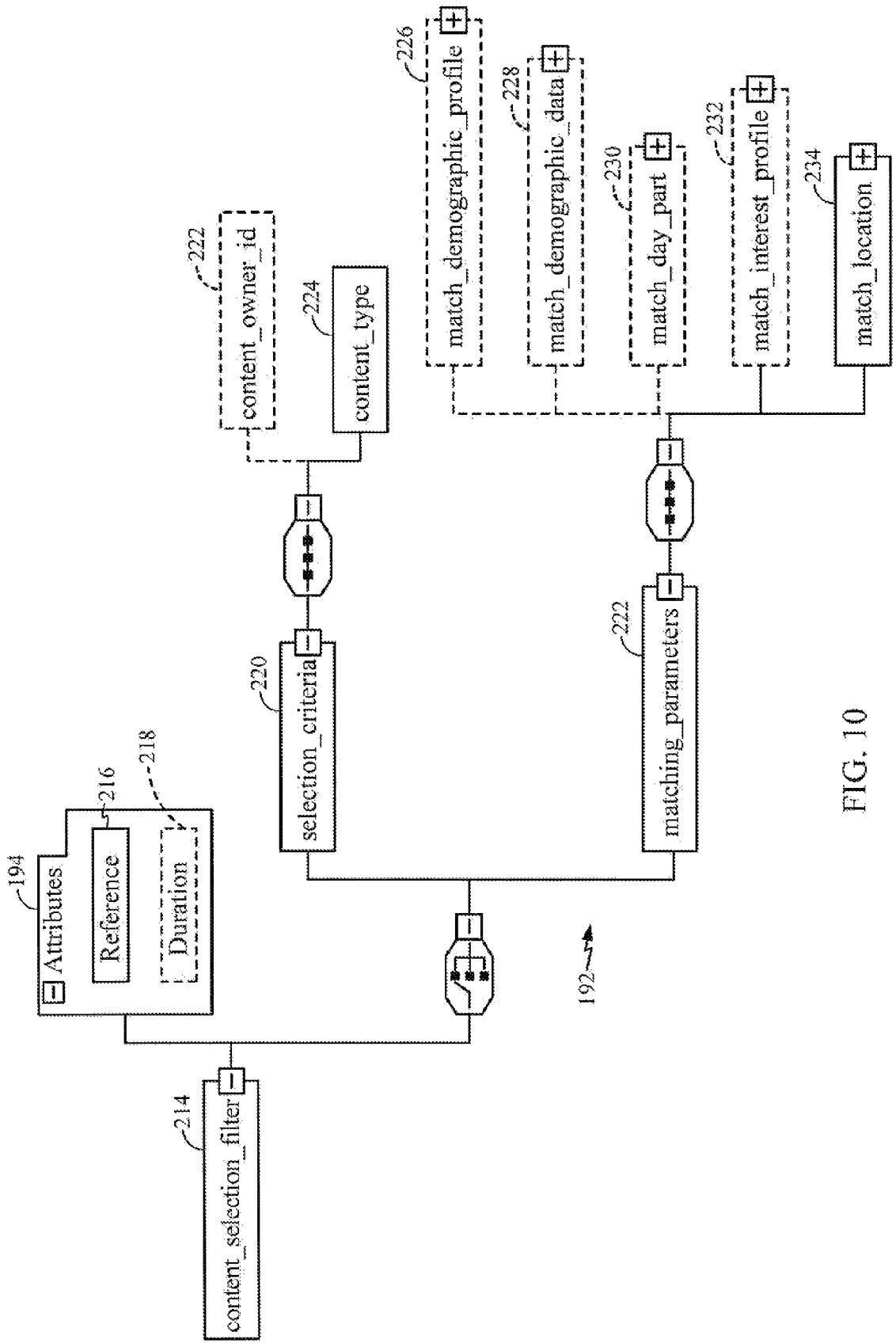
FIG. 10 is a schematic diagram of one aspect of a content selection filter portion of the content filter of FIG. 1.

Referring to FIG. 10, for example, a content selection filter 214 may include filter attributes 194 such as a reference 216, which may be a name by which the selected content will be referred, and a duration 218, which may define a length of the selected content, such as in seconds. Further, content selection filter 214 may include filter rules 192 such as selection criteria 220, which are required characteristics of the selected content, and matching parameters 222, which are characteristics that the selected content should match as closely as possible. For example, selection criteria 220 may include a content owner identifier (ID) 224, such as a name, letter, number, code, etc. identifying content provider 106 (FIG. 1) or advertiser 162 (FIG. 4). Further, for example, selection criteria 220 may include a content type 224, such as the media type of the selected content, e.g. audio, video, etc. Further, matching parameters 222 may include one or more of each of: a match demographic profile 226; a match demographic data 228; a match day part 230, which defines the targeted time of day and/or week; a match interest profile 232, which targets user interests; and a match location 234, which defines a targeted location of the user, such may be based on a geographic position, or by location information derived from network components, such as a network device associated with second network 116 and/or distribution system 108.

Figure 11:
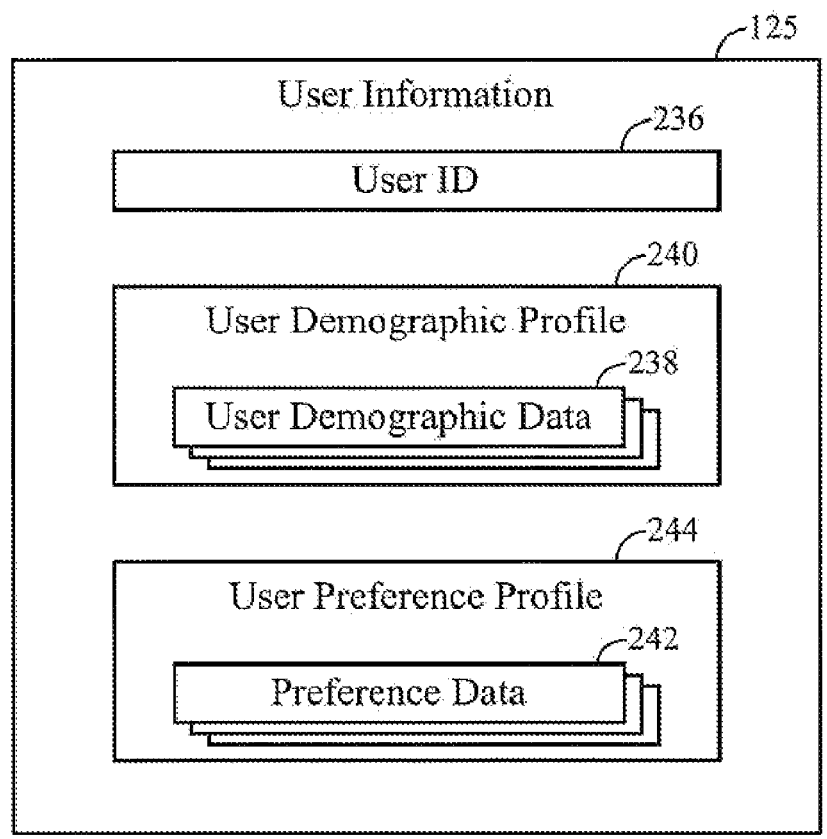
FIG. 11 is a schematic diagram of one aspect of the user information of FIG. 1.

Referring to FIGS. 5 and 11, user information 125 may comprise any data relating to a user of wireless device 104. Each wireless device 104 may include one or more sets of user information 125, where each set may correspond to a different user of wireless device 104. In some aspects, for example, user information 125 comprises a user identifier (ID) 236, such as a name, letter, number, code, etc., to uniquely identify the respective user information. Further, user information 125 may comprise one or more user demographic data 238, which may be compiled into a representative user demographic profile 240. For example, user demographic data 238 may include, but is not limited to, data such as gender, age, income, and other similar types of information that may be used to characterize a demographic into which the user may be classified. Additionally, user information 125 may include one or more user preference data 242, which may be compiled into a user preference profile 244. User preference data 242 may be data received from the user, or may be derived from user interactions with wireless device 104. As will be discussed in more detail below, a preference determination module 246, in some instances in combination with tracking/reporting module 146, may be operable to generate and update user preference data 242 and/or user preference profile 244. User preference data 242 may be descriptors that define interests of the respective user, which may correspond to content metadata 112 (FIG. 1) and/or secondary content parameters 144 (FIG. 1).

Figure 12:
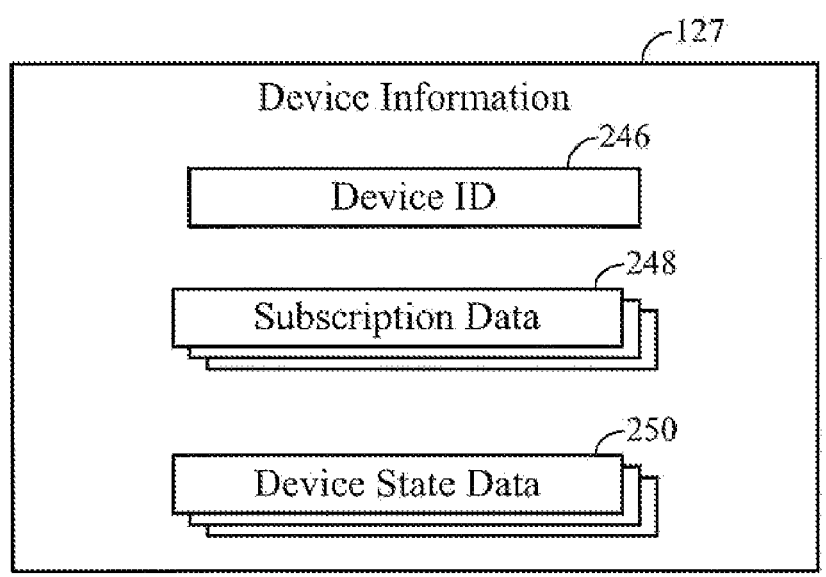
FIG. 12 is a schematic diagram of one aspect of the device information of FIG. 1.

Referring to FIGS. 5 and 12, device information 127 may comprise any data relating to the specific wireless device 104. In some aspects, for example, device information 127 comprises a device identifier (ID) 246, such as a name, letter, number, code, etc., to uniquely identify the respective user information. For example, device ID 246 may include a mobile identification number (MIN), a serial number corresponding to a hardware and/or software component resident on wireless device 104, a version number corresponding to the hardware and/or software component, and any other data operable to identify wireless device 104. Further, device information 127 may comprise one or more subscription data 248, which may provide subscriber information and authentication information corresponding to one or more distribution systems 108 (FIG. 1), and/or one or more channels or services 154, 156, 158 (FIG. 3). For example, subscription data 248 may comprise a removable identify module (RUIM), a subscriber identity module (SIM), a universal subscriber identity module (USIM), an Internet protocol identity services module (ISIM), a name, an account number, a key, or another other data associating the user or the wireless device with a given channel and/or service. Additionally, device information 127 may comprise one or more device state data 250, which define a state relating to the respective wireless device 104 and/or a wireless device hardware or software component. For example, device state data 250 may include a time, such as a time of day and/or a time of week/month/year, a location, such as a geographic location based on information from a global positioning system (GPS) and/or a network-related location based on information from the network, such as a base station or distribution system transmitter with which the wireless device is in communication or an assisted-GPS system, a status of an application executing on the wireless device, a status of a hardware component on the wireless device, a channel being watched, a portion of an application being utilized or executing, etc. In some aspects, device state data 250 may be received from one or more processing subsystems 180 continuously, at some predetermined interval, or upon the occurrence of a predetermined event, such as upon start up or upon a change in state.

Selection parameters 122 within selection database 124 may be dynamic and/or static parameters. For example, one or more selection parameters 122 may be updated continuously, at some predetermined interval, or upon the occurrence of a predetermined event, by one or a combination of preference determination module 252 and tracking/reporting module 146. Further, transmission 118 may be operable add, change and/or delete one or more selection parameters 122.

Figure 13:
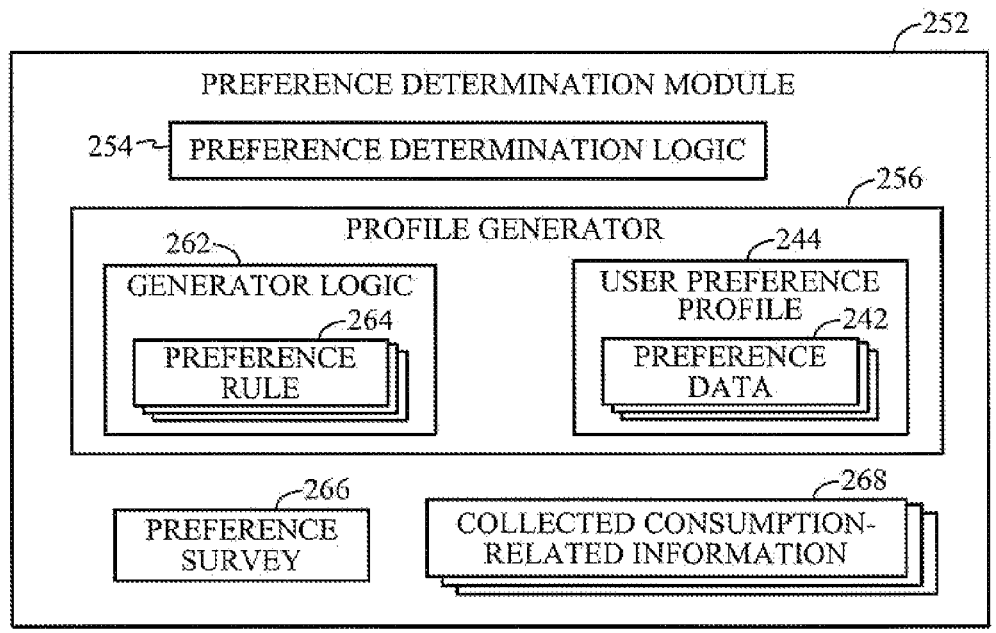
FIG. 13 is a schematic diagram of one aspect of the preference determination module of FIG. 5.

Referring to FIGS. 5 and 13, for example, preference determination module 252 includes preference determination logic 254 operable to execute a profile generator 256 to generate one or more user preference profiles 258 having one or more user preference data 242. In some aspects, user preference profile 244 and/or preference data 242 may be generated for each user of wireless device 104. The respective user preference data 242 define an aspect and/or a description of content likely to be of interest to the respective user of wireless device 104. Thus, one or more of the respective user preference data 242, and/or the respective user preference profile 244, can be utilized to suggest or recommend new content and programming likely to be of interest to the user of the respective wireless device 104.

In some aspects, for example, profile generator 256 may include generator logic 262 operable to parse, and/or derive and/or predict one or more of the respective user preference data 242 based on, for example, the application of one or more predetermined preference rules 264 to data received from the device user or received from another device component, such as tracking/reporting module 146, processor 168, processing subsystems 180, etc. For instance, in some aspects, generator logic 262 applies one or more preference rules 264 to data within a preference survey 266, which may comprise a questionnaire completed by the device user. For example, preference survey 266 may identify predetermined content preference categories among which a user may select categories of interest. The categories may include broad descriptive categories, and one or more subcategories within each category and/or within each subcategory. The selected predetermined content preference categories may then be stored as preference data 242. Alternatively, for example, preference survey 266 may include predetermined, targeted questions designed to elicit device user responses, such as their likes and dislikes, which may be used to determine user preference data 242 and/or user preference profile 244. For example, such predetermined questions may include, but are not limited to, questions such as: "Do you like to go hiking/camping?"; "Do you enjoy international travel?"; and "Do you play games on your PC or game console?". In other alternatives, preference survey 266 may provide a user interface that gives the user the choice of identifying what types of things, such as categories, themes, genres, goods, services, etc., that they like.

Further, in another example of another aspect, generator logic 262 applies one or more preference rules 264 to collected consumption-related information 268 monitored and collected by tracking/reporting module 146. For example, collected consumption-related information 268 relates to what is executing on wireless device, as well as user interactions with the wireless device. The one or more preference rules 264 may include decision-making routines, heuristics, algorithms, formulas, or any other mechanism operable to evaluate one or more user-related or device-related information to generate preference data 242 and/or preference profile 244. Thus, preference determination module 252 can therefore generate one or more preference data 242 and/or preference profile 244 by parsing, drawing conclusions from, and otherwise analyzing received user or device based information.

Further, in some aspects, the self-building properties of preference determination module 252 in constructing user-preference profile 244 and/or preference data 242 provide a mechanism for quickly and accurately defining a new user preference profiles, thereby allowing preference determination module 252 to maintain accuracy of the generated data based on the most recent information.

Additionally, the one or more predetermined preference rules 264 may be configurable and updateable so as to allow easy management of preference determination on one or more devices. In some aspects, one or more preference rules 264 define a relationship between one or more selection parameters 122, such as user information, device information, content consumption behaviors, etc., and content metadata 112.

The following are simple, functional examples of preference rules 264: "If a user watches 'American Chopper' and 'Cops,' store and recommend any content/programming associated with 'motorcycles' and 'law enforcement.' Also, store and send 'advertising' for all kinds of 'motor vehicles.'"; and "If a user watches content/programming associated with 'Martha Stewart,' then store and recommend any content/ programming associated with 'cooking' and 'home improvement.'" In these examples, the terms "American Chopper," "Cops," "motorcycles" and "law enforcement," "advertising," "motor vehicles," "Martha Stewart," "cooking" and "home improvement" are examples of one or both of content metadata 112 and content selection parameters 122. In any case, in some aspects, each preference rule 264 attempts to correlate data that comprises one or more content metadata 112 with the one or more content selection parameters 122.

Further, the respective preference rule 264 may provide an ad hoc definition of one or more selection parameters 122, and/or each selection parameter 122 may correspond to a predetermined preference category that may be identified as part of the respective preference rule 264. For example, in aspects where one or more preference categories are predetermined, preference rule 264 may analyze selection parameters 122 and attempt to correlate this information with one or more of the predetermined categories. In this case, for example, the correspondence between selection parameters 122 may comprise a likelihood and/or percentage of a match to a given predetermined preference category, where a correspondence may be determined by achieving a predetermined threshold condition, e.g. if greater than 50% likelihood, then associate user with this preference. As such, each preference rule 264 may include one or any combination of an algorithm, a decision-making routine, fuzzy logic, a heuristic relationship, a neural network, etc. operable to define and/or predict relationships between user preference-related information and preference data.

Further, one or more predetermined preference rules 264, and correspondingly the generated selection parameters 122, may be associated with a content source, such as a service and/or channel, and/or a predetermined content metadata 112, thereby allowing different preference decisions to be made depending on the source and/or type of content. For example, sources of content may supply widely varying types of content, and some selection parameters 122 may span the whole array of content sources and/or types, while other selection parameters 122 may be source- and/or type-specific.

In another example, one or more predetermined preference rules 264, and correspondingly the generated selection parameters 122, may be associated with a geographic location, which may be tracked as part of device information 177. In one aspect, for example, through interacting with device information 127 and/or a location-determining portion of processing subsystems 180, preference determination module 252 may track locations, and corresponding location identification information, visited by wireless device 104. For example, location identification information may include a business name, a business type, etc, as well as additional information associated with the location, such as an event name, an event type, etc. Further, preference determination logic 254 and/or preference rules 264 may be operable to generate user preference data based on a frequency and/or trend associated with wireless device location. For example, if the device user, carrying wireless device 104, visits a sports store more than once in a 30 day period, then preference determination module 252 is operable to add one or more sporting categories to the corresponding user preference profile 244. Similar preference data could be generated for visits to nightclubs, sports stadiums, concerts, movies, etc., not limited to merely the physical building or place, but also including the event occurring in the place at the time the device was at the location.

In another aspect, for example, preference determination module 252 may track user interactions with wireless device 104 as a function of location. As such, different preference rules 264 may apply when wireless device 104 is at a location designated as "home" as opposed to a location designated as "work." In another example, different preference rules 264 may be enabled when wireless device 104 is in the vicinity of a predetermined site, such as a business, a shopping mall, an amusement park, a historical site, a government property, an airport, a bus or train station, etc.

Further, as previously noted, preference profile 244 and/or preference data 242 may be generated for each user of wireless device 104, and because they are based on user-specific and/or device-specific information, they may vary from device to device and from user to user depending on user preferences.

Additionally, in some aspects, to address concerns regarding privacy and user profiling invasiveness, the respective preference profile 244 and/or preference data 242 may be generated automatically on wireless device 104, within the profile generator 256, without allowing any exposure of the respective preference profile 244 and/or preference data 242 to any external party. In these aspects, the respective preference profile 244 and/or preference data 242 remains on wireless device 104, such as in a non-persistent memory, and may be lost, for example, if the memory were erased, if the memory losses power, and/or if the wireless device malfunctions. Further, the respective preference profile 244 and/or preference data 242 may be encrypted to provide further security. For example, the respective preference profile 244 and/or preference data 242 may be encrypted such that they only may be accessed by the corresponding content selector 120. Thus, such secured and non-persistent storage of the respective preference profile 244 and/or preference data 242 increases the likelihood of a non-invasive implementation of user profiling, thereby addressing user privacy concerns.

Figure 14:
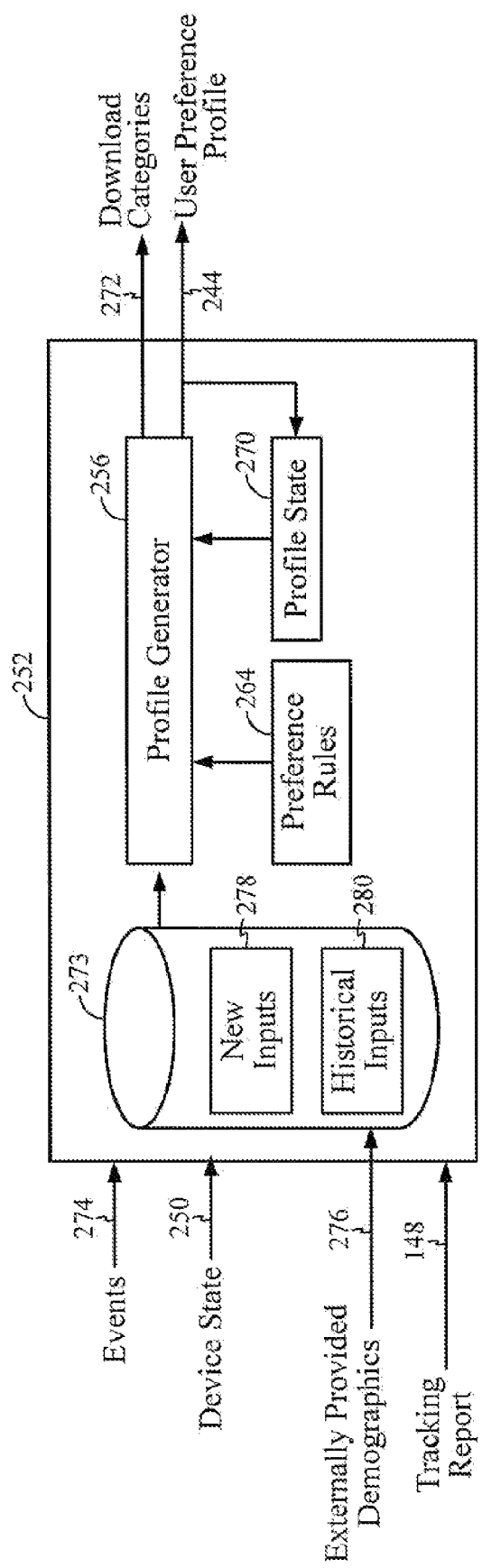
FIG. 14 is a schematic diagram of another aspect of the preference determination module of FIG. 5.

Referring to FIG. 14, in an example of one aspect, preference determination module 252 stores a list of scores for each user in a list of categories, where the stored list of scores defines a profile state 270. Profile state 270 may be forwarded to selection database 124 (FIGS. 1 and 5) as user preference profile 244 for inclusion in user information 125 (FIGS. 1, 5 and 11). For example, user preference profile 244 may include scores, which may be weighted, along a vector of interest categories. Further, preference determination module 252 may forward a list of download categories 272 to content selector 120 (FIGS. 1 and 5) for use in selection of content 102 (FIG. 1) to download to wireless device 104 based on user preferences. For example, the list of download categories 272 may include, but is not limited to, one or more of content metadata, content classes, content identifiers, etc. corresponding to the list of scores defining profile state 270 of the respective user. The respective list of download categories 272 may be identical to the respective user preference profile 244, or the respective list of download categories 272 may be some subset of user preference profile 244, for example, corresponding to areas of highest interest of the respective user. Profile generator 256 is operable to generate profile state 270, user preference profile 244 and list of download categories 272 based on one or more preference rules 264. For example, profile generator 256 may execute continuously, periodically or upon the occurrence of a predetermined event to process accumulated inputs, stored in database 273, to update the scores in the list of scores defining profile state 270. For example, the accumulated inputs may include, but are not limited to, information such as: event data 274 including user actions, click-throughs, web searches, start and stops of videos, start and stops of other applications, etc., which may be received from tracking/reporting module 146 (FIGS. 1 and 5); device state data 250 received from device information 127 (FIGS. 1 and 12) in selection database 124 (FIG. 1) or as received directly from processing subsystems 180 (FIG. 5); externally provided demographics 276 such as age, income, gender, occupation, scores in interest categories, etc., which may be received from user information 125 (FIGS. 1 and 11); and tracking report 148, received from tracking/reporting module 146, which may provide information on the types of content to which the user responds, which situations the user is receptive to consuming which types of content, etc. As such, database 273 may include new inputs 278 corresponding to data received since the last execution of profile generator 256 and historical inputs 280 comprising the accumulated inputs used in the past as inputs to profile generator 256. Additionally, preference rules 264 may include a time weighting function that allows older events stored as historical inputs 280 to be weighted less than newer events, stored as either new inputs 278 or within historical inputs 280, and eventually factored out of the determination. Further, generator logic 262 (FIG. 13) of profile generator 256 may include a user detection algorithm operable to detect multiple people using the same device, such as based on login information and/or user behavior, and thereby maintain separate profiles for each user.

Figure 15:
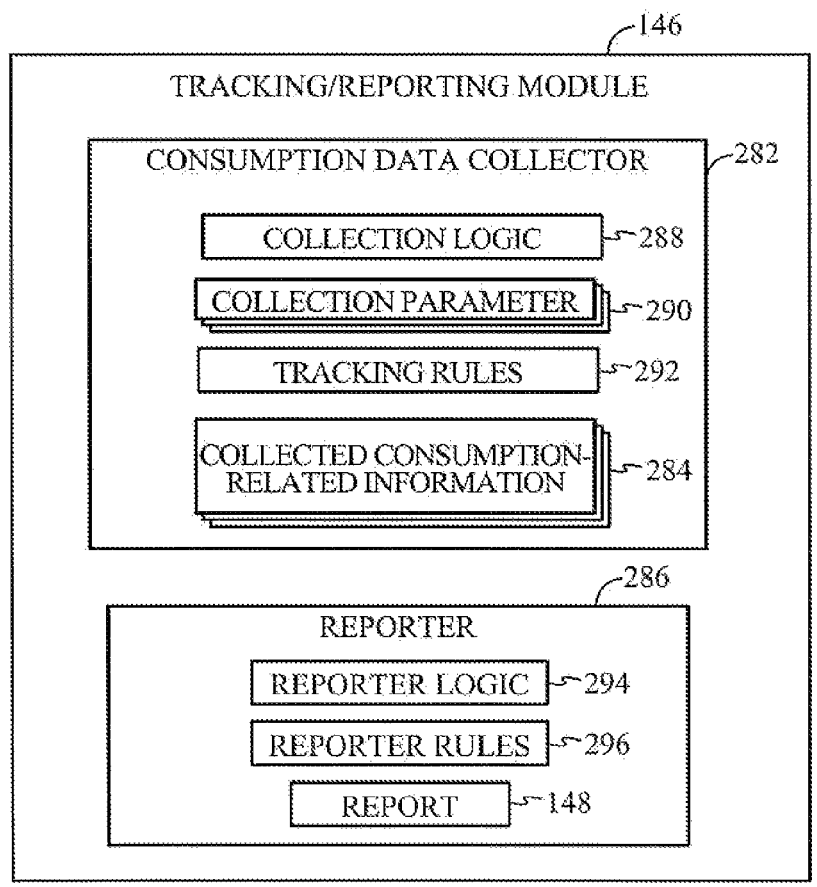
FIG. 15 is a schematic diagram of one aspect of the tracking/reporting module of FIG. 1.

Referring to FIGS. 5 and 15, in one aspect, tracking/reporting module 146 may include a consumption data collector 282 to monitor and collect consumption-related information 284, and a reporter 286 to generate report 148 based on collected consumption-related information 284.

Consumption data collector 282 may gather data resident anywhere on wireless device 104, such as within processor 168 and/or processing subsystems 180, within memory 166, within any module or application, etc. Consumption data collector 282 may be embodied in one or more of hardware, firmware, software, data, executable instructions and combinations thereof. In some aspects, consumption data collector 282 includes collection logic 288 executable by processor 168 to gather collected consumption-related information 284 based on one or more collection parameters 290 and/or one or more tracking rules 292. Collection parameters 290 and/or tracking rules 292 may be associated with one or more preference rules 264 (FIG. 13) of preference determination module 252 (FIG. 13), and identify information resident on wireless device 104 that may be relevant to a determination of a device user content preference based on user interactions with wireless device 104. The one or more collection parameters 290 and/or tracking rules 292 may be established by a party, such as a content retailer, a service provider, content provider 106 (FIG. 1), distributions system 108 (FIG. 1) and/or advertiser 162 (FIG. 4), in control of providing content selector 120 (FIG. 1) to wireless devices or any party interested in providing individually-relevant content to content consuming devices. Alternatively, in some aspects, a device user may be able to control which device-related parameters are monitored for tuning the selectivity of the resident content selector 120 (FIG. 1). Further, for example, one or more collection parameters 290 and/or tracking rules 292 may identify content-consuming behavior, occurring on wireless device 104, to monitor and collect, including what content was consumed, how the content was consumed, when the content was consumed, how long was the time period of the consumption, and corresponding device state information and/or related user interactions.

For example, with regard to monitoring and collecting information relating to what content has been consumed, collection parameters 290 may cause the logging of data such as a content name or content identifier (ID) 150 (FIG. 2), a content type and/or description such as may be defined by one or more content metadata 112, etc.

With regard to how the content was consumed, for example, one or more collection parameters 290 may cause the logging of data such as a hardware component, a software module and/or application utilized to access and/or consume the content. Further, these parameters may cause the logging of any user interaction that caused the content to be consumed, such as clicking on a pop up ad occurring in the middle of the consumption of another piece of content. For example, hardware components include keys and keyboards, displays, audio speakers or microphones, computer chips, etc., while software modules/applications include the software executing to access, manage and/or present the content or to perform other functions occurring on the device during or adjacent to the presentation of the content.

Further, for example, with regard to when and how long the content was consumed, one or more collection parameters 290 may cause the logging of timestamp information, including hour, minute, second, day, and/or date information, corresponding to the initiation and end of any content consumption, or the use of any other application during or adjacent to the consumption of the content. Alternately, this information may be gathered from other applications and/or subsystems that already track information relating to the time and duration of content consumption and/or application usage.

Additionally, for example, with regard to the device state information, one or more collection parameters 290 may cause the logging of predetermined or general activity on the wireless device corresponding to, preceding, and/or following the consumption of content. For example, in order to make a preference determination, it may be relevant to know what non-content consumption related activities are occurring on the wireless device in and/or around the time of the content consuming activities, as these non-content consuming activities may have an affect on content consumption behavior. Such information may be available as device state data 250, which may include any information available on wireless device 104, including processing subsystems 180. For example, besides the status of running components on wireless device 104, device state data 250 may include position/location information, which may be correlated to geographical landmarks and/or location-based events, such as a sporting event occurring at a stadium on a given day and time.

In some aspects, reporter 286 comprises reporter logic 294 operable to obtain collected consumption information 284 and generate report 148 based on applying report rules 296, which define the content and structure of report 148.

Figure 16:
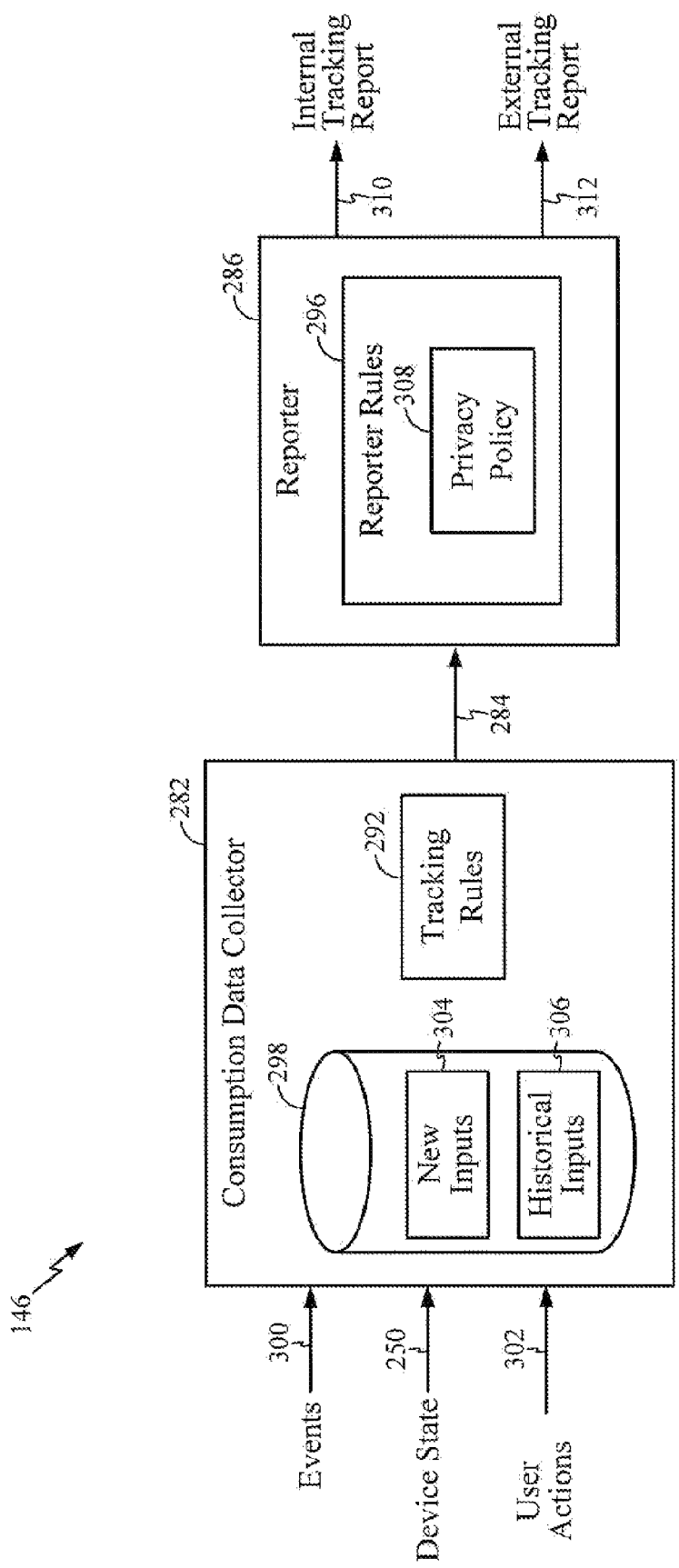
FIG. 16 is a schematic diagram of another aspect of the tracking/reporting module of FIG. 1.

Referring to FIG. 16, in an example of one aspect, tracking/reporting module 146 comprises a database 298 that accumulates data on various events 300, device state data 250 and user actions 302 associated with the consumption of content on wireless device 104 (FIG. 1). For example, in this case, events 300 may include, but are not limited to, actions such as presentations of content, etc. For example, in this case, device state data 250 may include, but is not limited to, time of day, channel being viewed, location, etc. For example, in this case, user actions 302 may include, but are not limited to, actions such as user clicks on universal resource locators (URLs), channel changes, volume adjustments, etc. Such data may be stored as new inputs 304 in database 298, where there also may reside historical inputs 306 from prior tracking and monitoring. Consumption data collector 282 processes these accumulated inputs according to tracking rules 292 to generate collected consumption related information 284. Reporter 286 obtains collected consumption related information 284 and processes it according to report rules 296, which in some aspects may include a privacy policy 308. Privacy policy 308 may comprise one or more rules to determine which data may be private data and which data may be public data. Further, for example, privacy policy 308 may include one or more predetermined private data identifiers and/or predetermined public data identifiers, which identify respective private data and/or public data within report 148. For example, private data may include a device user name, a device user address, an identifier associated with device user or with the wireless device and any other data that has been determined would reveal an identity of the device user and/or the device. Further, for example, public data may comprise general information used to characterize the device user and/or the device, such as demographic data, consumption behaviors, device make and model, and any other non-invasive information relating to device user and/or wireless device. As a result, reporter 286 is operable to generate one or both of an internal tracking report 310 and an external tracking report 312 detailing and/or summarizing the tracked behavior. For example, internal tracking report 310 may contain detailed information with respect to a specific user, while external tracking report 312 may contain more general information based on the removal of device-specific and/or user-specific information based on privacy policy 308. Thus, internal tracking report 310 may include private data, while external tracking report 312 may exclude predetermined private data and/or only include predetermined public data.

Referring back to FIG. 5, content storage 132 is operable to store or cache any content selected by content selector 120 (FIG. 1). Content storage 132 may be any type of memory capable of saving selected content 126 and capable to being accessed for the retrieval of one or more of selected content 126. For example, in some aspects, content storage 132 may comprise an electronic file system, which may include a plurality of storage locations, such as folders, arranged by content type, e.g. applications, music, video, cache, etc., where the respective content may be stored.

Additionally, referring to FIG. 5, computer platform 164 further includes media module 128 operable to manage and present selected content 126. For example, media module 128 may be embodied in one or more of hardware, firmware, software, data, executable instructions and combinations thereof. Further, for example, media module 128 may comprise a client application and/or a client agent associated with distribution system 108.

In some aspects, media module 128 may include media management logic 314 operable to generate one or more of the plurality of media menus 316 suitable for interfacing with a device user to manage selected content 126, including generating the presentation of and/or storing selected content 126 on wireless device 104.

Figure 17:
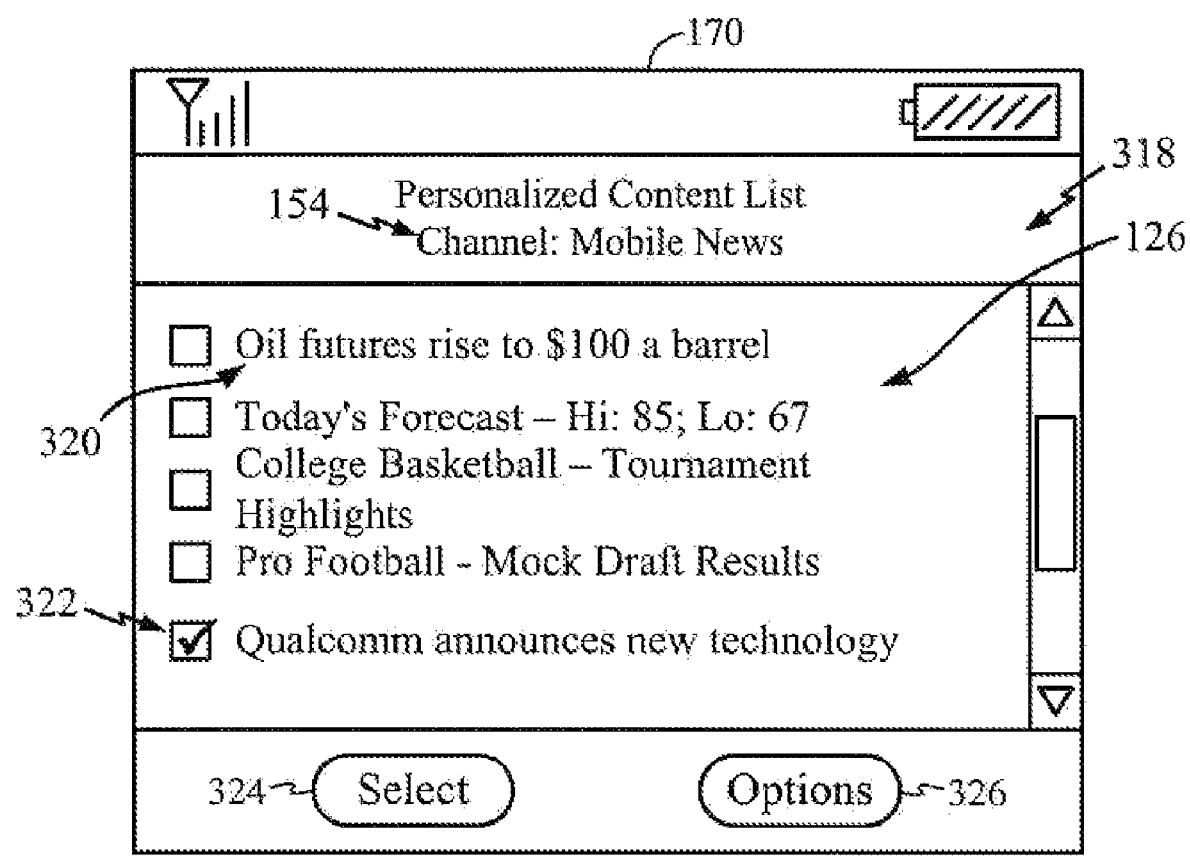
FIG. 17 is a view of one aspect of a personalized content list menu presentable on the wireless device of FIG. 1.

For example, referring to FIG. 17, media management logic 314 may generate a personalized content list menu 318, such as on a display-type user interface 170, that presents the device user with the one or more selected content 126. For example, in some aspects, personalized content list menu 318 lists selected content 126 associated with a respective channel or service 154 (or 156 and/or 158), while in other aspects the list may include selected content from more than one channel or from all channels. Personalized content list menu 318 comprises a personalized or user-preferred list of content based on the wireless device-based matching activity as described above with regard to content selector 120.

For instance, upon initialization of media module 128, media management logic 314 may automatically or in response to a device user input received by input device 172 (FIG. 5) obtain personalized content list menu 318 from the plurality of media menus 316 (FIG. 5) and present it to the device-user. In some aspects, for example, media management logic 314 is operable to locate selected content 126 and parse predetermined information, such as a content identifier (ID) 150 (FIG. 2) and/or content metadata 112 (FIG. 2), such as a name or subject matter associated with the selected content, and present this information 320 to the device-user. In some aspects, it may be desirable for content metadata 112 to comprise content ID 150, or vice versa, while in other aspects it may be desirable for content metadata 112 and content ID 150 to be mutually exclusive. As such, a user may utilize one or more input devices 172 (FIG. 5) to provide a selection indicator 322, such as a highlight, a checkmark, etc., to indicate the selection of one or more of the listed content.

Further, for example, media management logic 314 (FIG. 5) may include selectable functions, such as "Select" virtual button 324 to initialize the execution and presentation of the indicated selection(s), such as via output device 174 (FIG. 5). Additionally, the selectable functions may further include an "Options" virtual button 326 to access other menus, such as a help menu, a content management menu for deleting content and/or adjusting settings, such as a number of content and/or an amount of memory to utilize to save content, a predetermined amount of time to store content, etc.

Referring back to FIG. 5, in other aspects, media management logic 314 may be operable to retain selected content 126 in, or retrieve selected content 126 from, content storage 132, which may provide long-term and/or short-term storage for any selected content 126. For example, long-term storage may be desired for selected content 126 that the device-user desires to retain or desires to execute in the future, while short-term storage may include memory space associated with executing content as well as any other short-term storage.

Content storage 132 may comprise one or any combination of volatile and nonvolatile memory, such as read-only and/or random-access memory (RAM and ROM), electronically programmable ROM (EPROM), electronically erasable programmable ROM (EEPROM), flash cards or flash memory cells, an electronic file system (EFS) and any memory common to computer platforms. Further, content storage 132 may include one or more of any secondary or tertiary storage device, such as magnetic media, optical media, tape, or soft or hard disk, including removable memory mechanisms. Further, as mentioned above, media management logic 314 may manage any storage parameters, such as a number of files, a memory limit, etc., associated with content storage 132.

Thus, as noted previously, through the operations of content selector 120, wireless device 104 is operable to cache and present selected content 126 to a device user, where in some aspects selected content 126 is targeted to the interests and/or preferences of the respective device user.

Figure 18:
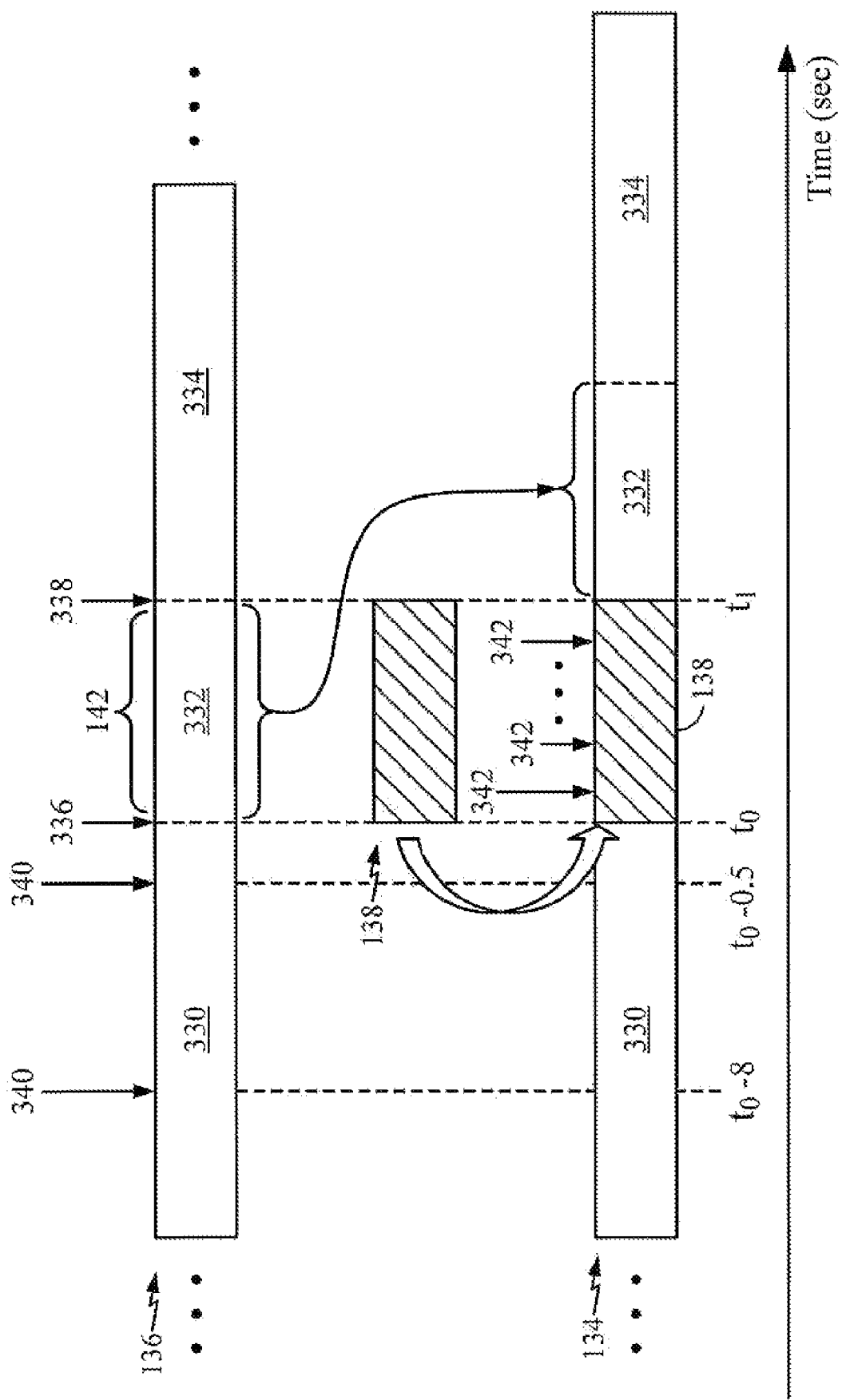
FIG. 18 is a schematic diagram of one aspect of an addition of secondary content to primary content executable in a presentation on the wireless device of FIG. 1.

Referring to FIG. 18, in an example of one aspect, content selector 120 is operable to cause an insertion of one or more pieces of secondary content 138 within primary content 136, such that the combination of both primary content 136 and secondary content 138 are presented within program or presentation 134. For example, this aspect may include inserting an advertisement within, or adding it to, the presentation of another piece of content such as a video presentation. In another example, one piece of content may be overlayed on top of another piece of content. In this example, secondary content indicator 140 (FIG. 1) or some other cueing mechanism may define space or timing 142 within primary content 136 within which secondary content 138 is to be inserted. In this aspect, primary content 136 may be divided into a first portion 330, a second portion 332 and a third portion 334, and secondary content 138 is inserted between first portion 330 and second portion 332. Thus, program or presentation 134 comprises a continuous presentation of the combination of primary content 136 and secondary content 138. Additionally, it should be noted that this aspect may further include the addition of one or more pieces of secondary content 138 to the beginning or end of primary content 136.

Further, secondary content indicator 140 (FIG. 1) or some other cueing mechanism may provide, such as via secondary content parameters 144, cueing notifications relating to the availability of space or timing 142 and the presentation of secondary content 138. For example, cueing mechanisms may include an event notification cue 336 that announce the initiation of a presentation of secondary content 138. Similarly, for example, cueing mechanisms may include an event termination cue 338 that announces the termination of a presentation of secondary content 138. Further, for example, cueing mechanisms may include an event pending cue 340 that announces an upcoming presentation of secondary content 138. A plurality of redundant event pending cues 340 may be issued, for example at predetermined intervals prior to the upcoming presentation, to provide notice of the upcoming presentation. For example, redundant event pending cues 340 may include information on the time remaining before the presentation of secondary content 138. Additionally, for example, cueing mechanisms may include an event continuing cue 342 that announces an ongoing presentation of secondary content 138, e.g. a notice that the respective event is in progress. A plurality of redundant event continuing cues 342 may be issued, for example at predetermined intervals during the presentation, to provide notice of progress. For example, redundant event continuing cues 342 may include information on the time remaining for the presentation of secondary content 138.

Figure 19:
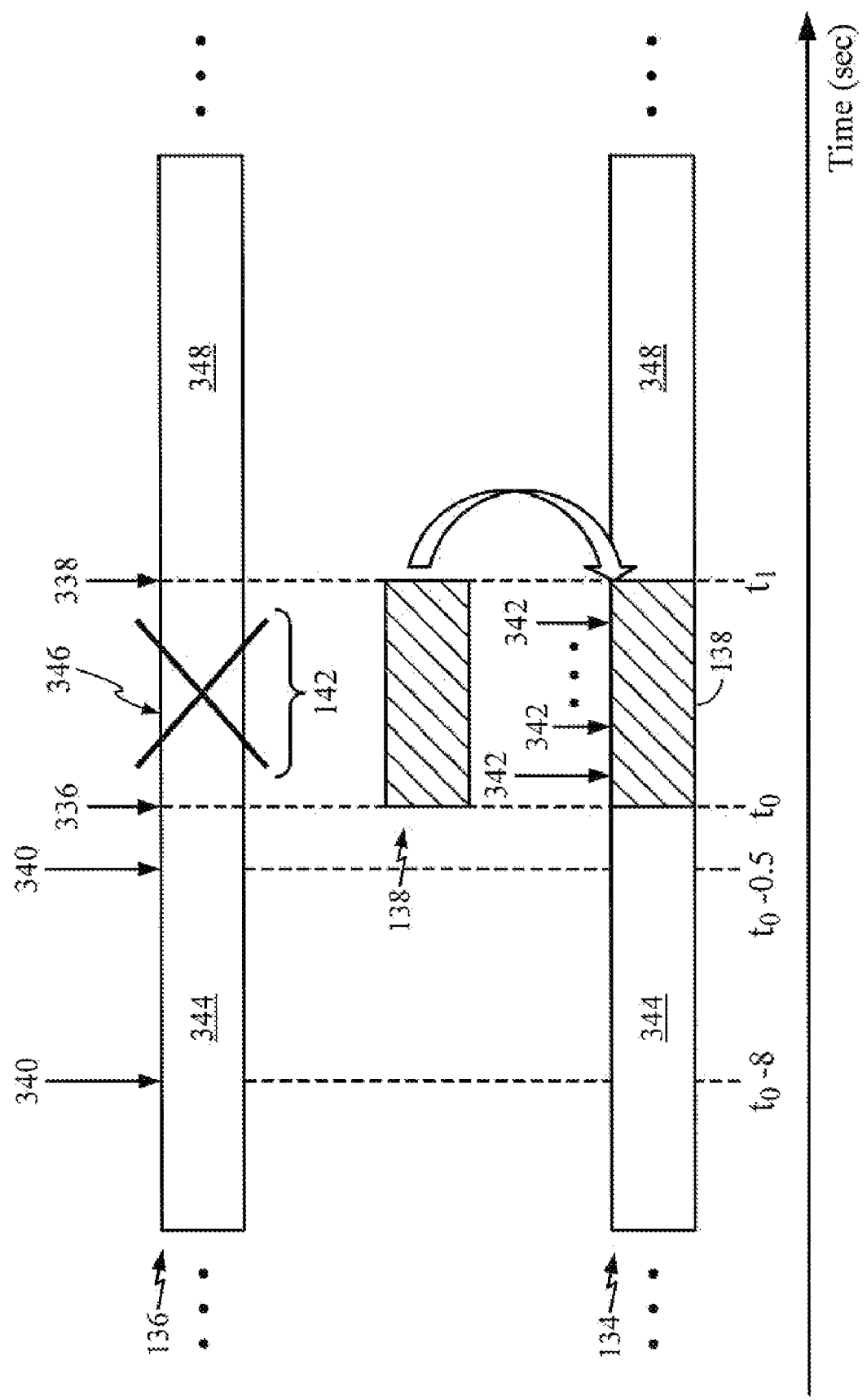
FIG. 19 is a schematic diagram of one aspect of a replacement of primary content with secondary content executable in a presentation on the wireless device of FIG. 1.

Referring to FIG. 19, in an example of another aspect, content selector 120 is operable to cause a replacement of a portion of primary content 136 with one or more pieces of secondary content 138, where the replaced portion of primary content 136 corresponds to secondary content space or timing 142. For example, this aspect may include replacing space 142 having a national or wide-area-based advertisement with a local advertisement. In this aspect, primary content 136 may be divided into a first portion 344, a second portion 346 and a third portion 348, and secondary content 138 is inserted between first portion 344 and third portion 346 in the place of second portion 346. Thus, program or presentation 134 comprises a continuous presentation of the combination of primary content 136, minus second portion 346, and secondary content 138, which replaces second portion 346.

Figure 20:
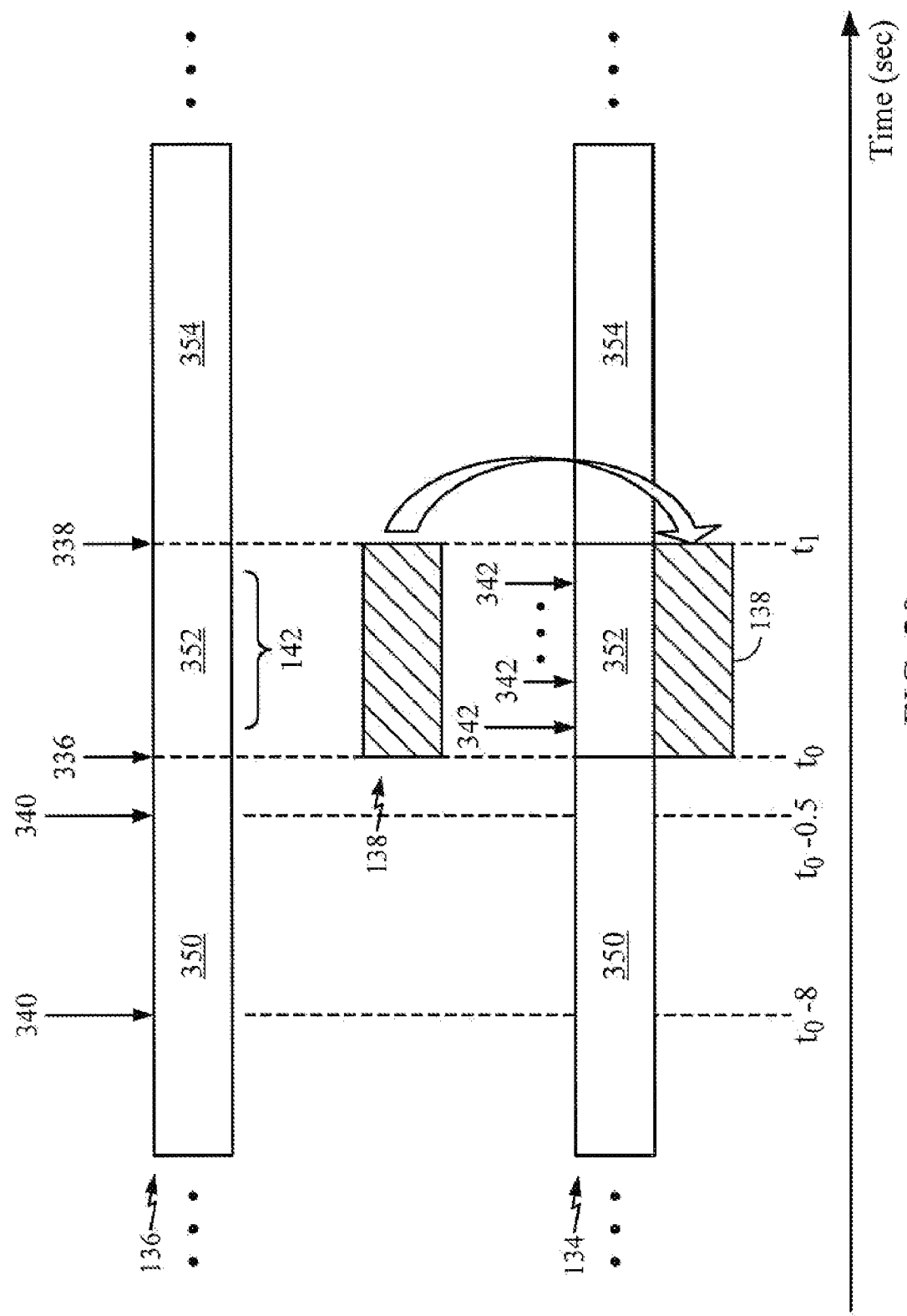
FIG. 20 is a schematic diagram of one aspect of a simultaneous presentation of primary content and secondary content executable by the wireless device of FIG. 1.

Referring to FIG. 20, in an example of yet another aspect, content selector 120 is operable to cause a combination of one or more pieces of secondary content 138 with primary content 136, such that both the primary and secondary content are presented simultaneously. For example, this aspect may include combining the presentation of audio music on a speaker with title and artist information on a display, or combining title and artist information on a first portion of a display with advertising information on a second portion of the display. In this aspect, primary content 136 may be divided into a first portion 350, a second portion 352 and a third portion 354, and secondary content 138 added to primary content such that second portion 346 and secondary content 138 are presented simultaneously. In another aspect, one piece of content may be overlayed on top of another piece of content. Thus, program or presentation 134 comprises a continuous presentation of primary content 136, with the simultaneous presentation of both primary content 136 and secondary content 138 during spacing or timing 142.

Therefore, referring to FIG. 1, each wireless device 104 of system 100 is operable to selectively download and selectively present selected content 126 chosen from a plurality of content 102 in transmission 118 from distribution system 108.

Figure 21:
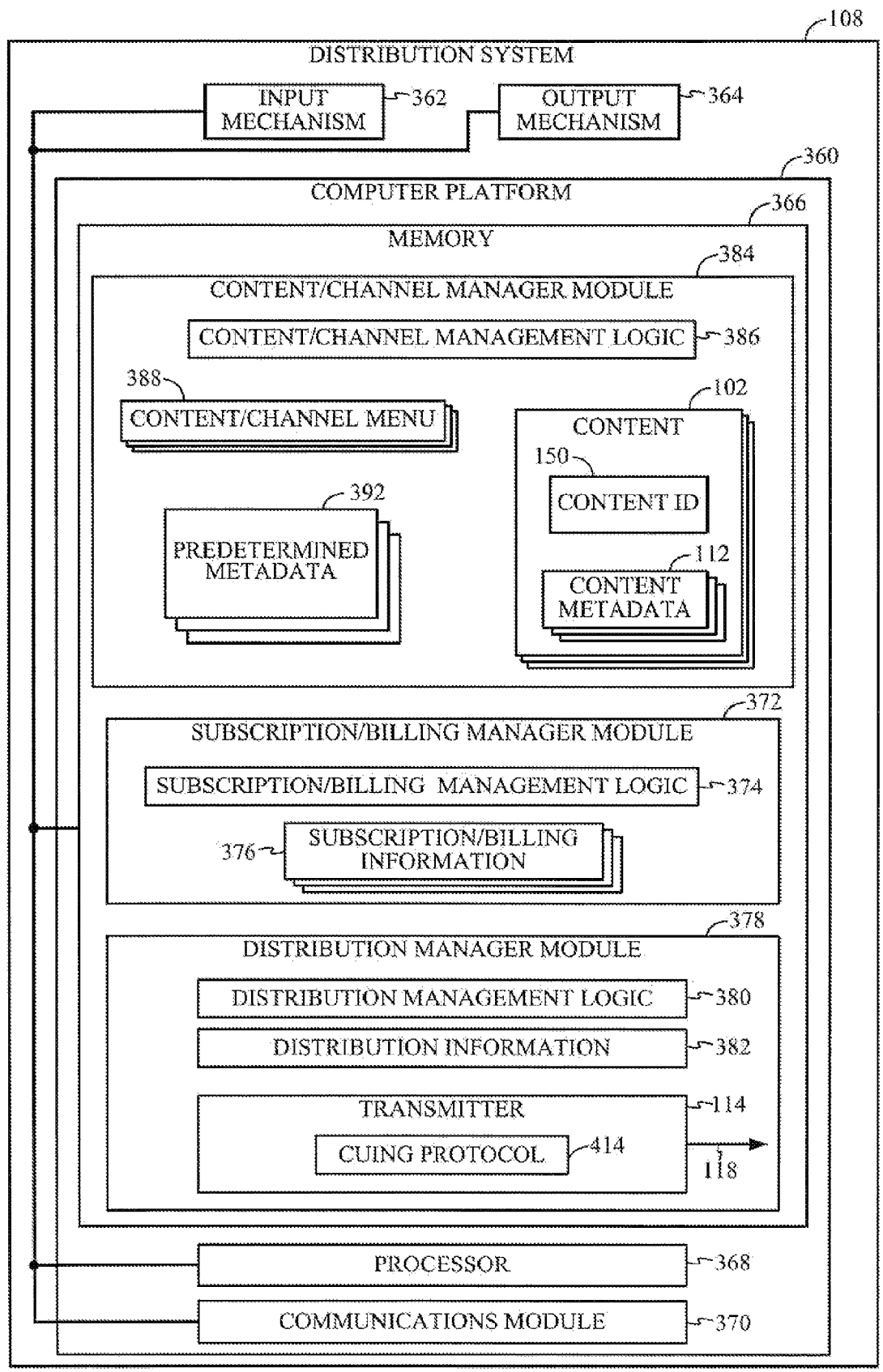
FIG. 21 is a schematic diagram of one aspect of the distribution system of FIG. 1.

Referring to FIG. 21, in some aspects, distribution system 108 may comprise one or any combination of any type of hardware, software, firmware, server, personal computer, mini computer, mainframe computer, and generally any special purpose and/or general purpose computing device. Further, there can be separate servers or computer devices and/or networks associated with distribution system 108 that work in concert to receive, manipulate and provide data in usable formats to parties, and/or to provide a separate layer of control in the data flow between devices and networks and distribution system 108.

Distribution system 108 may comprise a computer platform 360 comprising one or a plurality of resident and/or distributed computer platforms that can receive and transmit data, receive and execute software applications and generate and/or display data and/or content. For example, computer platform 360 may be embodied in hardware, firmware, software, data, executable instructions and combinations thereof.

Computer platform 360 may be associated with an input mechanism 362 for generating inputs into distribution system 108, and output mechanism 364 for generating information for consumption by a local and/or remote operator of distribution system 108. For example, input mechanism 362 may include a mechanism such as a key or keyboard, a mouse, a touch-screen display, voice recognition module, etc. Further, for example, output mechanism 364 may be a display, an audio speaker, a haptic feedback mechanism, etc. Additionally, input mechanism 362 may be a remote device, such as a remote computer, dumb terminal and/or workstation, which has access to distribution system 108. In some aspects, for example, input mechanism 362 and/or output mechanism 364 may be utilized by one or more operators to manage one or more of: the receipt and description of content received from content providers; the establishment, maintenance and deletion of channels, tiers and packages associated with one or more content retailers and/or billing and customer service providers; the establishment, maintenance and deletion of subscription and billing information; and the distribution of content through media flows.

Further, computer platform 360 may include one or more data repositories and/or memories 366, which may comprise volatile and nonvolatile memory such as read-only and/or random-access memory (RAM and ROM), EPROM, EEPROM, flash cards, or any memory common to computer platforms. Further, memory 366 may include one or more flash memory cells, or may be any secondary or tertiary storage device, such as magnetic media, optical media, tape, or soft or hard disk, including removable memory mechanisms. In several aspects, for example, memory 366 includes one or more content servers.

Further, computer platform 360 also includes a processor 368, which may be an application-specific integrated circuit (ASIC), or other chipset, processor, logic circuit, or other data processing device for carrying out executable instructions.

Computer platform 360 may further include a communications module 370 embodied in one or more of hardware, firmware, software, data executable instructions and combinations thereof, that enables wired and wireless communications among the various components of distribution system 108, and between distribution system 108 and first network 110, second network 116 and wireless devices 104. For example, communications module 370 may include a transceiver module for wireless communications with wireless devices 104 and/or first network 110 and second network 116.

Further, computer platform 360 may include one or more subscription/billing manager modules 372 which operate to manage all of the media content subscription and billing functions associated with distribution system 108. For example, subscription/billing manager module 372 may be embodied in one or more of hardware, processors, software, firmware, data and/or other set of executable instructions. Further, in some aspects, subscription/billing manager module 372 includes subscription/billing management logic 374 that provides distribution system 108 with the capability to receive, store and manipulate subscription and billing information 376. For example, subscription/billing information 376 may include subscriber/device-user identity, address and payment-related information, corresponding wireless device identifier information, subscriber account information, package, tier, and channel information, etc. Further, subscription/billing management logic 374 may be operable to receive, process and transmit subscription related information, such as subscription requests, the corresponding approvals or denials, and the management of digital rights based on an approved subscription request for a channel, tier or package of content.

Additionally, computer platform 360 may include one or more distribution manager modules 378 which operate to manage all of the media content distribution functions associated with distribution system 108. For example, distribution manager module 378 may be embodied in one or more of hardware, processors, software, firmware, data and/or other set of executable instructions. Further, in some aspects, distribution manager module 378 includes distribution management logic 380 that provides distribution system 108 with the capability to receive, store and manipulate distribution information 382 and control the distribution of content. For example, distribution information 382 may include information and/or relative associations between distribution-related information, such as one or a combination of parameters of the MediaFLO™ system, including flows, flow regions, networks, content, channels, services, tiers, packages, content suppliers, etc. Further, distribution management logic 380 may be operable to receive and process content and content-related information, as well as content retailer-specific information, such as customization information, auxiliary services, auxiliary presentations, channel information, tier information and package information. Additionally, distribution management logic 380 may be operable to initiate transmission 118, such as via a one-to-many or a multicast mechanism. For example, a multicast mechanism may comprise all or some portion of a multicast system such as the Forward Link Only (FLO) network of the MediaFLO™ system.

Additionally, computer platform 360 may include one or more content/channel manager modules 384, which is operate to manage operations relating to the content received and the channels/services distributed by distribution system 108. For example, content/channel manager module 384 may be embodied in one or more of hardware, processors, software, firmware, data and/or other set of executable instructions. Further, in some aspects, content/channel manager module 384 includes content/channel management logic 386 that provides distribution system 108 with the capability to receive, store and manipulate the plurality of content 102 and the respective services and/or channels 154, 156 and 158 (FIG. 3), as well as the associated content-related information, such as content metadata 112, content IDs 150, and the associated channel/service information, such as the associated content, tier and package information.

In some aspects, for example, content/channel management logic 386 is operable to generate one or more of a plurality of content and channel/service menus 388 suitable for interfacing with a user of distribution system 108 to carry-out various content and channel/service management functions, such as channel/service definitions, description definition activities and content descriptor activities, etc.

Figure 22:
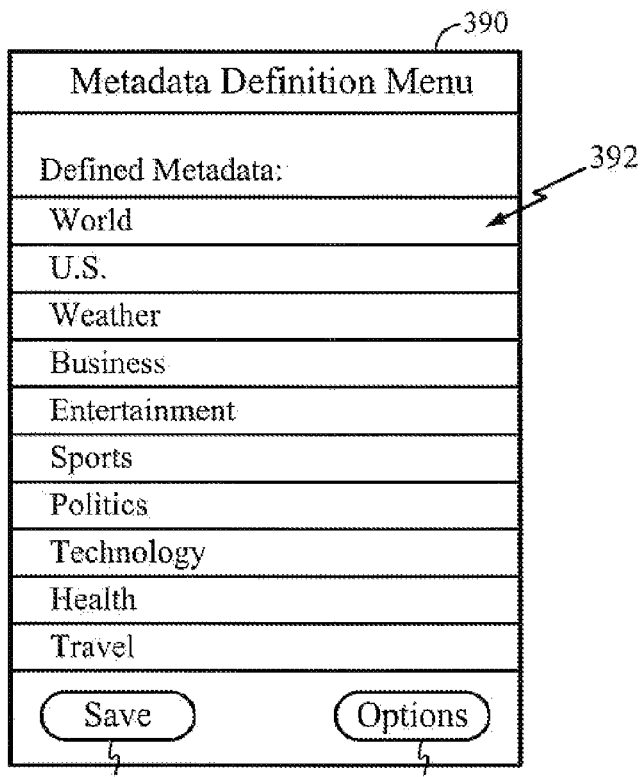
FIG. 22 is a view of one aspect of a metadata definition menu available, in some aspects, through interaction with the media distribution system of FIG. 1.

For example, referring to FIG. 22, content/channel management logic 386 may generate a metadata definition menu 390, such as on a display-type user interface 170 (FIG. 5), which allows the user to define one or more predetermined metadata 392, such as content categories, genres, themes, etc. For example, upon user command, content/channel management logic 386 (FIG. 21) may retrieve metadata definition menu 390 from the plurality of content and channel/service menus 388 (FIG. 21) and present it to the user. The user may utilize one or more input devices 172 (FIG. 5) to create a list of predetermined metadata 392 (FIGS. 21 and 22), which may then be used to describe any content. For example, a user may individually define a description by typing in a name, a description, a category code which may be referenced to a database of potential descriptions, and/or selecting from a list of potential descriptions obtained from a content description database. Further, for example, metadata definition menu 390 may include selectable functions, such as "Save" virtual button 394 to save the listed descriptors and/or an "Options" virtual button 396 to access an alternate one of the plurality of content and channel/service menus 388 (FIG. 21), such as a help menu and/or a menu to enter or define a new descriptor, edit or delete an existing descriptor, etc. As such, the list of available predetermined metadata 392 can be created and/or modified, and saved. In some aspects, one or more predetermined content metadata 392 may be associated with one or more respective 154, 156 and 158 (FIG. 3), such that the predetermined content metadata 392 is service/channel- and/or service provider-specific. Thus, in some aspects, user interaction with metadata definition menu 390 results in the generation of one or more available predetermined metadata 392, which may then be used to define one or more of the plurality of content 102.

Figure 23:
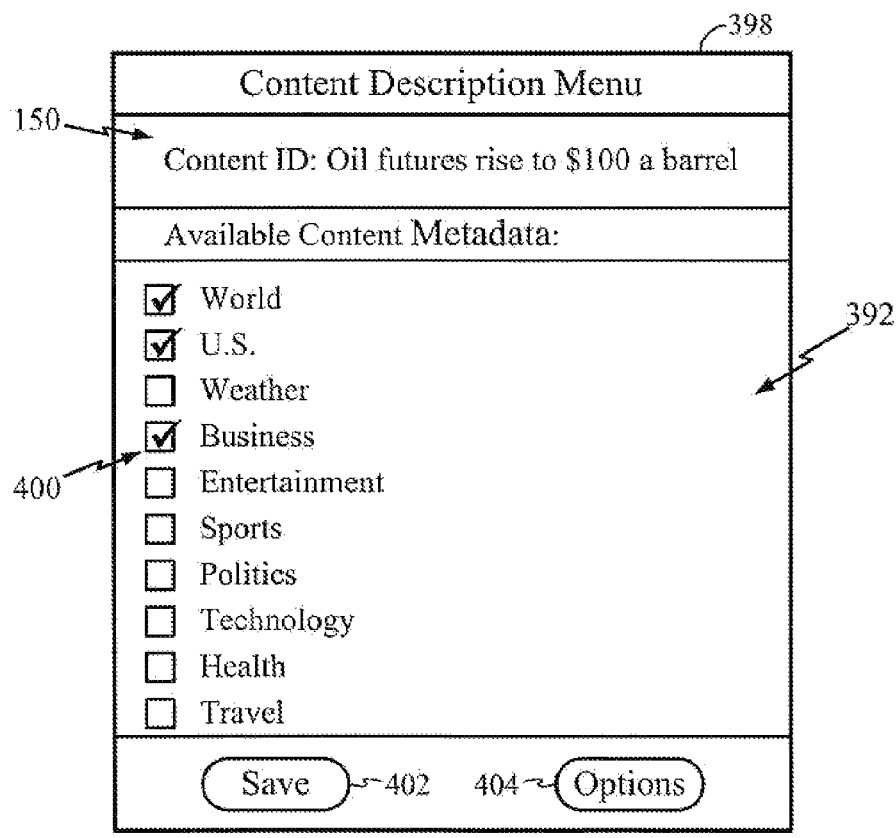
FIG. 23 is a view of one aspect of a content description menu available, in some aspects, through interaction with the media distribution system of FIG. 1.

Correspondingly, referring to FIG. 23, in some aspects, content/channel management logic 386 (FIG. 21) is operable to allow a user to describe a given one of the plurality of content 102 by associating the content with one or more predetermined metadata 392. Content/channel management logic 386 may generate a content description menu 398 which enables the user to select from the list of available predetermined metadata 392 to associate with a given content ID 150 or content 102 as the one or more respective content metadata 112. In some aspects, if an appropriate metadata is not available on content description menu 398, then content/channel management logic 386 (FIG. 21) is operable to allow a user to personally define one or more metadata, such as by taking the user to metadata definition menu 390 (FIG. 22). Further, for example, content description menu 398 may be presented to a user of distribution system 108 on a display-type user interface associated with input mechanism 172 (FIG. 5) and/or output mechanism 174 (FIG. 5). Additionally, in some aspects, content/channel management logic 386 (FIG. 21) is operable, based on an identified channel and/or service 154, 156 and 158 (FIG. 3), to populate the list of available predetermined metadata 392 with the previously defined metadata associated with the given channel or service, as discussed above.

For example, upon receiving a given one of the plurality of content 102 (FIG. 1), content/channel management logic 386 (FIG. 21) may automatically retrieve content description menu 398 from the plurality of content and channel/service menus 388 (FIG. 21) and present it to the user. Alternately, menu 398 may be retrieved based on received user inputs. In yet another alternative, menu 398 may be utilized by a content provider 106 (FIG. 1) to associate content metadata 112 with a given content prior to receipt of content by distribution system 108. In any case, a user may utilize one or more input mechanisms 172 (FIG. 5) to provide a selection indicator 400, such as a highlight, a checkmark, etc., to indicate the selection of one or more predetermined content categories 392, thereby defining one or more content metadata 112 (FIG. 1) for association with the given content 102 (FIG. 1).

Alternatively, or in addition, for example, a user may individually define one or more content metadata 112 (FIG. 1) in menu 398 by typing in a name, a description, etc. These non-standard metadata may be, in combination with the selected predetermined metadata, defined as the content metadata 112 for a given one of the plurality of content 102. Further, in some aspects, content/channel management logic 386 (FIG. 21) may include algorithms, decision-making routines, fuzzy logic, heuristic relationships, neural networks, etc. which may be operable to associate non-standard content descriptors with one or more predetermined content descriptors and store this relationship as the content descriptor.

Further, for example, content description menu 398 may include selectable functions, such as "Save" virtual button 402 to save the selected content categories as content metadata 112 and/or an "Options" virtual button 404 to access an alternate one of the plurality of content and channel/service menus 388 (FIG. 21). For example, selection of "Options" virtual button 404 may provide access to a help menu and/or a menu to retrieve information that describes what types of features content should have to be considered for a respective descriptor, etc. As such, one or more content metadata 112 (FIG. 1) can created and/or modified, and saved for respective ones of the plurality of content 102 (FIG. 1), as may be identified by content ID 150. Thus, in some aspects, user interaction with content description menu 398 results in the generation of one or more content metadata 112 (FIG. 1) for one or more of the plurality of content 102 (FIG. 1).

It should be noted that functionality of defining metadata 112 (FIG. 1) and associating the metadata 112 with one or more of the plurality of content 102 (FIG. 1) may occur on any device associated with distribution system 108. For example, content provider 106 may perform this function.

Figure 24:
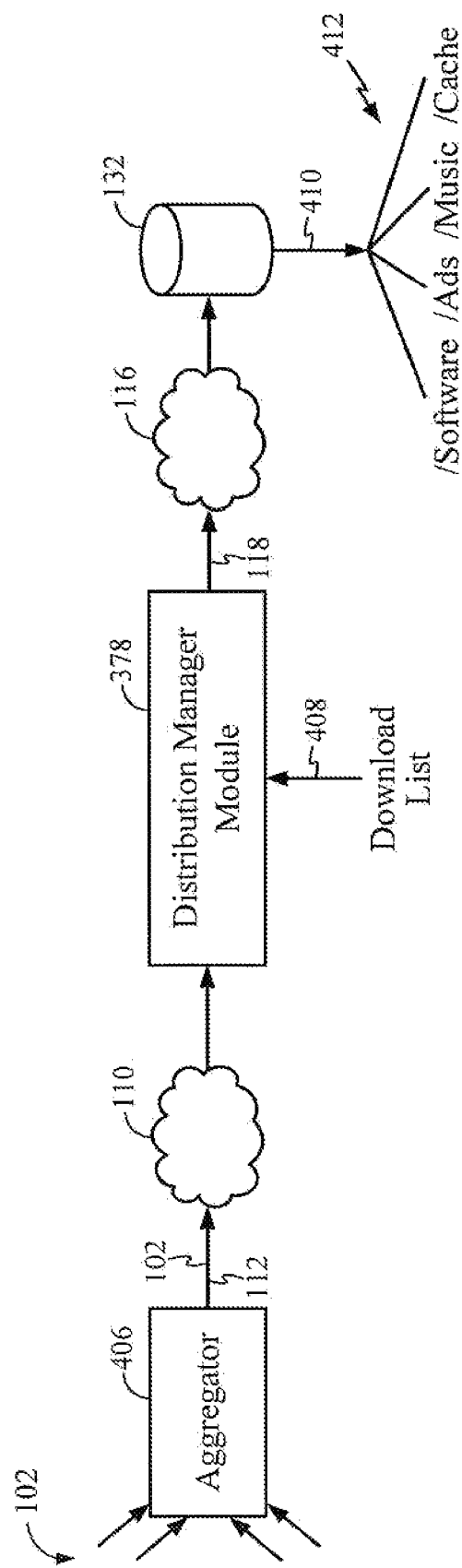
FIG. 24 is a schematic diagram of one aspect of a process for delivering targeted content within the system of FIG. 1.

Referring to FIG. 24, in an example of one aspect, one or more content providers 106 may include an aggregator 406 operable to define metadata, and operable to associate the plurality of content 102 with one or more metadata 112. For example, aggregator 406 receive the plurality of content 102 from external sources and tags each with one of a predetermined plurality of metadata 392 (FIG. 22), which may comprise a labeling of the class or category of the content. Further, for example, aggregator 406 may aggregate multiple pieces of the plurality of content 102 into groups having similar class or category. As such, aggregator 406 defines content 102 and corresponding content metadata 112. Aggregator 406 is then operable to forward content 102 and corresponding content metadata 112 to distribution manager module 378 of distribution system 108 (FIG. 21). Distribution manager module 378 may further obtain a download list 408, which defines a list of classes or categories from, for example, user preference profile 244 (FIG. 11) and/or from outside sources that wish to subscribe to file system updates. Download list 408 is used to initiate file downloads of classes of interest, e.g. transmission of plurality of content 102 and associated metadata 112. The downloaded files information 410 is then published to content storage 132, such as in an electronic file system 412, where each file may include a file name and a path name. Electronic file system 412 includes the ability to remotely move, copy, delete and otherwise manage each file in the file system. For example, such a file system update mechanism may be used to put advertisements (ads) in an ad cache, add content to a web browser cache, download popular videos or music clips, which may be performed proactively or for promotion, and/or to deliver software updates to the respective wireless device.

Therefore, referring back to FIG. 21, distribution system 108 is operable to generate a one-to-many transmission 118, which may be a multicast transmission, to one or more wireless devices 104 (FIG. 1) participating in system 100 (FIG. 1). Further, as noted previously, content selector 120 (FIG. 1) is operable to choose selected content 126 (FIG. 1) from transmission 188 for downloading, and is further operable identify ones of selected content 126 for inclusion with program or presentation 134.

In some aspects, transmission 118 may include a cuing protocol 414 that is operable to alert each wireless device 104 to signal a content caching and/or content insertion event, and/or to associate metadata with content or a segment of content. For example, cuing protocol 414 may define one or more aspects relating to the downloading and/or presentation of content on wireless device 104.

Figure 25:
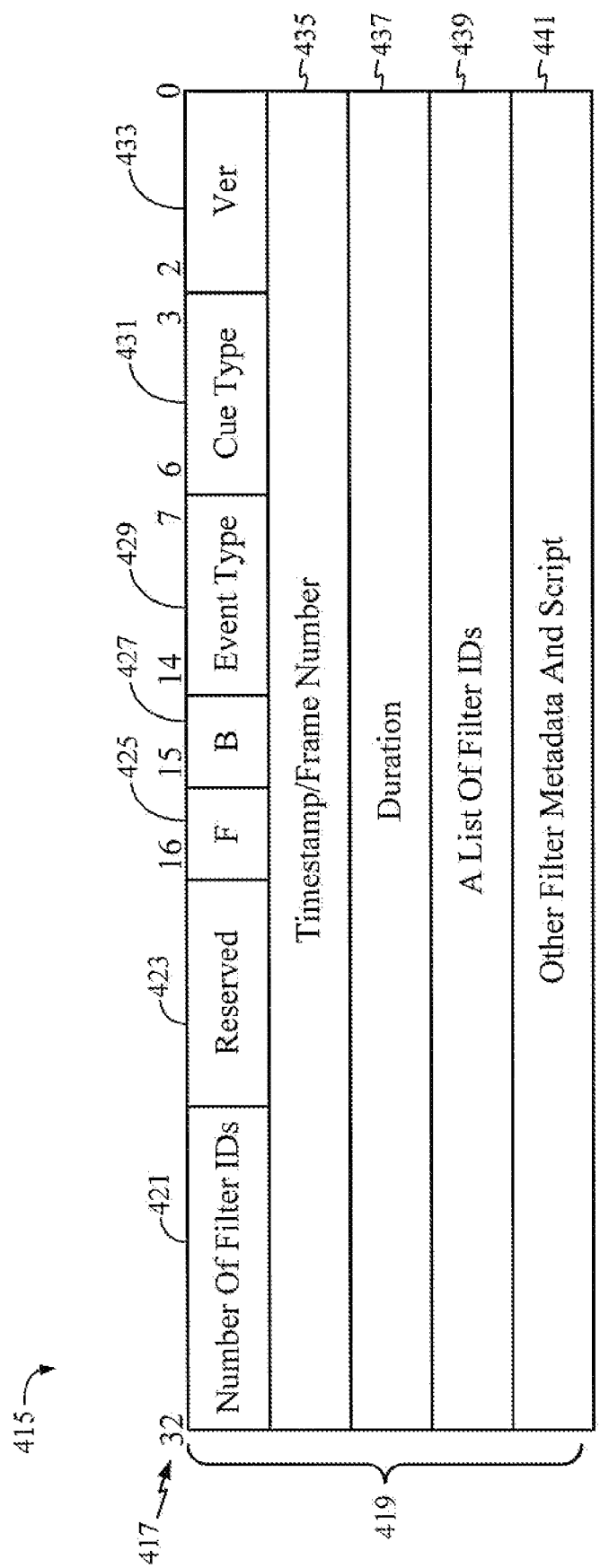
FIG. 25 is a schematic diagram of one aspect of a cuing protocol operable for use in the system of FIG. 1.

Referring to FIG. 25, in an example of one aspect, a cuing protocol payload 415 may comprise a data object having a predetermined size 417, such as a bit size, and having a predetermined payload structure 419. For example, in this aspect, cuing protocol payload 415 may include a number of fields, where each field may have a predetermined or variable length, the fields including: a number of filter identifiers (IDs) field 421, which indicates the number of filter identifiers contained on the payload; one or more reserved fields 423, which may be reserved based on the protocol; a filter (f) indicator field 425, which indicates whether or not Other Metadata and Script is included in the payload, such as by setting to "0" for not included or to "1" for included; a blanking indicator field 427, for example, which may be set to "0" for no blanking on the primary content or to "1" for blanking on, or preventing presentation of, the primary content; an event type field 429, which may have an extendable length, that identifies, for example, that the event comprises a real-time advertisement or a non-real-time advertisement, and that can be extended to be used for black outs, e.g. to override the primary content with some other content based on targeting information; a cue type field 431 that identifies the type of cue, e.g. an event pending, an event notification, an event continuing, an event terminating, etc.; a version (ver) number field 433 that identifies the version of the cuing protocol in use; a timestamp/frame number field 435, which provides a measurement point associated with the primary content for the event, e.g. to synchronize the timing; a predetermined length duration field 437, which provides the duration of the event, where the duration is the time remaining before the completion of the event in timestamp units; a list of filter IDs field 439, which lists the filter identities for use with the event; and an Other Filter Metadata and Script field 441, which contains other metadata, attributes, parameters, script, etc. for use by content selector 120 (FIG. 1), where synchronized multimedia integration language (SMIL) may be used for metadata plus script.

Figure 26:
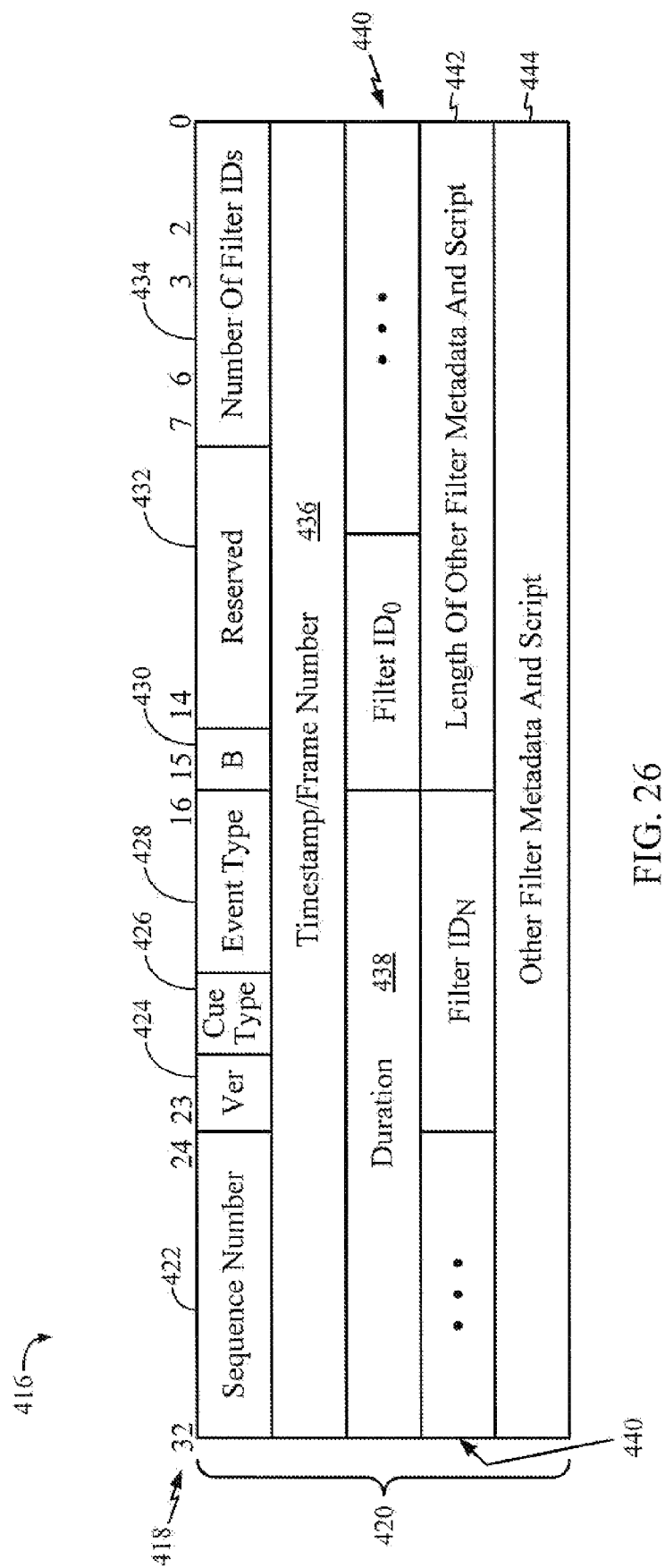
FIG. 26 is a schematic diagram of another aspect of a cuing protocol operable for use in the system of FIG. 1.

Referring to FIG. 26, in another example, a cuing protocol payload 416 may comprise a data object having a predetermined size 418, such as a bit size, and having a predetermined payload structure 420. For example, in this aspect, cuing protocol payload 416 may include: an 8 bit sequence number field 422 that identifies relative position of payload 416 with respect to other payloads; a 2 bit version (ver) number field 424 that identifies the version of the cuing protocol in use; a 2 bit cue type field 426 that identifies the type of cue, e.g. an event pending, an event notification, event continuing, etc.; a 2 bit event type field 428 that identifies, for example, that the event comprises a real-time advertisement or a non-real-time advertisement; a 1 bit blanking indicator field 430, for example, which may be set to "0" for no blanking on the primary content or to "1" for blanking on the primary content; one or more variable length reserved fields 432, which may be reserved based on the protocol; an 8 bit number of filter identifiers (IDs) field 434, which indicates the number of filter identifiers contained on the payload; a 32 bit timestamp/frame number field 436, which provides a measurement point associated with the primary content for the event, e.g. to synchronize the timing; a 16 bit duration field 438, which provides the duration of the event, where the duration is the time remaining before the completion of the event in timestamp units; a variable length filter ID field 440, which lists the filter identities for use with the event, where each filter identity comprises an 8 bit field; a length of other filter metadata and script field 442, which defines the length of the other filter metadata and script; and a variable length other filter metadata and script field 444 which contains other metadata, attributes, parameters, script, etc. for use by content selector 120 (FIG. 1), where synchronized multimedia integration language (SMIL) may be used for metadata plus script.

Further, for example, cuing protocol 414 (FIG. 21) may be transported in transmission 118 within a cuing protocol stack. In some aspects, cuing protocol stack may varying depending on whether the cue is for real-time content or non-real-time content, in other aspects, cuing protocol stack may be the same in both cases.

For example, referring to FIGS. 27-36, portions of various cuing protocol stacks include a network layer 450, such as based on the Internet Protocol (IP), a transport layer 452, such as based on the User Datagram Protocol (UDP), and the cuing protocol 414 being carried in an application layer 454.

Figure 27:
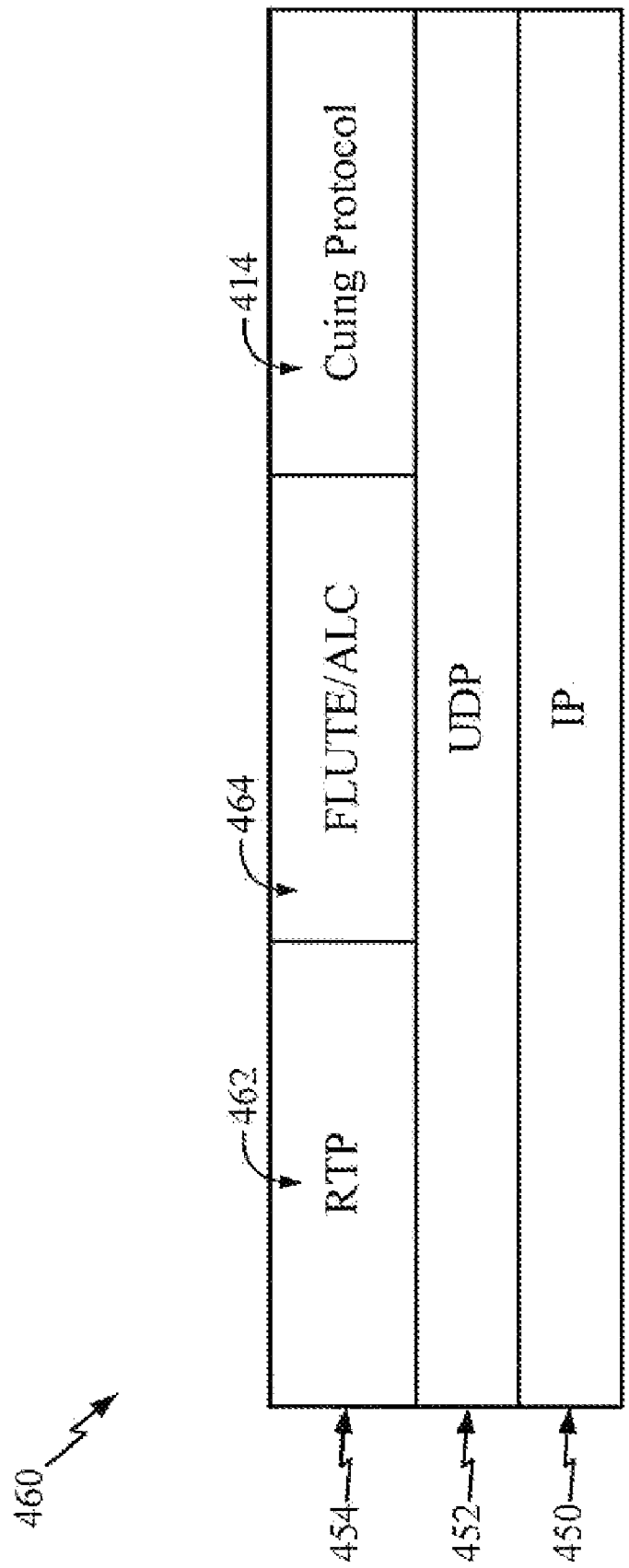
FIG. 27 is a schematic diagram of an aspect of a cuing protocol stack, for both real-time and non-real-time content, operable for use in the system of FIG. 1.

Referring to FIG. 27, for example, cuing protocol stack 460 may be the same for real-time and non-real-time content, and payload portions of cuing protocol 414 may be defined in other protocol or applications, such as Real-Time Transport Protocol (RTP) 462 and/or the file delivery over unidirectional transport built on top of asynchronous layered coding (FLUTE/ALC) file transfer application 464. For example, for the distribution of real-time content, cue packets may be embedded within the RTP stream, either in-band with media packets or in a separate RTP stream. Further, for example, for non-real-time content, cue packets may be carried by FLUTE/ALC.

Referring to FIGS. 28 and 29, in another aspect, cuing protocol stack 466 may be utilized for real-time content and cuing protocol stack 468 may be used for non-real-time content. In cuing protocol stack 466, RTP 462 may include predetermined payload types defined for media or content packets and separate predetermined payload types defined for cue packets. As such, RTP 462 may carry some of the payload of cuing protocol 414. In cuing protocol stack 468, cuing protocol 414 may defined in synchronized multimedia integration language (SMIL) using FLUTE/ALC 464.

Referring to FIGS. 30 and 31, in another aspect, cuing protocol stack 472 may be utilized for real-time content and cuing protocol stack 474 may be used for non-real-time content. In cuing protocol stack 472, RTP 462 may carry some of the payload of cuing protocol 414. In cuing protocol stack 474, cuing protocol 414 may be the same as in the real-time case, and may be carried using FLUTE/ALC 464.

Referring to FIGS. 32 and 33, in another aspect, cuing protocol stack 476 may be utilized for real-time content and cuing protocol stack 478 may be used for non-real-time content. In cuing protocol stack 476, RTP 462 may carry some of the payload of cuing protocol 414. In cuing protocol stack 478, cuing protocol 414 may be defined in SMIL 470 and carried using FLUTE/ALC 464.

Referring to FIGS. 34 and 35, in another aspect, cuing protocol stack 480 may be utilized for real-time content and cuing protocol stack 482 may be used for non-real-time content, where the same cuing protocol 414 may be used in both cases. In cuing protocol stack 480, RTP 462 may carry some of the payload of cuing protocol 414. In cuing protocol stack 482, SMIL 470 may include portions of cuing protocol 414, and both SMIL 470 and cuing protocol 414 may be carried using FLUTE/ALC 464.

Figure 36:
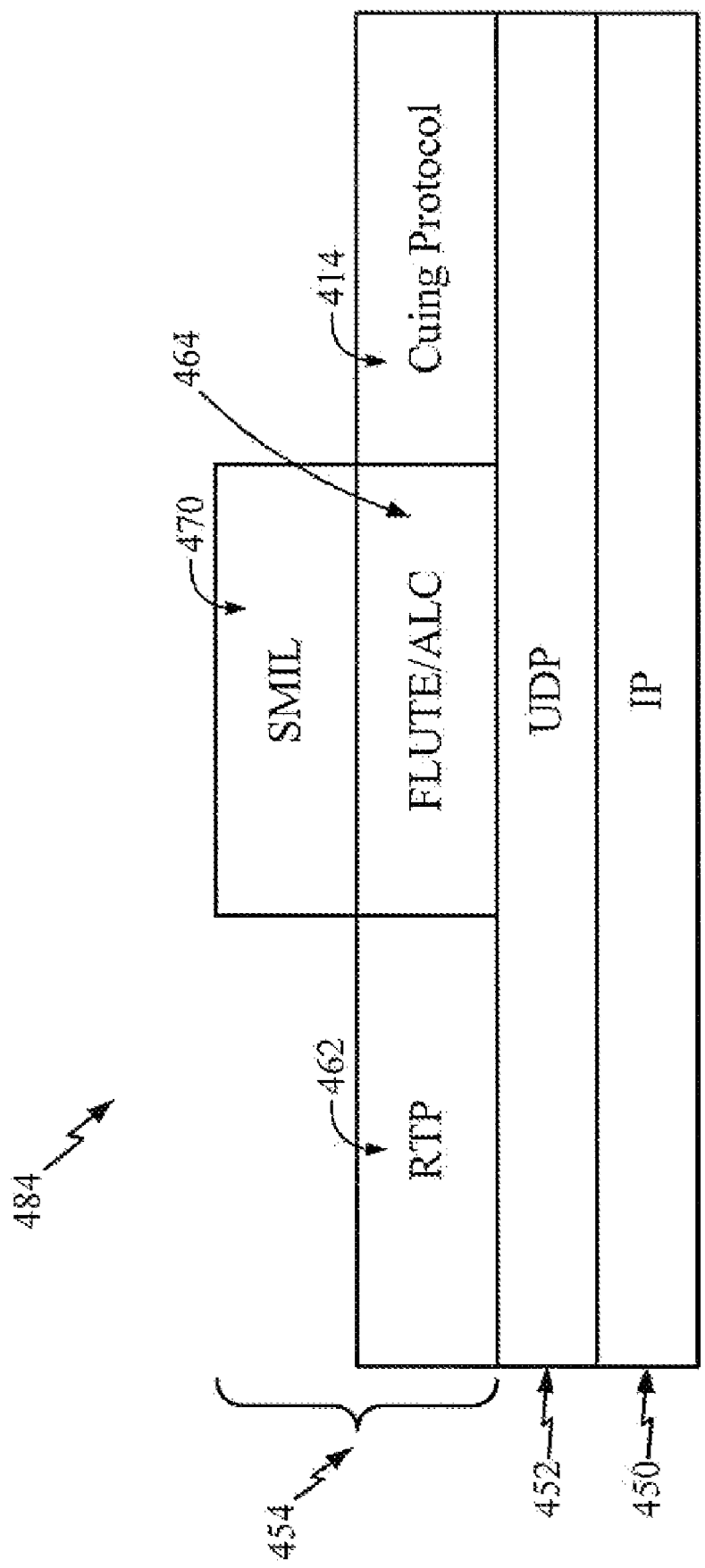
FIG. 36 is a schematic diagram of an aspect of a cuing protocol stack, for both real-time and non-real-time content, operable for use in the system of FIG. 1.

Referring to FIG. 36, in another aspect, cuing protocol stack 484 may be utilized for both real-time content and non-real-time content. RTP 462 may carry some of the payload of the real-time-content protocol, while some of the non-real-time protocol payload may be defined in SMIL 470 and carried using FLUTE/ALC 464.

Figure 37:
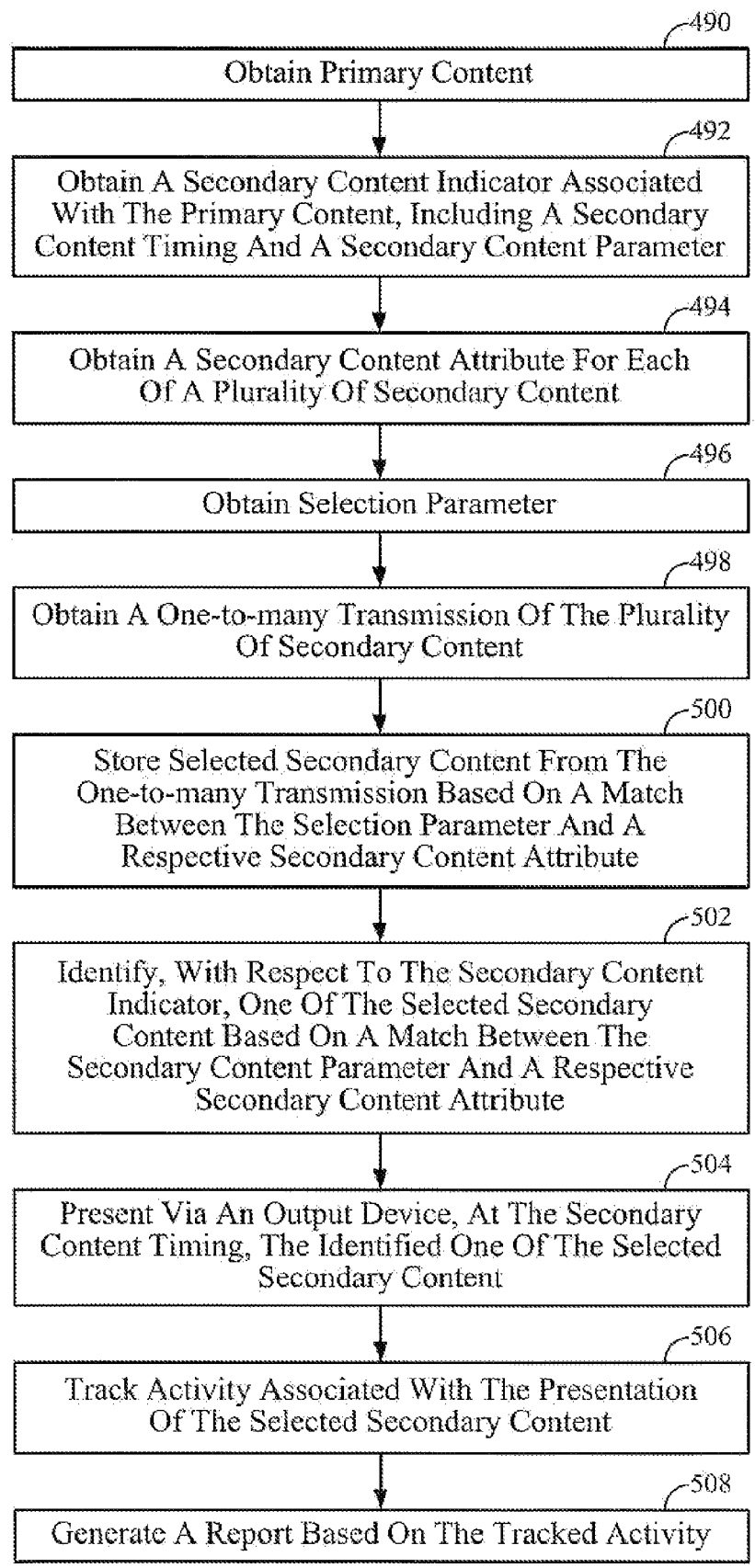
FIG. 37 is a flowchart of one aspect of a method of presenting content operable on the wireless device of FIG. 1.

In operation, referring to FIG. 37, one aspect of a method of presenting content on a wireless device comprises obtaining a primary content (Block 490). For example, referring to FIG. 1, wireless device 104 receives transmission 118 of a plurality of content 102 from distribution system 108. Content selector 120 is operable to choose selected content 126 from among the plurality of content 102 in transmission 118. At least one of selected content 126 may comprise primary content 136.

The method further includes obtaining a secondary content indicator associated with the primary content, including a secondary content timing and a secondary content parameter (Block 492). For example, referring to FIG. 1, wireless device 104 may obtain the secondary content indicator 140 from transmission 118. Secondary content indicator 140 may be defined in each piece of content 102, or within the corresponding content metadata 112, or within a cuing protocol 414 (FIG. 21) carried by transmission 118. Further, the secondary content timing and the secondary content parameter may be defined by one or more secondary content parameters 144 or by cuing protocol 414.

Further, the method includes obtaining a secondary content attribute for each of a plurality of secondary content (Block 494). For example, referring to FIG. 1, wireless device 104 may obtain the plurality of content metadata 112, corresponding to the plurality of content 102, from transmission 118.

The method also includes obtaining a selection parameter (Block 496). For example, referring to FIG. 1, wireless device 104 may obtain one or more selection parameters 122, such as content filter 123, user information 125, and device information 127.

Additionally, the method includes obtaining a one-to-many transmission of the plurality of secondary content (Block 498). For example, referring to FIG. 1, wireless device 104 obtains transmission 118, which may carry the plurality of content 102 including secondary content 138. In some aspects, wireless device 104 is authorized to receive transmission 118 based on subscription data 248 (FIG. 12) which may be defined in device information 127. Additionally, in some aspects, the one-to-many transmission may comprise a multicast transmission.

The method further includes storing selected secondary content from the one-to-many transmission based on a match between the selection parameter and a respective secondary content attribute (Block 500). For example, referring to FIG. 1, wireless device 104 is operable to execute content selector 120 to choose selected ones from the plurality of content 102 in transmission 118 based on a match between one or more selection parameters 122 and a respective content attribute defined by content metadata 112 corresponding to the selected content. In some aspects, for example, selection parameter 122 may be content filter 123, which can be defined by transmission 118 and/or which may be set by a user of the device or set based on user interactions with the device, e.g. based on behavior. In some aspects, for example, selection parameter 122 may be user information 125 that includes a user preference profile 244 (FIG. 11) and/or user preference data 242 (FIG. 11), thereby allowing content selector 120 to download content likely to be of interest to the device user based on a comparison with respective content attributes. In some aspects, for example, selection parameter 122 may be device information 127, which may be a subscription or a hardware or software state.

Additionally, the method includes identifying, with respect to the secondary content indicator, one of the selected secondary content based on a match between the secondary content parameter and a respective secondary content attribute (Block 502). For example, referring to FIG. 1, wireless device 104 is operable to execute content selector 120 based on receiving a secondary content indicator 140 and/or cuing protocol 414 (FIG. 21). In this case, content selector 120 is operable to obtain secondary content parameter 144 and determine a match with content metadata 112 of selected content 126 cached in content storage 132. The matching content metadata 112 is associated with, and therefore identifies, one of the selected content 126. The so-called match may be based on a matching threshold, a weighting assigned to quantity the amount of a match, etc. Further, content selector 120 may select the matching content based on a best match or highest quantifiable match, a first match, and/or any other predetermined matching scheme.

Further, the method includes presenting via an output device, at the secondary content timing, the identified one of the selected secondary content (Block 504). For example, referring to FIG. 1, media module 128 is operable to receive the identified one of selected content 126 and forward it to output device 130 for inclusion in the program or presentation 134 based on secondary content parameters 144 and/or cuing protocol 414 (FIG. 21).

The method also may include tracking activity associated with the presentation of the selected secondary content (Block 506). For example, referring to FIG. 1, wireless device 104 may execute tracking/reporting module 146 to monitor and record the state of the predetermined device hardware and software, including capturing device user interaction with the device, associated with presentation 134 that includes secondary content 138.

Additionally, the method may include generating a report based on the tracked activity (Block 508). For example, referring to FIG. 1, tracking/reporting module 146 may be operable to generate a report 148 providing in detail or in summary fashion information relating to the monitored and tracked activities occurring in associated with the presentation of secondary content 138. Such a report 148 may be subject to a privacy policy 308 (FIG. 16) to remove predetermined information deemed to be private, thus maintaining a non-invasive aspect of system 100.

It should be noted that some portion or all of the above-defined actions may be performed on wireless device 104 of system 100. For example, in one aspect, all of the above actions are performed on wireless device 104. In another aspect, for example, the actions associated with identifying and downloading selected content 126 may performed external to wireless device 104, while the actions of choosing from amongst selected content 126 to identify secondary content 138 for inclusion in a presentation 134 of primary content 136 may be performed on wireless device 104.

Figure 38:
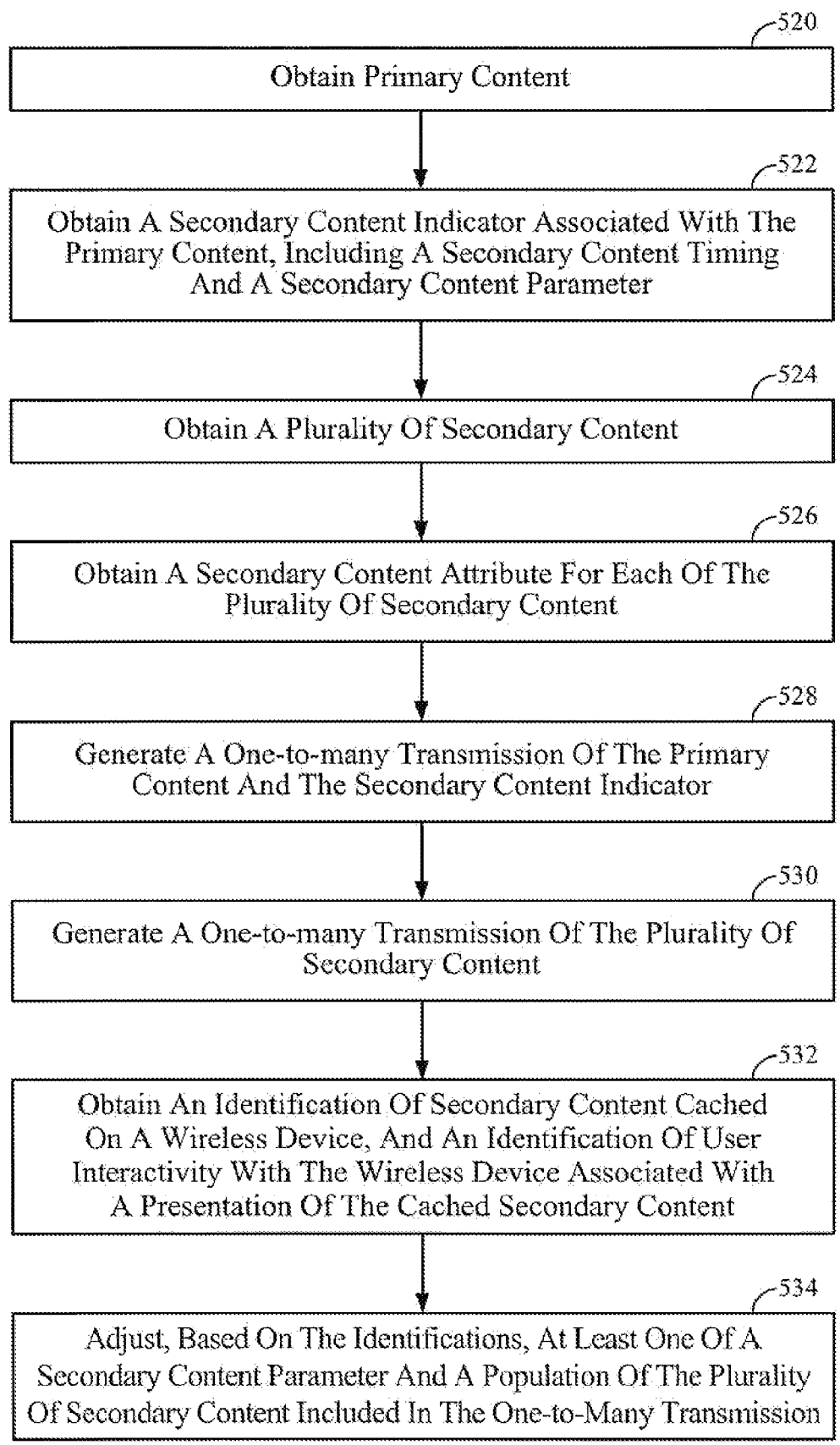
FIG. 38 is a flowchart of one aspect of a method of distributing content operable on the distribution system of FIG. 1.

In another aspect, referring to FIG. 38, one example of a method of distributing targeted content comprises obtaining primary content (Block 520) and obtaining a secondary content indicator associated with the primary content, including a secondary content timing and a secondary content parameter (Block 522). For example, referring to FIG. 1, distribution system 108 may receive the plurality of content 102 and the corresponding plurality of content metadata 112 from one or more content providers 106. The primary content may comprise one of the plurality of content 102. The secondary content indicator, as well as the content timing and other content parameters, may be defined within either each one of the plurality of content 102 or within the plurality of content metadata 112, which may include secondary content indicators 140 and/or cuing protocol 414 (FIG. 21). The secondary content indicators 140 and/or cuing protocol 414 may be associated with the plurality of content 102 by any party to system 100, such as an operator of distribution system 108, a content provider 106, an advertiser 162 (FIG. 4), a service provider, a content retailer, etc.

Further, the method may include obtaining a plurality of secondary content (Block 524) and obtaining a secondary content attribute for each of the plurality of secondary content (Block 526). For example, referring to FIG. 1, the plurality of content 102 obtained by distribution system 108 may further include a plurality of secondary content. Similarly, the plurality of content metadata 112 obtained by distribution system 108 may further include one or more secondary content attributes for each of the plurality of secondary content. The secondary content attributes, e.g. the content metadata 112, may be associated with the plurality of content 102 by any party to system 100, such as an operator of distribution system 108, a content provider 106, an advertiser 162 (FIG. 4), a service provider, a content retailer, etc.

The method may also include generating a one-to-many transmission of the primary content and the secondary content indicator (Block 528) and generating a one-to-many transmission of the plurality of secondary content (Block 530). For example, referring to FIG. 1, distribution system 108 may generate transmission 118 such that it includes both primary content and secondary content within the plurality of content 102 carried by the transmission 118. And, as noted previously, transmission 118 may carry the secondary content indicator 140 within either the plurality of content 102 or the plurality of content metadata 112, or as a separate cuing protocol 414 (FIG. 21). Further, it should be noted that there may be separate one-to-many transmission of this data, or there may be one transmission comprising all of the data, where the one transmission may include a plurality of channels each having different ones of the data.

Further, the method may include obtain an identification of secondary content cached on a wireless device, and an identification of user interactivity with the wireless device associated with a presentation of the cached secondary content (Block 532). For example, referring to FIG. 1, distribution system 108 is operable to receive tracking report 148 from wireless device 104, where tracking report provides information related to the device hardware and software states and user interactions occurring on wireless device 104 in association with presentation 134 including selected secondary content 138.

Additionally, the method may include adjusting, based on the identifications, at least one of a secondary content parameter and a population of the plurality of secondary content included in the one-to-many transmission (Block 534). For example, referring to FIG. 1, distribution system 108, for example via content manager module 384 (FIG. 21), may adjust one or more secondary content parameters 144 associated with at least one of the plurality of content 102 based upon the feedback received in tracking report 148. In another example, distribution system 108, for example via content manager module 384 (FIG. 21), may alter the content included in transmission 118, including primary content 136 and secondary content 138, based on the feedback received in the tracking report 148.

It should be noted that some portion or all of the above-defined actions may be performed on distribution system 108 of system 100. For example, in one aspect, all of the above actions are performed on distribution system 108. In another aspect, for example, the actions associated with characterizing each of the plurality of content 102 with one or more content metadata 112, as well as the adjusting actions, may performed external to distribution system 108, while the remaining actions may be performed on distribution system 108. Further, one or more of the above-defined actions may be performed by one or more components of system 100. For example, the primary content, secondary content, the respective content metadata, and the secondary content indicators and/or cuing protocols may be delivered by any combination of one or more components of system 100.

Therefore, in various aspects, the apparatus and methods of the described system 100 provide for the distribution of a plurality of content having descriptive metadata. Further, in various aspects, the apparatus and methods of the described system 100 provide for the retention and presentation of content selected by the wireless device from a one-to-many transmission of the plurality of content. A content selector executable by the wireless device extracts and caches selected ones from a transmission of the plurality of content based on, for example, a correspondence between selection parameters on the wireless device and the content metadata associated with the content. The selected content may comprise primary content and secondary content. In some aspects, the selection parameters may include device-generated user preference data, identified from preference-related information resident on the device. Additionally, in some aspects, a completely non-invasive and private mechanism is provided to prevent the details of the user preference data from being exposed outside of the wireless device. Further, the apparatus and methods of the described system 100 provide for mechanisms for signaling for and including one or more of the selected content in a presentation of other content. For example, the content selector is executable on the wireless device to initiate the inclusion of secondary content with a presentation of primary content, for example, based on a match between desired secondary content parameters and the content metadata of the cached secondary content. Thus, a user of a wireless device is provided with content, chosen by the wireless device from a group of content based on one or more user preferences, and thus the content is likely to be of interest to the user.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of presenting content on a wireless device, comprising:
    obtaining a secondary content indicator associated with a primary content, the secondary content indicator comprising a secondary content timing relative to the primary content and further comprising a secondary content parameter;
    obtaining a secondary content attribute for each of a plurality of secondary content;
    obtaining a selection parameter associated with the wireless device;
    storing selected secondary content from a one-to-many transmission of the plurality of secondary content based on a match between the selection parameter and a respective secondary content attribute;
    identifying, with respect to the secondary content indicator, one of the selected secondary content based on a match between the secondary content parameter and a respective secondary content attribute; and
    presenting via an output device, at the secondary content timing, the identified one of the selected secondary content.

2. The method of claim 1, further comprising tracking a user interaction with the wireless device associated with the presenting of the identified one of the selected secondary content, and generating a tracking report based on a result of the tracking.

3. The method of claim 1, further comprising tracking a consumption of the presentation of the identified one of the selected secondary content, and generating a consumption report based on a result of the tracking.

4. The method of claim 3, further comprising applying a predetermined privacy rule to the result of the tracking to generate a non-private consumption report.

5. The method of claim 3, further comprising removing data from the result of the tracking, wherein the removed data comprises information corresponding to predetermined private data, and wherein generating a consumption report further comprises generating, based on the result of the tracking without the removed data, a non-private consumption report.

6. The method of claim 1, wherein the secondary content parameter further comprises a content filter identifier, and wherein identifying one of the selected secondary content further comprises applying a content filter corresponding to the content filter identifier to the selected secondary content to determine the identified one of the selected secondary content.

7. The method of claim 1, wherein the secondary content parameter further comprises a content filter script identifier, and wherein identifying one of the selected secondary content further comprises executing a content filter script, corresponding to the content filter script identifier, with respect to the selected secondary content to determine the identified one of the selected secondary content.

8. The method of claim 1, wherein the secondary content parameter further comprises a content filter script including rules for selecting secondary content, and wherein identifying one of the selected secondary content further comprises executing the content filter script with respect to the selected secondary content to determine the identified one of the selected secondary content.

9. The method of claim 1, wherein the secondary content parameter further comprises a desired content identifier, wherein each secondary content attribute further comprises a secondary content identifier corresponding to the respective one of the plurality of secondary content, and wherein identifying one of the selected secondary content further comprises matching the desired content identifier with a respective secondary content identifier of one of the selected secondary content.

10. The method of claim 1, wherein the secondary content parameter further comprises a representation of a number of units of secondary content, wherein the identifying one of the selected secondary content further comprises identifying a plurality of the selected secondary content based on a match between the secondary content parameter and a respective secondary content attribute of each of the plurality of selected secondary content, wherein the plurality of the selected secondary content correspond to the number of units of secondary content, and wherein presenting the identified one of the selected secondary content further comprises presenting the plurality of selected second content.

11. The method of claim 10, wherein the secondary content parameter further comprises a representation of an order of the number of units, and wherein presenting the plurality of selected second content further comprises presenting the plurality of selected second content according to the order.

12. The method of claim 1, wherein storing selected content further comprises matching a user content preference with a respective secondary content attribute to determine the match.

13. The method of claim 12, further comprising monitoring user interaction events with the wireless device, and adjusting the user content preference based on applying a time weighting function to the monitored user interaction events.

14. The method of claim 1, wherein storing selected secondary content from a one-to-many transmission of the plurality of secondary content based on a match further comprises determining the match based on at least two of a user subscription, device state data, a device location, and a respective secondary content attribute.

15. The method of claim 1, wherein storing selected secondary content from a one-to-many transmission of the plurality of secondary content further comprises saving each of the selected secondary content in association with a predetermined one of a plurality of storage locations based on the respective secondary content attribute for the respective one of the selected secondary content.

16. The method of claim 1, further comprising applying a predetermined content collection filter to the secondary content attribute for each of a plurality of secondary content to determine the match between the selection parameter and the secondary content attribute.

17. The method of claim 1, further comprising applying a predetermined content collection filter to the secondary content attribute for each of the selected secondary content to determine the match between the between the secondary content parameter and the respective secondary content attribute.

18. The method of claim 1, further comprising:
wherein obtaining a secondary content indicator associated with a primary content further comprises obtaining a plurality of secondary content indicators associated with the primary content, each of the plurality of secondary content indicators comprising a respective secondary content timing relative to the primary content and further comprising a respective plurality of secondary content parameters;
wherein obtaining a secondary content attribute for each of a plurality of secondary content further comprises obtaining a plurality of secondary content attributes for each of the plurality of secondary content;
wherein storing selected secondary content further comprises storing a plurality of selected secondary content based on a match between the selection parameter and a respective secondary content attribute of each of the plurality of selected secondary content;
wherein identifying one of the selected secondary content further comprises identifying a plurality of the selected secondary content based on a match between a portion of each respective plurality of secondary content parameters and a portion of each respective plurality of secondary content attributes; and
presenting via an output device, at each respective secondary content timing, one of the identified plurality of the selected secondary content.

19. The method of claim 18, further comprising receiving a predetermined relative weighting for each of the plurality of secondary content parameters, and wherein identifying the plurality of the selected secondary content further comprises matching according to the respective predetermined relative weighting.

20. The method of claim 18, further comprising receiving a predetermined relative order corresponding to each secondary content timing for each of the plurality of secondary content indicators, and wherein presenting one of the identified plurality of the selected secondary content is based on the respective relative order.

21. The method of claim 1, further comprising obtaining a primary content and an associated primary content attribute, wherein the secondary content parameter is related to the primary content attribute.

22. The method of claim 1, wherein obtaining a secondary content attribute for each of a plurality of secondary content further comprises receiving each secondary content attribute in the one-to-many transmission, and further comprising applying a content cache filter to the one-to-many transmission to determine the match between the selection parameter and the respective secondary content attribute.

23. The method of claim 1, further comprising applying a content cache filter to each obtained secondary content attribute, determining the match between the selection parameter and the respective secondary content attribute based on the applying of the content cache filter, identifying the selected secondary content from the plurality of secondary content based on the match, and accessing the one-to-many transmission to acquire the selected secondary content.

24. The method of claim 1, further comprising obtaining the primary content, and wherein presenting the identified one of the selected secondary content further comprises simultaneously presenting the identified one of the selected secondary content and the primary content in a presentation.

25. The method of claim 1, further comprising obtaining the primary content, and wherein presenting the identified one of the selected secondary content further comprises inserting the identified one of the selected secondary content within a predetermined space adjacent to a presentation of the primary content.

26. The method of claim 1, further comprising obtaining the primary content, and wherein presenting the identified one of the selected secondary content further comprises replacing a portion of a presentation of the primary content with the identified one of the selected secondary content.

27. The method of claim 1, wherein each of the actions of identifying one of the selected secondary content and presenting the identified one of the selected secondary content are performed on the wireless device.

28. The method of claim 1, wherein each of the actions of obtaining a secondary content indicator, obtaining a secondary content attribute, obtaining a selection parameter and storing selected secondary content are performed on the wireless device.

29. The method of claim 1, further comprising identifying one of a plurality of users of the wireless device, and wherein obtaining the selection parameter further comprises obtaining one of a plurality of user information associated with the identified user.

30. The method of claim 1, further comprising obtaining the primary content, wherein the selection parameter comprises user preference data, and wherein obtaining the primary content further comprises selecting, at the wireless device, the primary content from a multicast transmission of a plurality of content, wherein each of the plurality of content comprises content metadata, wherein the selecting is based on a match between at least a portion of the user preference data and a respective one of the content metadata.

31. The method of claim 30, wherein obtaining a secondary content indicator and obtaining a secondary content attribute further comprise receiving, at the wireless device, the secondary content indicator and each secondary content attribute from the multicast transmission, and wherein identifying one of the selected secondary content further comprises analyzing, at the wireless device, at least one of the content metadata associated with at least one of the selected secondary content to determine the match between the secondary content parameter and the respective secondary content attribute.

32. The method of claim 31, further comprising receiving the primary content and the secondary content indicator in a separate channel of the multicast transmission.

33. The method of claim 31, further comprising receiving the primary content and the secondary content indicator in a single channel of the multicast transmission.

34. At least one processor configured to perform the actions of:
obtaining a secondary content indicator associated with the primary content, the secondary content indicator comprising a secondary content timing relative to the primary content and further comprising a secondary content parameter;
obtaining a secondary content attribute for each of a plurality of secondary content;
obtaining a selection parameter associated with a user of a wireless device;
storing selected secondary content from a one-to-many transmission of the plurality of secondary content based on a match between the selection parameter and a respective secondary content attribute;
identifying, with respect to the secondary content indicator, one of the selected secondary content based on a match between the secondary content parameter and a respective secondary content attribute; and
presenting via an output device, at the secondary content timing, the identified one of the selected secondary content.

35. A computer-readable medium comprising:
a first set of codes for causing the computer to obtain a secondary content indicator associated with the primary content, the secondary content indicator comprising a secondary content timing relative to the primary content and further comprising a secondary content parameter;
a second set of codes for causing the computer to obtain a secondary content attribute for each of a plurality of secondary content;
a third set of codes for causing the computer to obtain a selection parameter associated with a user of a wireless device;
a fourth set of codes for causing the computer to store selected secondary content from a one-to-many transmission of the plurality of secondary content based on a match between the selection parameter and a respective secondary content attribute;
a fifth set of codes for causing the computer to identify, with respect to the secondary content indicator, one of the selected secondary content based on a match between the secondary content parameter and a respective secondary content attribute; and
a sixth set of codes for causing the computer to present via an output device, at the secondary content timing, the identified one of the selected secondary content.

36. An apparatus for presenting content, comprising:
means for obtaining a secondary content indicator associated with the primary content, the secondary content indicator comprising a secondary content timing relative to the primary content and further comprising a secondary content parameter;
means for obtaining a secondary content attribute for each of a plurality of secondary content;
means for obtaining a selection parameter associated with a user of the apparatus;
means for storing selected secondary content from a one-to-many transmission of the plurality of secondary content based on a match between the selection parameter and a respective secondary content attribute;
means for identifying, with respect to the secondary content indicator, one of the selected secondary content based on a match between the secondary content parameter and a respective secondary content attribute; and
means for presenting, at the secondary content timing, the identified one of the selected secondary content.

37. A device for presenting content, comprising:
a computer platform having a memory and a processor, wherein the memory comprises a selection parameter; a user interface in communication with the computer platform;
a communications module in communication with the computer platform, wherein the communications module is operable to obtain a secondary content indicator associated with a primary content, the secondary content indicator comprising a secondary content timing relative to the primary content and further comprising a secondary content parameter, a secondary content attribute for each of a plurality of secondary content, and a one-to-many transmission of the plurality of secondary content;
a content selector having selection logic operable to initiate storage in the memory of selected secondary content from the one-to-many transmission of the plurality of secondary content based on a first match between the selection parameter and a respective secondary content attribute, wherein the selection logic is further operable to identify, with respect to the secondary content indicator, one of the selected secondary content based on a second match between the secondary content parameter and a respective secondary content attribute; and
a media module having media management logic operable to initiate a presentation, at the secondary content timing, of the identified one of the selected secondary content on the user interface.

38. The device of claim 37, further comprising a tracking module having a first logic operable to collect information relating to a user interaction with the wireless device associated with the presentation of the identified one of the selected secondary content, and wherein the tracking module further comprises a second logic operable to generate a tracking report based on the collected information.

39. The device of claim 37, further comprising a tracking module having a consumption data collector comprising collection logic operable to collect consumption-related information corresponding to the presentation of the identified one of the selected secondary content, and wherein the tracking module further comprises reporter logic operable to generate a consumption report based on the collected consumption-related information.

40. The device of claim 39, wherein the tracking module further comprises a predetermined privacy rule, and wherein the reporter logic is further operable to apply the predetermined privacy rule to the collected consumption-related information and generate the consumption report comprising only non-private data.

41. The device of claim 39, wherein the tracking module further comprises a predetermined privacy rule defining predetermined private data, and wherein the reporter logic is further operable to remove data from the consumption report, wherein the removed data corresponds to the predetermined private data, and wherein the consumption report without the removed data comprises a non-private consumption report.

42. The device of claim 37, wherein the secondary content parameter further comprises a content filter identifier, and wherein the selection logic is further operable to apply a content filter corresponding to the content filter identifier to the selected secondary content to determine the identified one of the selected secondary content.

43. The device of claim 37, wherein the secondary content parameter further comprises a content filter script identifier, and wherein the selection logic is further operable to execute a content filter script, corresponding to the content filter script identifier, with respect to the selected secondary content to determine the identified one of the selected secondary content.

44. The device of claim 37, wherein the secondary content parameter further comprises a content filter script including rules for selecting secondary content, and wherein the selection logic is further operable to execute the content filter script with respect to the selected secondary content to determine the identified one of the selected secondary content.

45. The device of claim 37, wherein the secondary content parameter further comprises a desired content identifier, wherein each secondary content attribute further comprises a secondary content identifier corresponding to the respective one of the plurality of secondary content, and wherein the selection logic is further operable to match the desired content identifier with a respective secondary content identifier of one of the selected secondary content.

46. The device of claim 37, wherein the secondary content parameter further comprises a representation of a number of units of secondary content, and wherein the selection logic is further operable to identify a plurality of the selected secondary content based on a match between the secondary content parameter and a respective secondary content attribute of each of the plurality of selected secondary content, wherein the plurality of the selected secondary content correspond to the number of units of secondary content, and wherein the media management logic is further operable to initiate the presentation of the plurality of selected second content.

47. The device of claim 46, wherein the secondary content parameter further comprises a representation of an order of the number of units, and wherein the media management logic is further operable to initiate the presentation of the plurality of selected second content according to the order.

48. The device of claim 37, wherein the selection parameter comprises a user content preference, wherein the selection logic is further operable to match the user content preference with a respective secondary content attribute to determine the first match.

49. The device of claim 48, further comprising a tracking module having collection logic operable to monitor user interaction events on the wireless device, and further comprising a profile generator having generator logic operable to generate the user content preference, wherein the generator logic is further operable to adjust the user content preference based on applying a time weighting function to the monitored user interaction events.

50. The device of claim 37, wherein the selection logic is further operable to determine the first match based on at least two of a user subscription, device state data, a location and a respective secondary content attribute.

51. The device of claim 37, wherein the memory comprises a plurality of storage locations, and wherein the selection logic is further operable to initiate saving each of the selected secondary content in association with a predetermined one of the plurality of storage locations based on the respective secondary content attribute for the respective one of the selected secondary content.

52. The device of claim 37, wherein the memory further comprises a plurality of content filters, and wherein the selection logic is further operable to apply a predetermined one of the plurality of content filter to the secondary content attribute for at least one of a plurality of secondary content to determine the first match.

53. The device of claim 37, wherein the memory further comprises a plurality of content filters, and wherein the selection logic is further operable to apply a predetermined one of the plurality of content filter to the secondary content attribute for at least one of the selected secondary content to determine the second match.

54. The device of claim 37, further comprising:
wherein the secondary content indicator comprises one of a plurality of secondary content indicators associated with the primary content, wherein each of the plurality of secondary content indicators comprises a respective secondary content timing relative to the primary content and further comprises a respective plurality of secondary content parameters;
wherein the communications module is further operable to obtain the plurality of secondary content indicators associated with the primary content, and wherein the communications module is further operable to obtain the plurality of secondary content attributes for each of the plurality of secondary content;
wherein the content selector is further operable to initiate storage of a plurality of selected secondary content based on a third match between the selection parameter and a respective secondary content attribute of each of the plurality of selected secondary content, and wherein the content selector is further operable to identify a plurality of the selected secondary content based on a fourth match between a portion of each respective plurality of secondary content parameters and a portion of each respective plurality of secondary content attributes; and
wherein the media module is further operable to initiate a presentation of one of the identified plurality of the selected secondary content.

55. The device of claim 54, wherein the content selector is operable to receive a predetermined relative weighting for each of the plurality of secondary content parameters, and wherein the selection logic is further operable to determined the fourth match according to the respective predetermined relative weighting.

56. The device of claim 54, wherein the media module is operable to receive a predetermined relative order corresponding to each secondary content timing for each of the plurality of secondary content indicators, and wherein the media management logic is further operable to initiate the presentation based on the respective relative order.

57. The device of claim 37, wherein the content selector is operable to obtain a primary content and an associated primary content attribute, wherein the secondary content parameter is related to the primary content attribute.

58. The device of claim 37, further comprising a selection database comprising a plurality of content filters, wherein the communications module is further operable to receive each secondary content attribute and each of the plurality of secondary content from the one-to-many transmission, and wherein the selection logic is further operable to apply a selected one of the plurality of content filters to the one-to-many transmission to determine the first match.

59. The device of claim 58, wherein the selection logic is further operable to apply a second selected one of the plurality of content filters to the selected secondary content to determined the second match.

60. The device of claim 37, further comprising a selection database comprising a plurality of content filters, wherein the selection logic is further operable to apply a content cache filter, selected from the plurality of content filters, to each secondary content attribute to determine the identified one of the selected secondary content, and wherein the selection logic is further operable to access the one-to-many transmission to acquire the identified one of the selected secondary content.

61. The device of claim 37, wherein the communications module is further operable to received the primary content, and wherein the presentation comprises a simultaneous presentation of the identified one of the selected secondary content and the primary content.

62. The device of claim 37, wherein the communications module is further operable to received the primary content, and wherein the media management logic is operable to insert the identified one of the selected secondary content within a predetermined space adjacent to the primary content in the presentation.

63. The device of claim 37, wherein the communications module is further operable to received the primary content, and wherein the media management logic is operable to replace a portion of the primary content with the identified one of the selected secondary content in the presentation.

64. The device of claim 37, further comprising a selection database comprising a plurality of user information corresponding to a plurality of users of the device, and wherein the content selection logic further comprises a user detection algorithm operable to identify the selection parameter from the plurality of user information based on interactions of a given user with the device.

65. The device of claim 37, wherein the selection parameter comprises user preference data, and wherein the selection logic is further operable to select the primary content from a multicast transmission of a plurality of content, wherein each of the plurality of content comprises content metadata, and wherein the selection logic is operable to select the primary content based on a third match between at least a portion of the user preference data and a respective one of the content metadata.

66. The device of claim 65, wherein the one-to-many transmission comprises a multicast transmission of the secondary content indicator and the secondary content attribute, and wherein the selection logic is further operable to analyze at least one of the content metadata associated with at least one of the selected secondary content to determine the second match.

67. The device of claim 66, wherein the multicast transmission further comprises a separate channel for the primary content and the secondary content indicator.

68. The device of claim 66, wherein the multicast transmission further comprises a single channel for the primary content and the secondary content indicator.

* * * * *